US012462773B1

United States Patent
Feather et al.

(10) Patent No.: US 12,462,773 B1
(45) Date of Patent: Nov. 4, 2025

(54) OPTIMIZATION OF IMAGE PERCEPTION FOR COLOR VISION DEFICIENCIES

(71) Applicant: Baylor University, Waco, TX (US)

(72) Inventors: Gary Alan Feather, Portland, OR (US); Corey P. Carbonara, Waco, TX (US); Michael F. Korpi, Hewitt, TX (US); James M. DeFilippis, Pacific Palisades, CA (US); Mitchell J. Bogdanowicz, Somis, CA (US)

(73) Assignee: Baylor University, Waco, TX (US)

( * ) Notice: Subject to any disclaimer, the term of this patent is extended or adjusted under 35 U.S.C. 154(b) by 303 days.

(21) Appl. No.: 18/108,366

(22) Filed: Feb. 10, 2023

Related U.S. Application Data

(60) Provisional application No. 63/309,273, filed on Feb. 11, 2022.

(51) Int. Cl.
*G09G 5/06* (2006.01)
*G06T 7/90* (2017.01)
*G06T 9/00* (2006.01)
*H04N 1/60* (2006.01)
*H04N 21/45* (2011.01)

(52) U.S. Cl.
CPC ............. *G09G 5/06* (2013.01); *G06T 7/90* (2017.01); *G06T 9/00* (2013.01); *H04N 1/6019* (2013.01); *H04N 1/6066* (2013.01); *H04N 21/4532* (2013.01); *G06T 2207/10024* (2013.01)

(58) Field of Classification Search
CPC .... G09G 5/06; G06T 7/90; G06T 9/00; G06T 2207/10024; H04N 1/6019; H04N 1/6066; H04N 21/4532
See application file for complete search history.

(56) References Cited

U.S. PATENT DOCUMENTS

| | | | |
|---|---|---|---|
| 5,589,898 A | 12/1996 | Atkinson | |
| 7,142,218 B2* | 11/2006 | Yoshida | G09G 3/3607 348/502 |
| 8,345,338 B2 | 1/2013 | Jeong et al. | |
| 8,542,324 B2 | 9/2013 | Wang et al. | |
| 9,712,792 B2 | 7/2017 | Shi et al. | |
| 10,025,098 B2 | 7/2018 | Lee et al. | |
| 10,049,599 B2 | 8/2018 | Sun | |
| 10,607,527 B1* | 3/2020 | Mandle | G09G 5/397 |

(Continued)

OTHER PUBLICATIONS

Baylor University, U.S. Appl. No. 17/965,410, Non-Provisional Patent Application; Entire Document.

(Continued)

*Primary Examiner* — Michael Le

(74) *Attorney, Agent, or Firm* — NEO IP

(57) ABSTRACT

The present invention includes systems and methods for optimizing perception of image data. Color vision impairment affects a user's ability to distinguish between certain colors, reducing the impact of color images. Mapping color image data to an expanded color gamut increases contrast between colors and the available number of distinct colors in a set of image data, which improves the ability of a user with color vision impairment to see differences between colors. The present invention includes systems and methods for determining a type of color vision impairment in order to provide customized optimization of image data for improved color perception.

19 Claims, 56 Drawing Sheets

System 1

(56) References Cited

U.S. PATENT DOCUMENTS

| | | | |
|---|---|---|---|
| 10,779,724 B2 | 9/2020 | Goodsitt et al. | |
| 10,854,109 B2 | 12/2020 | Singh et al. | |
| 11,039,742 B1* | 6/2021 | Abou Shousha | G06N 3/084 |
| 2009/0040564 A1* | 2/2009 | Granger | H04N 1/6097 |
| | | | 358/2.1 |
| 2009/0220120 A1* | 9/2009 | Yen | G06V 10/56 |
| | | | 382/100 |
| 2010/0225806 A1* | 9/2010 | Hsu | G06T 5/92 |
| | | | 348/E7.003 |
| 2010/0232691 A1* | 9/2010 | Sekiguchi | H04N 19/186 |
| | | | 382/166 |
| 2011/0205253 A1* | 8/2011 | Hill | G01J 3/50 |
| | | | 345/690 |
| 2011/0316973 A1* | 12/2011 | Miller | H04N 13/194 |
| | | | 348/E13.001 |
| 2015/0221280 A1* | 8/2015 | Van Der Vleuten | G06T 3/10 |
| | | | 382/167 |
| 2016/0205367 A1* | 7/2016 | Wallace | H04N 9/64 |
| | | | 348/571 |
| 2016/0360214 A1* | 12/2016 | Sole Rojals | H04N 19/132 |
| 2017/0054989 A1* | 2/2017 | Stessen | H04N 19/186 |
| 2017/0078706 A1* | 3/2017 | Van Der Vleuten | G06T 5/92 |
| 2017/0330418 A1* | 11/2017 | Link | G07F 17/3258 |
| 2017/0339418 A1* | 11/2017 | Ramasubramonian | |
| | | | H04N 19/136 |
| 2018/0218642 A1 | 8/2018 | Shamim et al. | |
| 2019/0042698 A1* | 2/2019 | Pohl | G16H 40/63 |
| 2019/0172415 A1* | 6/2019 | Davis | G06T 7/90 |
| 2019/0246895 A1 | 8/2019 | Kodimer | |
| 2019/0347833 A1 | 11/2019 | Tsai et al. | |

OTHER PUBLICATIONS

Baylor University, U.S. Appl. No. 17/969,149, Non-Provisional Patent Application; Entire Document.

Baylor University, U.S. Appl. No. 17/976,298, Non-Provisional Patent Application; Entire Document.

Baylor University, U.S. Appl. No. 17/980,151, Non-Provisional Patent Application; Entire Document.

Baylor University, U.S. Appl. No. 17/981,043, Non-Provisional Patent Application; Entire Document.

Baylor University, U.S. Appl. No. 17/985,560, Non-Provisional Patent Application; Entire Document.

Baylor University, U.S. Appl. No. 18/066,619, Non-Provisional Patent Application; Entire Document.

Baylor University, U.S. Appl. No. 18/154,484, Non-Provisional Patent Application; Entire Document.

Baylor University, U.S. Appl. No. 18/170,315, Non-Provisional Patent Application; Entire Document.

* cited by examiner

OPTIMIZATION OF IMAGE PERCEPTION FOR COLOR VISION DEFICIENCIES

CROSS REFERENCES TO RELATED APPLICATIONS

This application is related to and claims priority from the following U.S. patents and patent applications. This application claims priority to and the benefit of U.S. Provisional Patent Application No. 63/309,273, filed Feb. 11, 2022, which is incorporated herein by reference in its entirety.

BACKGROUND OF THE INVENTION

1. Field of the Invention

The present invention relates to optimizing image data, and more specifically to optimizing image data to accommodate color vision deficiencies.

2. Description of the Prior Art

It is generally known in the prior art to provide testing for vision deficiencies. Color vision deficiency or color blindness is a reduced ability to see or differentiate color. This reduced ability can make activities, such as distinguishing traffic signals, performing educational tasks, and playing video games, more difficult. Color vision deficiencies may be inherited or acquired (e.g., from diseases, medicines, or chemicals). There are three types of inherited color deficiencies: monochromacy (e.g., rod monochromacy, cone monochromacy), dichromacy (e.g., protanopia, deuteranopia, tritanopia), and anomalous trichromacy (e.g., protanomaly, deuteranomaly, tritanomaly). Color vision deficiencies often include difficulty distinguishing between red and green or, more rarely, blue and yellow.

Prior art patent documents include the following:

U.S. Patent Publication No. 2019/0246895 for System and method for device assisted viewing for colorblindness by inventor Kodimer, filed Feb. 9, 2018 and published Aug. 15, 2019, is directed to a system and method for adjustment of images to compensate for colorblindness includes a digital camera that generates image data corresponding to a captured color image. A processor retrieves conversion data from memory to complete a color conversion to accommodate colorblindness. The processor converts image properties associated with color in the captured color image to alternative image properties in accordance with application of the conversion data to the captured color image. The processor generates an image on the display in accordance with the alternative image data.

U.S. Pat. No. 8,542,324 for Efficient image and video recoloring for colorblindness by inventors Wang, et al., filed May 28, 2010 and issued Sep. 24, 2013, is directed to colors of images and videos are modified to make differences in the colors more perceptible to colorblind users. An exemplary recoloring process utilizes a color space transformation, a local color rotation and a global color rotation to transform colors of visual objects from colors which may not be distinguishable by the colorblind user to colors which may be distinguishable by the colorblind user.

U.S. Pat. No. 10,779,724 for Systems and methods for dynamically modifying visual content to account for user visual impairment by inventors Goodsitt, et al., filed Apr. 25, 2019 and issued Sep. 22, 2020, is directed to systems and methods of dynamically modifying visual content to account for user visual impairments are provided. The systems and methods provide for a plurality of generative adversarial networks, each associated with a corresponding style transfer, wherein the style transfer uniquely transforms the color mapping of a content template based on responses to at least one visual impairment test.

U.S. Pat. No. 10,854,109 for Color accommodation for on-demand accessibility by inventors Singh, et al., filed Oct. 31, 2018 and issued Dec. 1, 2020, is directed to accommodation for color or visual impairments that may be implemented by selective color substitution. A color accommodation module receives an image frame from a host system and generates a color-adapted version of the image frame. The color accommodation module may include a rule based filter that substitutes one or more colors within the image frame with one or more corresponding alternative colors.

U.S. Patent Publication No. 2019/0042698 for Vision deficiency adjusted graphics rendering by inventor Pohl, filed Aug. 3, 2017 and published Feb. 7, 2019, is directed to graphics apparatus that may include a vision characterizer to determine a vision characteristic associated with a user, and a parameter adjuster communicatively coupled to the vision characterizer to adjust a render parameter of a graphics system based on the determined vision characteristic.

U.S. Pat. No. 8,345,338 for Method of modifying color composition for a color-blind person in a mobile displaying apparatus by inventors Jeong, et al., filed Apr. 6, 2007 and issued Jan. 1, 2013, is directed to a method for evaluating the qualities of the user's color vision by means of the FM chromaticity test or directly measuring the defective factors of the user causing the color blindness. Thus, it modifies the color composition of a video displaying apparatus according to a numerical analysis of the color and degree of color blindness specific to each dichromatic individual, so that he may perceive the same colors as the normal person. Also disclosed is an apparatus for performing the method steps described therein.

U.S. Pat. No. 9,712,792 for RGB-RWB dual images by multi-layer sensors towards better image quality by inventors Shi, et al., filed Oct. 27, 2015 and issued Jul. 18, 2017, is directed to using improved Image Signal Processing (ISP) along with a multi-layer Color Filter Array (CFA) architecture to capture both the Red-Green-Blue (RGB) as well as the Red-X-Blue (RXB) images substantially simultaneously on the same Complementary Metal Oxide Semiconductor (CMOS) image sensor chip in a single shot so that subsequent image processing stage(s) can choose between RGB and RXB images to improve the quality of the final image. The color "X" in the RXB image may be a white color, a yellow color, or a cyan color. In contrast to the individual RWB or RGB imaging based conventional CMOS sensors, the disclosed CMOS sensor with one or more layers of specifically-selected CFAs can capture both the RGB and RXB images in a single shot using associated ISP. The multi-layer sensor may be an organic sensor or a stacked X3 sensor. The dual RGB-RXB imaging may reduce colorblindness, chromatic aberration, and saturation artifacts.

U.S. Patent Publication No. 2018/0218642 for Altered Vision Via Streamed Optical Remapping by inventors Shamim, et al., filed Sep. 2, 2015 and published Aug. 2, 2018, is directed to devices and methods for personalized real time optical remapping of streamed content are provided. The personalized optical remapping can correct for a wide variety of visual deficiencies or preferences by manipulating visual and spatial elements of streamed content. A device for presenting a personalized visual feed to a user includes a sensor module for detecting a visual input and providing a visual feed, a transformation module performing a computational transformation, selected according to a visual deficit or personal preference of the user, on at least a portion of the visual feed producing a personalized visual feed, and a visual display presenting the personalized visual feed to the user.

U.S. Pat. No. 10,025,098 for Electronic glasses and method for correcting color blindness by inventors Lee, et al., filed Dec. 24, 2014 and issued Jul. 17, 2018, is directed to electronic glasses having a display that correct for color blindness, and a method for operating the same. A user request for correction of color blindness is received. In response, a specific color is displayed, which is selected for correction of color blindness on the display. The display may be operated in a transparent state or in a display mode in which images are displayed. A color adjustment application may be executed to obtain color measurement result information for the particular user, where the specific color selected for correction of color blindness may be based on the measurement result information.

U.S. Pat. No. 10,049,599 for System and method for assisting a colorblind user by inventor Sun, filed Oct. 23, 2015 and issued Aug. 14, 2018, is directed to a system and method for assisting a colorblind user. The system includes: a perspective display device for displaying an electronic image and/or allowing the user to view an actual image through the perspective display device; an image acquisition device for acquiring an electronic image corresponding to an actual image which can be viewed through the perspective device; and a processing system for, when the current processing mode of the system is a first display mode, processing the electronic image acquired by the image acquisition device to obtain a processed electronic image, and superimposing the processed electronic image on an actual image viewed through the perspective display device in a way of being aligned with the actual image and displaying it; wherein the processing the electronic image comprises: conducting an HSV space transformation for a target part in the electronic image corresponding to an area of a color in the actual image which cannot be distinguished.

U.S. Patent Publication No. 2019/0347833 for Head-mounted electronic device and method of utilizing the same by inventors Tsai, et al., filed May 2, 2019 and published Nov. 14, 2019, is directed to a head-mounted electronic device including a head-mounted frame, a lens, a photosensitive element, a projector, an optical element, a processor, and a memory. The lens and the projector are disposed on the head-mounted frame. The photosensitive element is adapted to obtain first image data of a first target and body image data of a second target. The processor is electrically coupled to the photosensitive element and the projector. The memory storing color data, a first program, and a feature enhancement program, wherein the first program generates third image data according to the first image data and the color data for the projector to generate a third image on a reflective surface of the optical element. The feature enhancement program according to the body image data and the third image data for the projector to generate a fourth image on the reflective surface.

U.S. Pat. No. 5,589,898 for Method and system for color vision deficiency correction by inventor Atkinson, filed Jun. 7, 1995 and issued Dec. 31, 1996, is directed to an apparatus and method for the testing of computer users for color vision defects, sometimes referred to as "color blindness," and then the automatic adjustment of color computer displays to settings that are optimal for certain such deficiencies.

SUMMARY OF THE INVENTION

It is an object of this invention to provide a way to enhance and optimize image data for visualization by users with color vision deficiencies. It is also an object of this invention to provide systems and methods for determining a color vision deficiency and providing a customized visualization that is optimized for the color vision deficiency.

In one embodiment, the present invention includes a system for displaying a primary color system, comprising a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x and y), an image data converter, wherein the image data converter includes a digital interface, and wherein the digital interface is operable to encode and decode the set of values in the CIE Yxy color space, and at least one viewing device, wherein the at least one viewing device and the image data converter are in communication, wherein processed Yxy data is transported between the encode and the decode, wherein the image data converter is operable to convert the set of image data for display on the at least one viewing device, and wherein the converted set of image data is mapped to a set of optimized image data for display on the at least one viewing device based on at least one test for at least one viewer.

In another embodiment, the present invention provides a system for displaying a primary color system, comprising a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x and y), an image data converter, wherein the image data converter includes a digital interface, and wherein the digital interface is operable to encode and decode the set of values in the CIE Yxy color space, and at least one viewing device, wherein the at least one viewing device includes at least three primaries, wherein the at least one viewing device and the image data converter are in communication, wherein processed Yxy data is transported between the encode and the decode, wherein the image data converter is operable to convert the set of image data for display on the at least one viewing device, wherein the converted set of image data is mapped to a set of optimized image data for display on the at least one viewing device based on at least one test, wherein the at least one test includes at least one sensitivity profile for the at least three primaries, and wherein the at least one test includes at least one test for color perception, luminance perception, and/or saturation perception.

In yet another embodiment, the present invention provides a method for displaying a primary color system, comprising providing a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x and y), encoding the set of image data in the CIE Yxy color space using a digital interface of an image data converter, wherein the image data converter is in communication with at least one viewing device, processing the set of image data in the CIE Yxy color space, decoding the set of image data in the CIE Yxy color space using the digital interface of the image data converter, and the image data converter converting the set of image data for display on the at least one viewing device, and mapping the converted set of image data to a set of optimized image data for display on the at least one viewing device based on at least one test, wherein the encoding and the decoding include transportation of processed Yxy data.

These and other aspects of the present invention will become apparent to those skilled in the art after a reading of the following description of the preferred embodiment when considered with the drawings, as they support the claimed invention.

DETAILED DESCRIPTION

Figure 1:
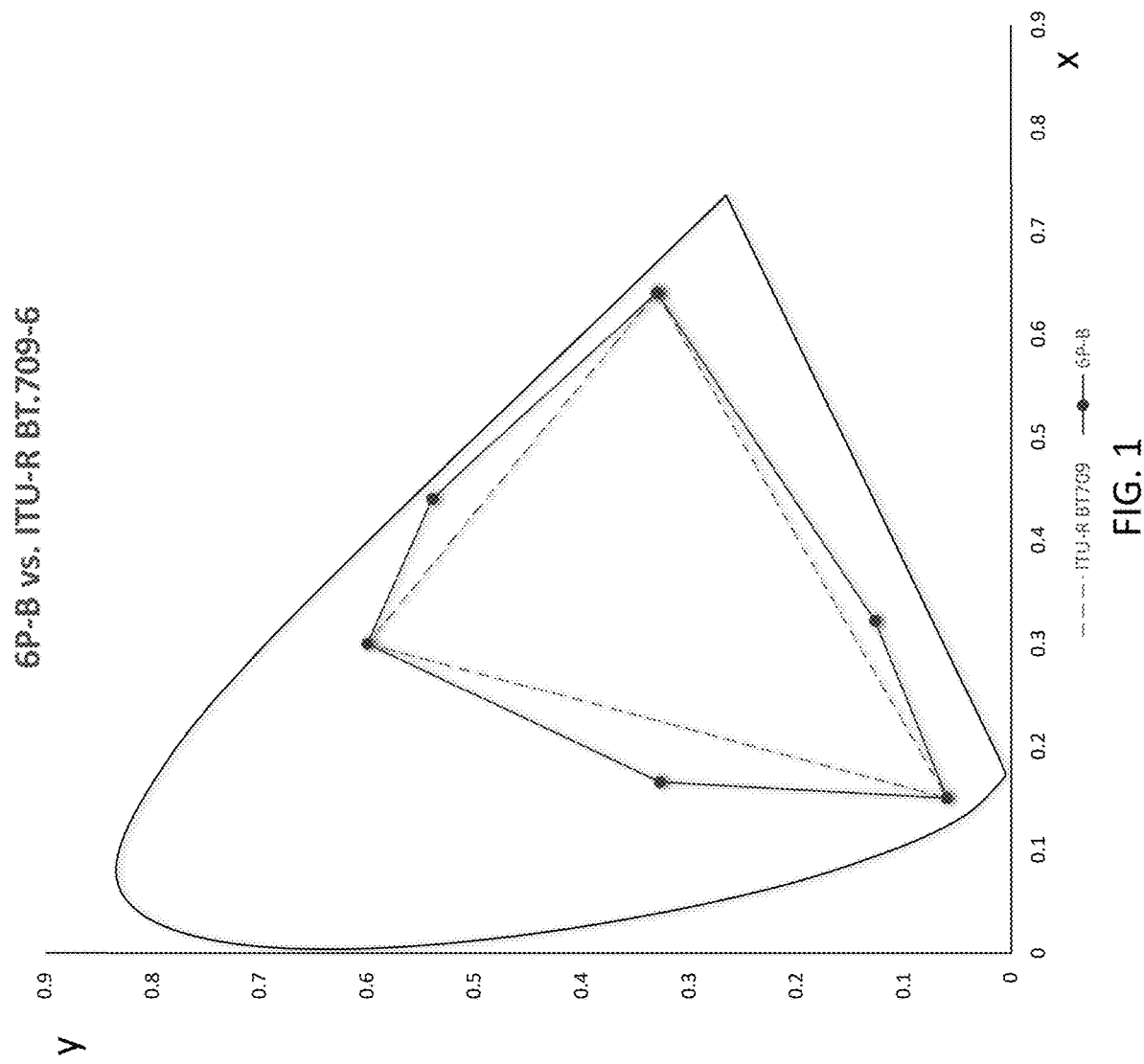
FIG. 1 illustrates one embodiment of a six primary system including a red primary, a green primary, a blue primary, a cyan primary, a magenta primary, and a yellow primary ("6P-B") compared to ITU-R BT.709-6.

The present invention relates to color systems, and more specifically to systems and methods for displaying color in RGB systems and multi-primary systems.

In one embodiment, the present invention includes a system for displaying a primary color system, comprising a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x and y), an image data converter, wherein the image data converter includes a digital interface, and wherein the digital interface is operable to encode and decode the set of values in the CIE Yxy color space, and at least one viewing device, wherein the at least one viewing device and the image data converter are in communication, wherein processed Yxy data is transported between the encode and the decode, wherein the image data converter is operable to convert the set of image data for display on the at least one viewing device, and wherein the converted set of image data is mapped to a set of optimized image data for display on the at least one viewing device based on at least one test for at least one viewer. In one embodiment, the at least one viewing device includes at least four primaries. In one embodiment, the at least one test includes at least one test for color perception, luminance perception, and/or saturation perception. In one embodiment, the converted set of image data is mapped to the set of optimized image data in the at least one viewing device. In one embodiment, the converted set of image data is mapped to the set of optimized image data using at least one look up table. In one embodiment, the set of optimized image data corresponds to a contribution of each of the at least three primaries in the at least one viewing device. In one embodiment, the converted set of image data is mapped from a first color to a second color in the set of optimized image data. In one embodiment, the converted set of image data is mapped to the set of optimized image data in a cable box, a set-top box, and/or a streaming device. In one embodiment, the at least one test includes at least one sensitivity profile for the at least one viewer, wherein the at least one sensitivity profile is for at least one primary of the at least one viewing device. In one embodiment, the system further includes at least one vision profile for the at least one viewer, wherein the at least one vision profile includes information related to color deficiencies, information about color vision along at least one vector, color preferences, luminance preferences, at least one user account, at least one viewing device, at least one viewing content, calibration, at least one sensitivity profile for at least one primary of the at least one viewing device, and/or data about a viewing environment in which the at least one viewing device is located. In one embodiment, the image data converter is operable to convert the set of values in the CIE Yxy color space to a plurality of color gamuts. In one embodiment, the image data converter is operable to fully sample the processed Yxy data related to the luminance and subsample the processed Yxy data related to the two colorimetric coordinates. In one embodiment, the processed Yxy data is fully sampled. In one embodiment, the at least one test includes a first test for a first eye and a second test for a second eye.

In another embodiment, the present invention provides a system for displaying a primary color system, comprising a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x and y), an image data converter, wherein the image data converter includes a digital interface, and wherein the digital interface is operable to encode and decode the set of values in the CIE Yxy color space, and at least one viewing device, wherein the at least one viewing device includes at least three primaries, wherein the at least one viewing device and the image data converter are in communication, wherein processed Yxy data is transported between the encode and the decode, wherein the image data converter is operable to convert the set of image data for display on the at least one viewing device, wherein the converted set of image data is mapped to a set of optimized image data for display on the at least one viewing device based on at least one test, wherein the at least one test includes at least one sensitivity profile for the at least three primaries, and wherein the at least one test includes at least one test for color perception, luminance perception, and/or saturation perception. In one embodiment, the at least three primaries include at least four primaries. In one embodiment, the converted set of image data is mapped to the set of optimized image data in the at least one viewing device.

In yet another embodiment, the present invention provides a method for displaying a primary color system, comprising providing a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x and y), encoding the set of image data in the CIE Yxy color space using a digital interface of an image data converter, wherein the image data converter is in communication with at least one viewing device, processing the set of image data in the CIE Yxy color space, decoding the set of image data in the CIE Yxy color space using the digital interface of the image data converter, and the image data converter converting the set of image data for display on the at least one viewing device, and mapping the converted set of image data to a set of optimized image data for display on the at least one viewing device based on at least one test, wherein the encoding and the decoding include transportation of processed Yxy data. In one embodiment, the mapping is completed in the at least one viewing device. In one embodiment, the method further includes selecting contributions for each of the at least three primaries based on the at least one test.

The present invention relates to color systems. A multitude of color systems are known, but they continue to suffer numerous issues. As imaging technology is moving forward, there has been a significant interest in expanding the range of colors that are replicated on electronic displays. Enhancements to the television system have expanded from the early CCIR 601 standard to ITU-R BT.709-6, to SMPTE RP431-2, and ITU-R BT.2020. Each one has increased the gamut of visible colors by expanding the distance from the reference white point to the position of the Red (R), Green (G), and Blue (B) color primaries (collectively known as "RGB") in chromaticity space. While this approach works, it has several disadvantages. When implemented in content presentation, issues arise due to the technical methods used to expand the gamut of colors seen (typically using a more-narrow emissive spectrum), which can result in increased viewer metameric errors and require increased power due to lower illumination source. These issues increase both capital and operational costs.

With the current available technologies, displays are limited in respect to their range of color and light output. There are many misconceptions regarding how viewers interpret the display output technically versus real-world sensations viewed with the human eye. The reason viewers see more than just the three emitting primary colors is because the eye combines the spectral wavelengths incident on it into the three bands. Humans interpret the radiant energy (spectrum and amplitude) from a display and process it so that an individual color is perceived. The display does not emit a color or a specific wavelength that directly relates to the sensation of color. It simply radiates energy at the same spectrum which humans sense as light and color. It is the observer who interprets this energy as color.

When the CIE 2° standard observer was established in 1931, common understanding of color sensation was that the eye used red, blue, and green cone receptors (James Maxwell & James Forbes 1855). Later, with the Munsell vision model (Munsell 1915), Munsell described the vision system to include three separate components: luminance, hue, and saturation. Using RGB emitters or filters, these three primary colors are the components used to produce images on today's modern electronic displays.

There are three primary physical variables that affect sensation of color. These are the spectral distribution of radiant energy as it is absorbed into the retina, the sensitivity of the eye in relation to the intensity of light landing on the retinal pigment epithelium, and the distribution of cones within the retina. The distribution of cones (e.g., L cones, M cones, and S cones) varies considerably from person to person.

Enhancements in brightness have been accomplished through larger backlights or higher efficiency phosphors. Encoding of higher dynamic ranges is addressed using higher range, more perceptually uniform electro-optical transfer functions to support these enhancements to brightness technology, while wider color gamuts are produced by using narrow bandwidth emissions. Narrower bandwidth emitters result in the viewer experiencing higher color saturation. But there can be a disconnect between how saturation is produced and how it is controlled. What is believed to occur when changing saturation is that increasing color values of a color primary represents an increase to saturation. This is not true, as changing saturation requires the variance of a color primary spectral output as parametric. There are no variable spectrum displays available to date as the technology to do so has not been commercially developed, nor has the new infrastructure required to support this been discussed.

Instead, the method that a display changes for viewer color sensation is by changing color luminance. As data values increase, the color primary gets brighter. Changes to color saturation are accomplished by varying the brightness of all three primaries and taking advantage of the dominant color theory.

Expanding color primaries beyond RGB has been discussed before. There have been numerous designs of multi-primary displays. For example, SHARP has attempted this with their four-color QUATTRON TV systems by adding a yellow color primary and developing an algorithm to drive it. Another four primary color display was proposed by Matthew Brennesholtz which included an additional cyan primary, and a six primary display was described by Yan Xiong, Fei Deng, Shan Xu, and Sufang Gao of the School of Physics and Optoelectric Engineering at the Yangtze University Jingzhou China. In addition, AU OPTRONICS has developed a five primary display technology. SONY has also recently disclosed a camera design featuring RGBCMY (red, green, blue, cyan, magenta, and yellow) and RGBCMYW (red, green, blue cyan, magenta, yellow, and white) sensors.

Actual working displays have been shown publicly as far back as the late 1990's, including samples from Tokyo Polytechnic University, Nagoya City University, and Genoa Technologies. However, all of these systems are exclusive to their displays, and any additional color primary information is limited to the display's internal processing.

Additionally, the Visual Arts System for Archiving and Retrieval of Images (VASARI) project developed a colorimetric scanner system for direct digital imaging of paintings. The system provides more accurate coloring than conventional film, allowing it to replace film photography. Despite the project beginning in 1989, technical developments have continued. Additional information is available at https://www.southampton.ac.uk/~km2/projs/vasari/ (last accessed Mar. 30, 2020), which is incorporated herein by reference in its entirety.

None of the prior art discloses developing additional color primary information outside of the display. Moreover, the system driving the display is often proprietary to the demonstration. In each of these executions, nothing in the workflow is included to acquire or generate additional color primary information. The development of a multi-primary color system is not complete if the only part of the system that supports the added primaries is within the display itself.

Referring now to the drawings in general, the illustrations are for the purpose of describing one or more preferred embodiments of the invention and are not intended to limit the invention thereto.

Additional details about multi-primary systems are available in U.S. Pat. Nos. 10,607,527; 10,950,160; 10,950,161; 10,950,162; 10,997,896; 11,011,098; and 11,017,708, U.S. Publication Nos. 20200402441, 20210027693, 20210020094, 20210035486, 20210035487, 20210043127, and 20210097923, and U.S. application Ser. Nos. 17/180,441, 17/182,775, 17/182,811, 17/182,858, 17/209,959, and 17/225,734, each of which is incorporated herein by reference in its entirety.

In one embodiment, the color system is a red, green, and blue primary system. In another embodiment, the color system includes a multi-primary system. The multi-primary system of the present invention includes at least four primaries. The at least four primaries preferably include at least one red primary, at least one green primary, and/or at least one blue primary. In one embodiment, the at least four primaries include a cyan primary, a magenta primary, and/or a yellow primary. In one embodiment, the at least four primaries include at least one white emitter. In one embodiment, the color system is a super saturated color system. Details regarding a super saturated color system are available in U.S. Pat. No. 11,501,419, which is incorporated herein by reference in its entirety.

In one embodiment, the multi-primary system includes six primaries. In one preferred embodiment, the six primaries include a red primary, a green primary, a blue primary, a cyan primary, a magenta primary, and a yellow primary.

6P-B

6P-B is a color set that uses the same RGB values that are defined in the ITU-R BT.709-6 television standard. The gamut includes these RGB primary colors and then adds three more color primaries orthogonal to these based on the white point. The white point used in 6P-B is D65 (ISO 11664-2).

In one embodiment, the red primary has a dominant wavelength of 609 nm, the yellow primary has a dominant wavelength of 571 nm, the green primary has a dominant wavelength of 552 nm, the cyan primary has a dominant wavelength of 491 nm, and the blue primary has a dominant wavelength of 465 nm as shown in Table 1. In one embodiment, the dominant wavelength is approximately (e.g., within ±10%) the value listed in the table below. Alternatively, the dominant wavelength is within +5% of the value listed in the table below. In yet another embodiment, the dominant wavelength is within +2% of the value listed in the table below.

TABLE 1

|  | x | y | u' | v' | λ |
|---|---|---|---|---|---|
| W (D65) | 0.3127 | 0.3290 | 0.1978 | 0.4683 |  |
| R | 0.6400 | 0.3300 | 0.4507 | 0.5228 | 609 nm |
| G | 0.3000 | 0.6000 | 0.1250 | 0.5625 | 552 nm |
| B | 0.1500 | 0.0600 | 0.1754 | 0.1578 | 464 nm |
| C | 0.1655 | 0.3270 | 0.1041 | 0.4463 | 491 nm |
| M | 0.3221 | 0.1266 | 0.3325 | 0.2940 |  |
| Y | 0.4400 | 0.5395 | 0.2047 | 0.5649 | 571 nm |

FIG. 1 illustrates 6P-B compared to ITU-R BT.709-6.

6P-C

6P-C is based on the same RGB primaries defined in SMPTE RP431-2 projection recommendation. Each gamut includes these RGB primary colors and then adds three more color primaries orthogonal to these based on the white point. The white point used in 6P-B is D65 (ISO 11664-2). Two versions of 6P-C are used. One is optimized for a D60 white point (SMPTE ST2065-1), and the other is optimized for a D65 white point.

In one embodiment, the red primary has a dominant wavelength of 615 nm, the yellow primary has a dominant wavelength of 570 nm, the green primary has a dominant wavelength of 545 nm, the cyan primary has a dominant wavelength of 493 nm, and the blue primary has a dominant wavelength of 465 nm as shown in Table 2. In one embodiment, the dominant wavelength is approximately (e.g., within ±10%) the value listed in the table below. Alternatively, the dominant wavelength is within +5% of the value listed in the table below. In yet another embodiment, the dominant wavelength is within +2% of the value listed in the table below.

TABLE 2

|  | x | y | u' | v' | λ |
|---|---|---|---|---|---|
| W (D60) | 0.3217 | 0.3377 | 0.2008 | 0.4742 |  |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1627 | 0.3419 | 0.0960 | 0.4540 | 493 nm |
| M | 0.3523 | 0.1423 | 0.3520 | 0.3200 |  |
| Y | 0.4502 | 0.5472 | 0.2078 | 0.5683 | 570 nm |

Figure 2:
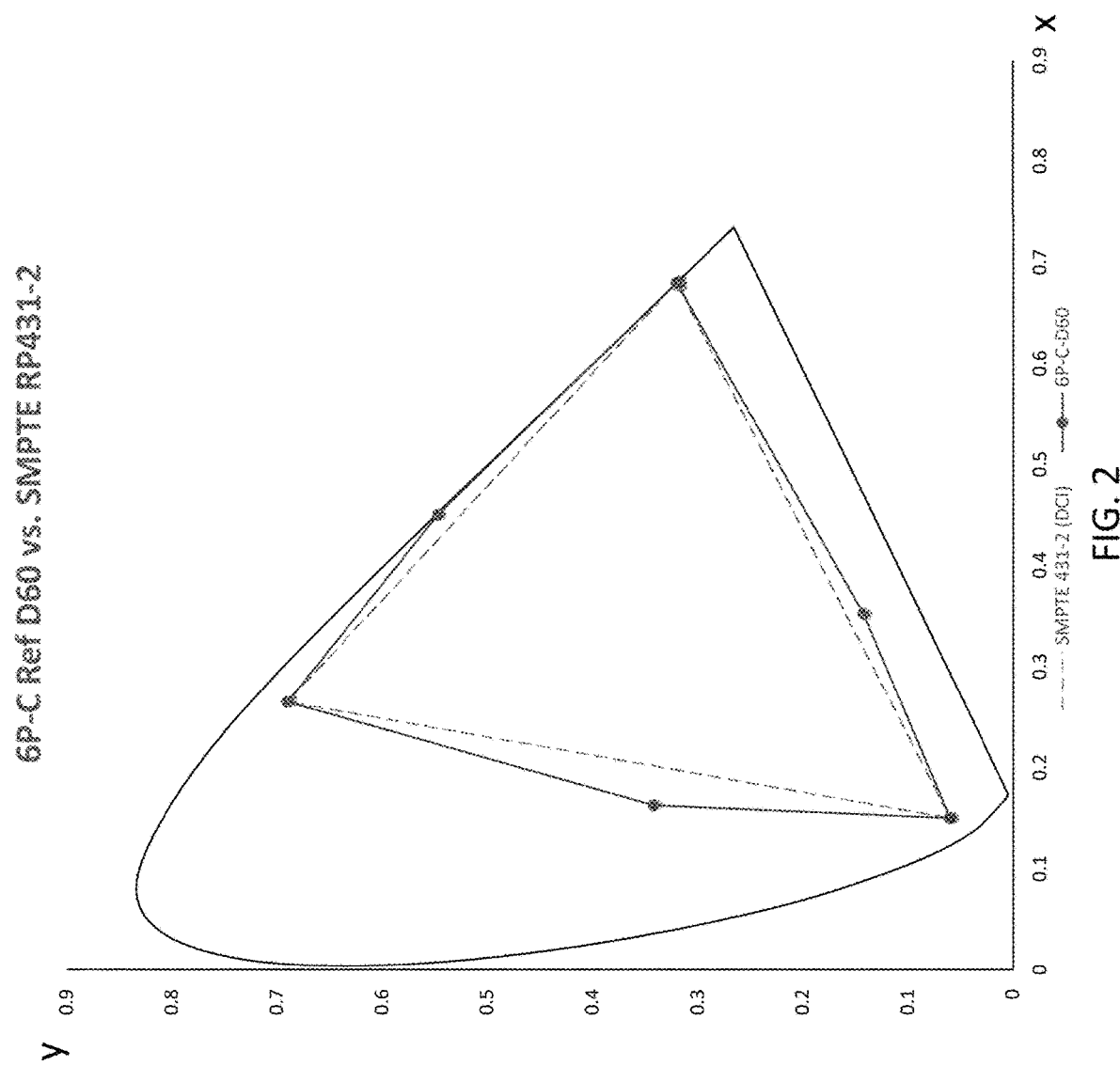
FIG. 2 illustrates another embodiment of a six primary system including a red primary, a green primary, a blue primary, a cyan primary, a magenta primary, and a yellow primary ("6P-C") compared to SMPTE RP431-2 for a D60 white point.

FIG. 2 illustrates 6P-C compared to SMPTE RP431-2 for a D60 white point.

In one embodiment, the red primary has a dominant wavelength of 615 nm, the yellow primary has a dominant wavelength of 570 nm, the green primary has a dominant wavelength of 545 nm, the cyan primary has a dominant wavelength of 492 nm, and the blue primary has a dominant wavelength of 465 nm as shown in Table 3. In one embodiment, the dominant wavelength is approximately (e.g., within +10%) the value listed in the table below. Alternatively, the dominant wavelength is within +5% of the value listed in the table below. In yet another embodiment, the dominant wavelength is within +2% of the value listed in the table below.

TABLE 3

|  | x | y | u' | v' | λ |
|---|---|---|---|---|---|
| W (D65) | 0.3127 | 0.3290 | 0.1978 | 0.4683 |  |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1617 | 0.3327 | 0.0970 | 0.4490 | 492 nm |
| M | 0.3383 | 0.1372 | 0.3410 | 0.3110 |  |
| Y | 0.4470 | 0.5513 | 0.2050 | 0.5689 | 570 nm |

Figure 3:
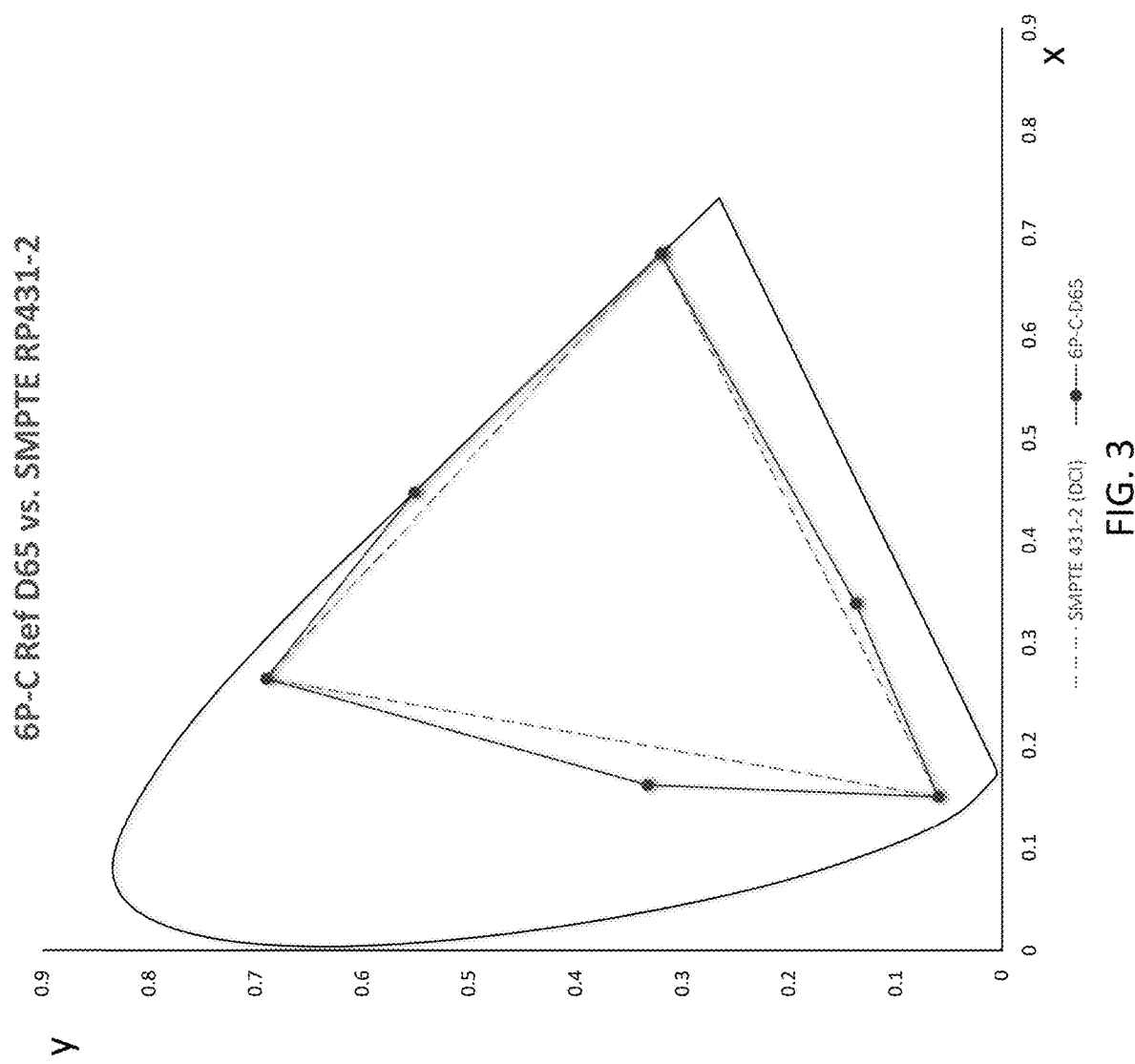
FIG. 3 illustrates yet another embodiment of a six primary system including a red primary, a green primary, a blue primary, a cyan primary, a magenta primary, and a yellow primary ("6P-C") compared to SMPTE RP431-2 for a D65 white point.

FIG. 3 illustrates 6P-C compared to SMPTE RP431-2 for a D65 white point.

Super 6P

Figure 4:
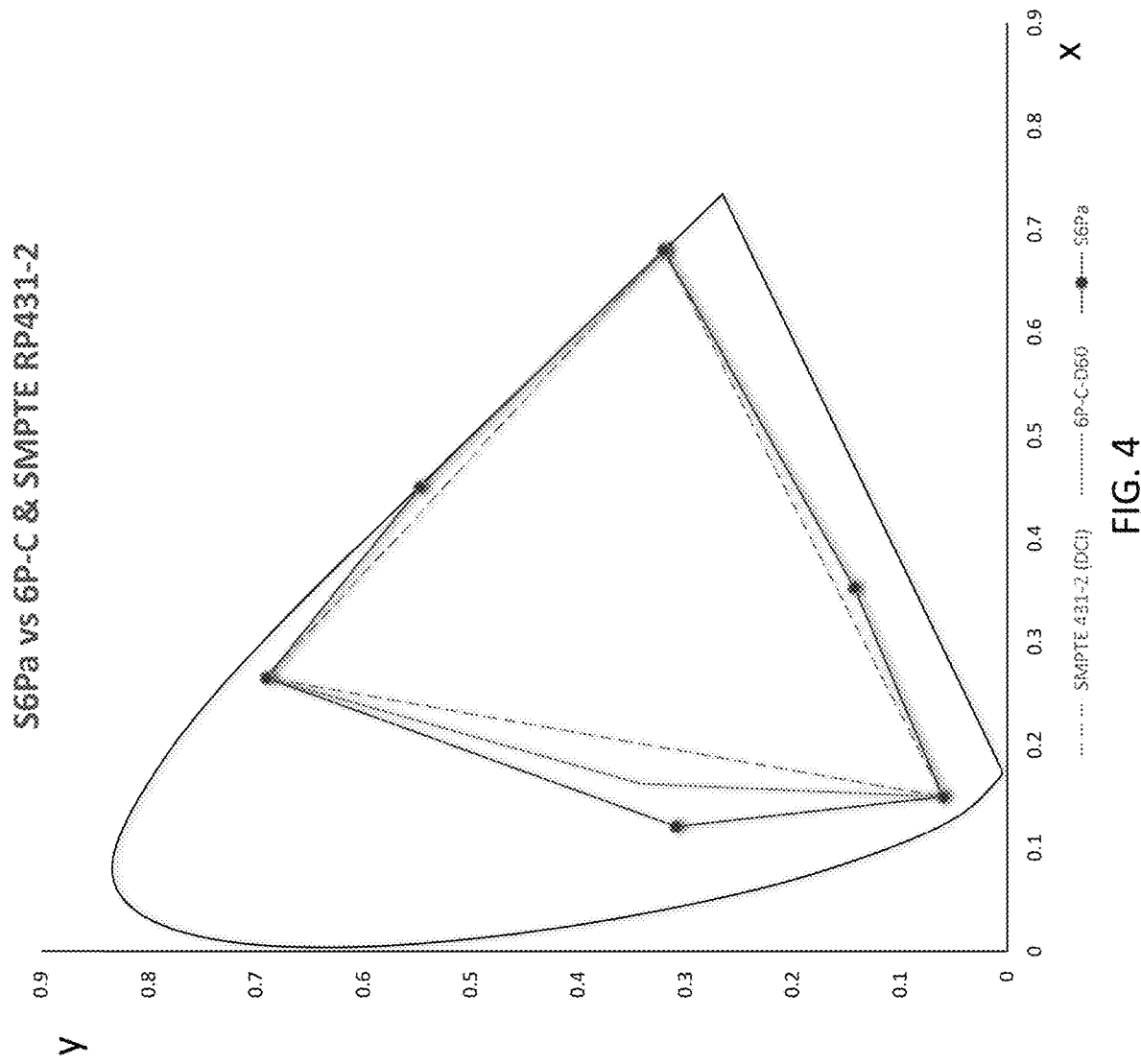
FIG. 4 illustrates Super 6Pa compared to 6P-C.

One of the advantages of ITU-R BT.2020 is that it can include all of the Pointer colors and that increasing primary saturation in a six-color primary design could also do this. Pointer is described in "The Gamut of Real Surface Colors, M. R. Pointer, Published in Colour Research and Application Volume #5, Issue #3 (1980), which is incorporated herein by reference in its entirety. However, extending the 6P gamut beyond SMPTE RP431-2 ("6P-C") adds two problems. The first problem is the requirement to narrow the spectrum of the extended primaries. The second problem is the complexity of designing a backwards compatible system using color primaries that are not related to current standards. But in some cases, there is a need to extend the gamut beyond 6P-C and avoid these problems. If the goal is to encompass Pointer's data set, then it is possible to keep most of the 6P-C system and only change the cyan color primary position. In one embodiment, the cyan color primary position is located so that the gamut edge encompasses all of Pointer's data set. In another embodiment, the cyan color primary position is a location that limits maximum saturation. With 6P-C, cyan is positioned as u'=0.096, v'=0.454. In one embodiment of Super 6P, cyan is moved to u'=0.075, v'=0.430 ("Super 6Pa" (S6Pa)). Advantageously, this creates a new gamut that covers Pointer's data set almost in its entirety. FIG. 4 illustrates Super 6Pa compared to 6P-C.

Table 4 is a table of values for Super 6Pa. The definition of x,y are described in ISO 11664-3:2012/CIE S 014 Part 3, which is incorporated herein by reference in its entirety. The definition of u',v' are described in ISO 11664-5:2016/CIE S 014 Part 5, which is incorporated herein by reference in its entirety. λ defines each color primary as dominant color wavelength for RGB and complementary wavelengths CMY.

TABLE 4

|  | x | y | u' | v' | λ |
|---|---|---|---|---|---|
| W (D60) | 0.3217 | 0.3377 | 0.2008 | 0.4742 |  |
| W (D65) | 0.3127 | 0.3290 | 0.1978 | 0.4683 |  |

TABLE 4-continued

|   | x | y | u' | v' | λ |
|---|---|---|---|---|---|
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1211 | 0.3088 | 0.0750 | 0.4300 | 490 nm |
| M | 0.3523 | 0.1423 | 0.3520 | 0.3200 | |
| Y | 0.4502 | 0.5472 | 0.2078 | 0.5683 | 570 nm |

Figure 5:
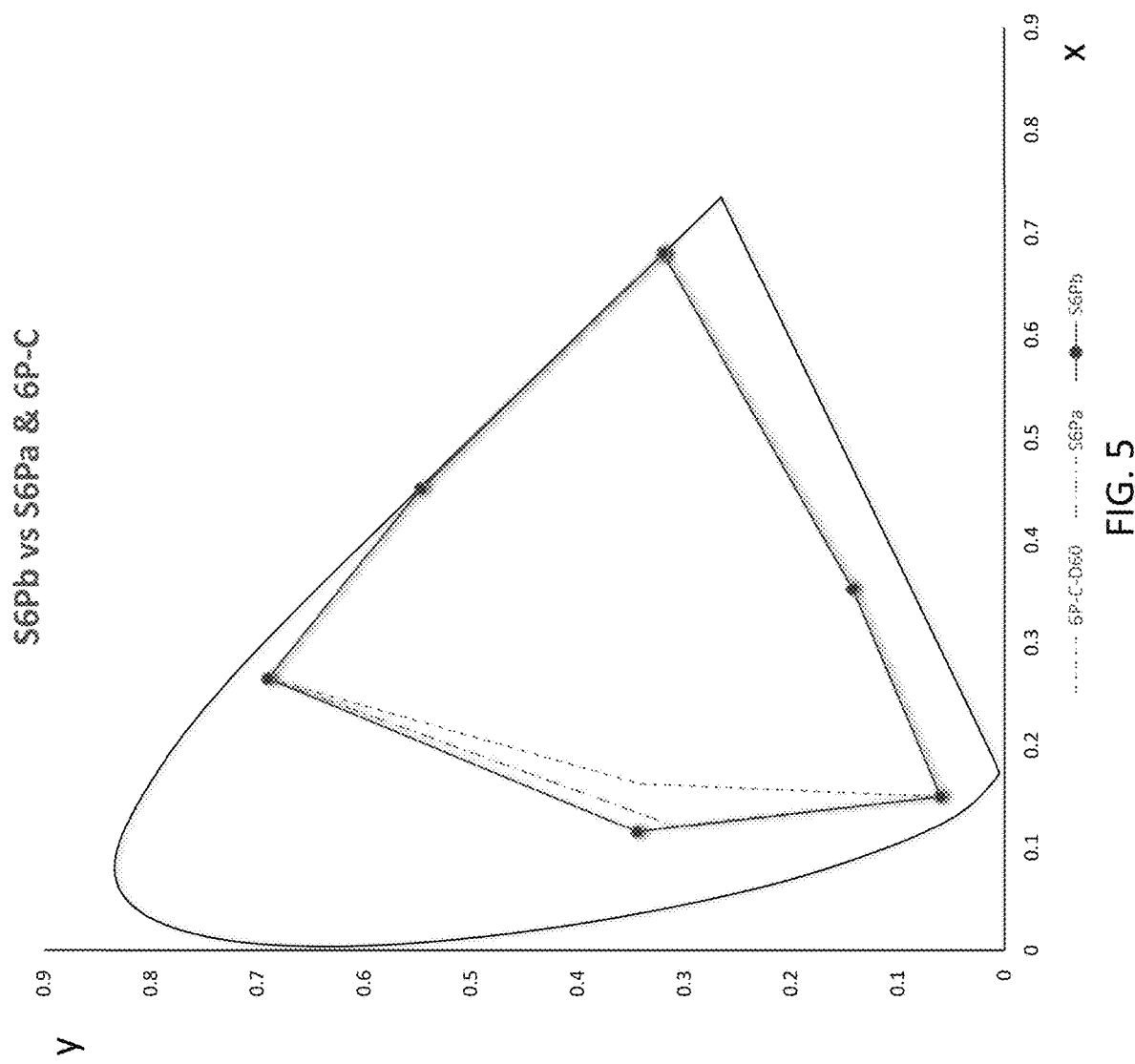
FIG. 5 illustrates Super 6Pb compared to Super 6Pa and 6P-C.

In an alternative embodiment, the saturation is expanded on the same hue angle as 6P-C as shown in FIG. 5. Advantageously, this makes backward compatibility less complicated. However, this requires much more saturation (i.e., narrower spectra). In another embodiment of Super 6P, cyan is moved to u'=0.067, v'=0.449 ("Super 6Pb" (S6Pb)). Additionally, FIG. 5 illustrates Super 6Pb compared to Super 6Pa and 6P-C.

Table 5 is a table of values for Super 6Pb. The definition of x,y are described in ISO 11664-3:2012/CIE S 014 Part 3, which is incorporated herein by reference in its entirety. The definition of u',v' are described in ISO 11664-5:2016/CIE S 014 Part 5, which is incorporated herein by reference in its entirety. λ defines each color primary as dominant color wavelength for RGB and complementary wavelengths CMY.

TABLE 5

|   | x | y | u' | v' | λ |
|---|---|---|---|---|---|
| W (ACES D60) | 0.32168 | 0.33767 | 0.2008 | 0.4742 | |
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1156 | 0.3442 | 0.0670 | 0.4490 | 493 nm |
| M | 0.3523 | 0.1423 | 0.3520 | 0.3200 | |
| Y | 0.4502 | 0.5472 | 0.2078 | 0.5683 | 570 nm |

RGB Systems

As previously described, the present invention is compatible with RGB systems, including, but not limited to, ITU-R BT.709-6 (06/2015), "RP 431-2:2011—SMPTE Recommended Practice—D-Cinema Quality—Reference Projector and Environment," in RP 431-2:2011, vol., no., pp. 1-14, 6 Apr. 2011, doi: 10.5594/SMPTE.RP431-2.2011, and/or ITU-R BT.2020-2 (10/2015), each of which is incorporated herein by reference in its entirety. In one embodiment, the Red (R) primary, the Green (G) primary, and/or the Blue (B) primary are located at approximately the positions listed in Table 6. In one embodiment, the x-coordinate and/or the y-coordinate are approximately (e.g., within ±10%) the value listed in the table below. Alternatively, the x-coordinate and/or the y-coordinate are within ±5% of the value listed in the table below. In yet another embodiment, the x-coordinate and/or the y-coordinate are within ±2% of the value listed in the table below.

TABLE 6

|   | x | y | λ |
|---|---|---|---|
| W (D65) | 0.3127 | 0.3290 | |
| R | 0.708 | 0.292 | 630 nm |
| G | 0.170 | 0.797 | 532 nm |
| B | 0.131 | 0.046 | 467 nm |

In a preferred embodiment, a matrix is created from XYZ values of each of the primaries. As the XYZ values of the primaries change, the matrix changes. Additional details about the matrix are described below.

Formatting and Transportation of Multi-Primary Signals

The present invention includes three different methods to format video for transport: System 1, System 2, and System 3. System 1 is comprised of an encode and decode system, which can be divided into base encoder and digitation, image data stacking, mapping into the standard data transport, readout, unstack, and finally image decoding. In one embodiment, the basic method of this system is to combine opposing color primaries within the three standard transport channels and identify them by their code value.

System 2 uses a sequential method where three color primaries are passed to the transport format as full bit level image data and inserted as normal. The three additional channels are delayed by one pixel and then placed into the transport instead of the first colors. This is useful in situations where quantizing artifacts are critical to image performance. In one embodiment, this system is comprised of the six primaries (e.g., RGB plus a method to delay the CYM colors for injection), image resolution identification to allow for pixel count synchronization, start of video identification, and RGB Delay.

System 3 utilizes a dual link method where two wires are used. In one embodiment, a first set of three channels (e.g., RGB) are sent to link A and a second set of three channels (e.g., CYM) is sent to link B. Once they arrive at the image destination, they are recombined.

To transport up to six color components (e.g., four, five, or six), System 1, System 2, or System 3 can be used as described. If four color components are used, two of the channels are set to "0". If five color components are used, one of the channels is set to "0". Advantageously, this transportation method works for all primary systems described herein that include up to six color components.

Comparison of Three Systems

Advantageously, System 1 fits within legacy SDI, CTA, and Ethernet transports. Additionally, System 1 has zero latency processing for conversion to an RGB display. However, System 1 is limited to 11-bit words.

System 2 is advantageously operable to transport 6 channels using 16-bit words with no compression. Additionally, System 2 fits within newer SDI, CTA, and Ethernet transport formats. However, System 2 requires double bit rate speed. For example, a 4K image requires a data rate for an 8K RGB image.

In comparison, System 3 is operable to transport up to 6 channels using 16-bit words with compression and at the same data required for a specific resolution. For example, a data rate for an RGB image is the same as for a 6P image using System 3. However, System 3 requires a twin cable connection within the video system.

Nomenclature

In one embodiment, a standard video nomenclature is used to better describe each system.

R describes red data as linear light. G describes green data as linear light. B describes blue data as linear light. C describes cyan data as linear light. M describes magenta data as linear light. Y' and/or Y describe yellow data as linear light.

R' describes red data as non-linear light. G' describes green data as non-linear light. B' describes blue data as non-linear light. C' describes cyan data as non-linear light. M' describes magenta data as non-linear light. $Y^{c'}$ and/or Y' describe yellow data as non-linear light.

$Y_6$ describes the luminance sum of RGBCMY data. $Y_{RGB}$ describes a System 2 encode that is the linear luminance sum of the RGB data. $Y_{CMY}$ describes a System 2 encode that is the linear luminance sum of the CMY data.

$C_R$ describes the data value of red after subtracting linear image luminance. $C_B$ describes the data value of blue after subtracting linear image luminance. $C_C$ describes the data value of cyan after subtracting linear image luminance. $C_Y$ describes the data value of yellow after subtracting linear image luminance.

$Y'_{RGB}$ describes a System 2 encode that is the nonlinear luminance sum of the RGB data. $Y'_{CMY}$ describes a System 2 encode that is the nonlinear luminance sum of the CMY data. $-Y$ describes the sum of RGB data subtracted from $Y_6$.

$C'_R$ describes the data value of red after subtracting nonlinear image luminance. $C'_B$ describes the data value of blue after subtracting nonlinear image luminance. $C'_C$ describes the data value of cyan after subtracting nonlinear image luminance. $C'_Y$ describes the data value of yellow after subtracting nonlinear image luminance.

B+Y describes a System 1 encode that includes either blue or yellow data. G+M describes a System 1 encode that includes either green or magenta data. R+C describes a System 1 encode that includes either green or magenta data. $C_R+C_C$ describes a System 1 encode that includes either color difference data. $C_B+C_Y$ describes a System 1 encode that includes either color difference data.

4:4:4 describes full bandwidth sampling of a color in an RGB system. 4:4:4:4:4 describes full sampling of a color in an RGBCMY system. 4:2:2 describes an encode where a full bandwidth luminance channel (Y) is used to carry image detail and the remaining components are half sampled as a Cb Cr encode. 4:2:2:2:2 describes an encode where a full bandwidth luminance channel (Y) is used to carry image detail and the remaining components are half sampled as a Cb Cr Cy Cc encode. 4:2:0 describes a component system similar to 4:2:2, but where Cr and Cb samples alternate per line. 4:2:0:2:0 describes a component system similar to 4:2:2, but where Cr, Cb, Cy, and Cc samples alternate per line.

Constant luminance is the signal process where luminance (Y) are calculated in linear light. Non-constant luminance is the signal process where luminance (Y) are calculated in nonlinear light.

Deriving Color Components

When using a color difference method (4:2:2), several components need specific processing so that they can be used in lower frequency transports. These are derived as:

$Y'_6 =$
$0.1063R' + 0.23195Y^{c'} + 0.3576G' + 0.19685C' + 0.0361B' + 0.0712M'$ $G'_6 = \left(\frac{1}{0.3576Y}\right) - (0.1063R') -$
$(0.0361B') - (0.19685C') - (0.23195Y^{C'}) - (0.0712M')$ $-Y' = Y'_6 - (C' + Y^{c'} + M')$ $C'_R = \frac{R' - Y'_6}{1.7874} \quad C'_B = \frac{B' - Y'_6}{1.9278} \quad C'_C = \frac{C' - Y'_6}{1.6063} \quad C'_Y = \frac{Y^{C'} - Y'_6}{1.5361}$ -continued $R' = \frac{C'_R - Y'_6}{1.7874} \quad B' = \frac{C'_B - Y'_6}{1.9278} \quad C' = \frac{C'_C - Y'_6}{1.6063} \quad Y^{C'} = \frac{C'_Y - Y'_6}{1.5361}$ The ratios for Cr, Cb, Cc, and Cy are also valid in linear light calculations.

Magenta can be calculated as follows:

$$M' = \frac{B' + R'}{B' \times R'} \text{ or } M = \frac{B + R}{B \times R}$$

System 1

In one embodiment, the multi-primary color system is compatible with legacy systems. A backwards compatible multi-primary color system is defined by a sampling method. In one embodiment, the sampling method is 4:4:4. In one embodiment, the sampling method is 4:2:2. In another embodiment, the sampling method is 4:2:0. In one embodiment of a backwards compatible multi-primary color system, new encode and decode systems are divided into the steps of performing base encoding and digitization, image data stacking, mapping into the standard data transport, readout, unstacking, and image decoding ("System 1"). In one embodiment, System 1 combines opposing color primaries within three standard transport channels and identifies them by their code value. In one embodiment of a backwards compatible multi-primary color system, the processes are analog processes. In another embodiment of a backwards compatible multi-primary color system, the processes are digital processes.

In one embodiment, the sampling method for a multi-primary color system is a 4:4:4 sampling method. Black and white bits are redefined. In one embodiment, putting black at midlevel within each data word allows the addition of CYM color data.

Figure 6:
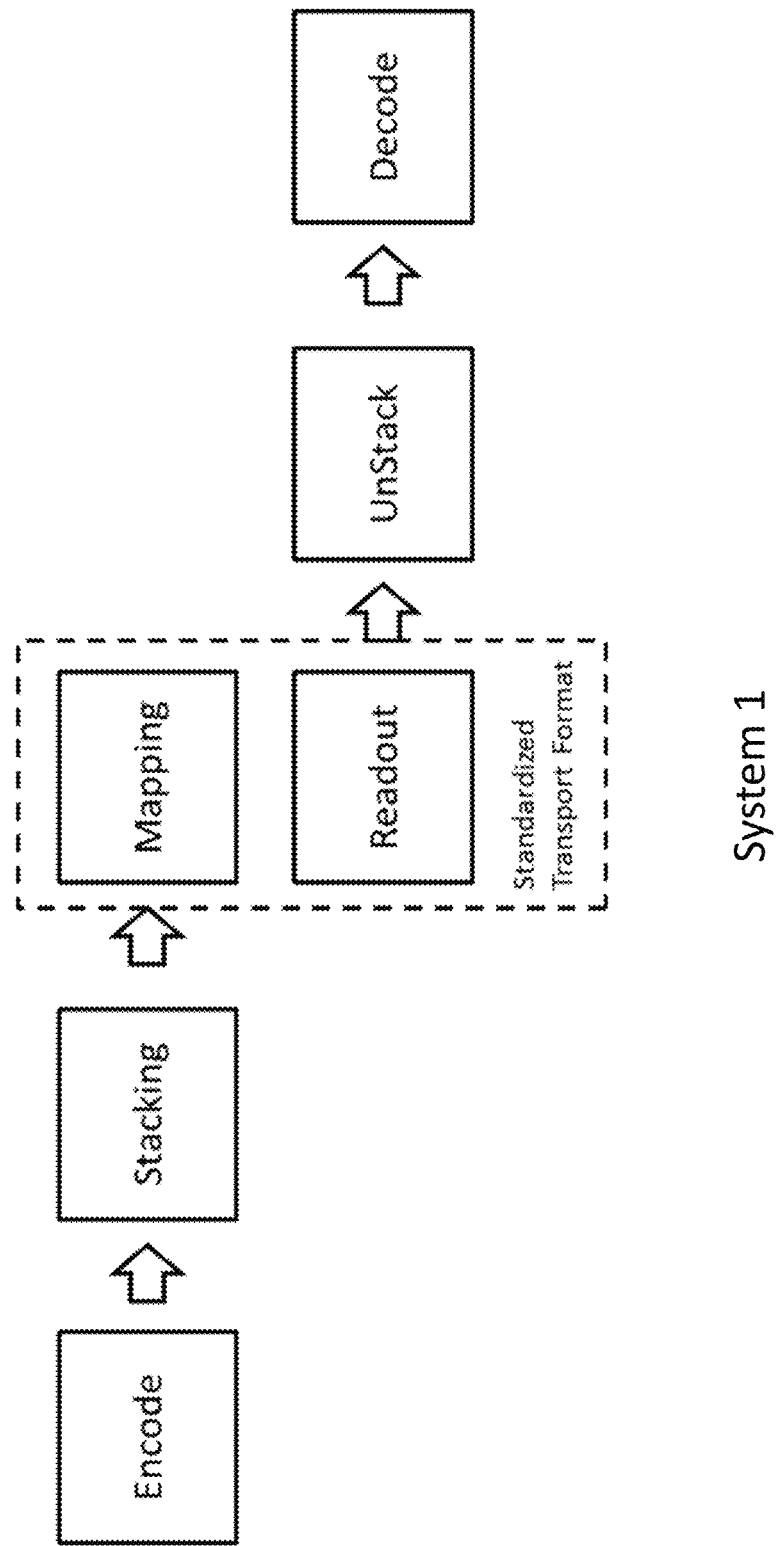
FIG. 6 illustrates an embodiment of an encode and decode system for a multi-primary color system.

FIG. 6 illustrates an embodiment of an encode and decode system for a multi-primary color system. In one embodiment, the multi-primary color encode and decode system is divided into a base encoder and digitation, image data stacking, mapping into the standard data transport, readout, unstack, and finally image decoding ("System 1"). In one embodiment, the method of this system combines opposing color primaries within the three standard transport channels and identifies them by their code value. In one embodiment, the encode and decode for a multi-primary color system are analog-based. In another embodiment, the encode and decode for a multi-primary color system are digital-based. System 1 is designed to be compatible with lower bandwidth systems and allows a maximum of 11 bits per channel and is limited to sending only three channels of up to six primaries at a time. In one embodiment, it does this by using a stacking system where either the color channel or the complementary channel is decoded depending on the bit level of that one channel.

System 2

Figure 7:
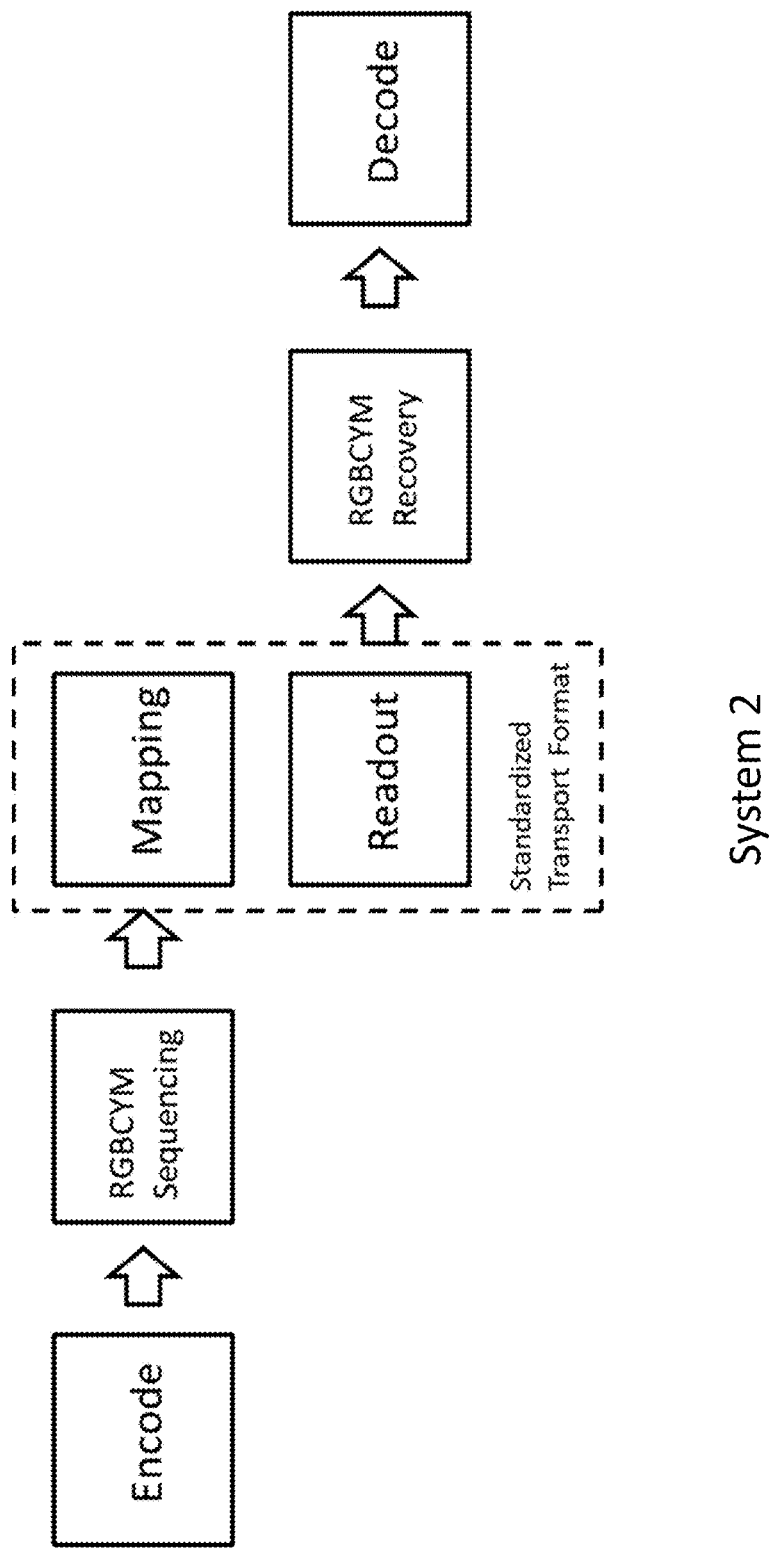
FIG. 7 illustrates a sequential method where three color primaries are passed to the transport format as full bit level image data and inserted as normal ("System 2").

FIG. 7 illustrates a sequential method where three color primaries are passed to the transport format as full bit level image data and inserted as normal ("System 2"). The three additional channels are delayed by one pixel and then placed into the transport instead of the first colors. This method is useful in situations where quantizing artifacts is critical to image performance. In one embodiment, this system is comprised of six primaries (RGBCYM), a method to delay the CYM colors for injection, image resolution identification to all for pixel count synchronization, start of video identification, RGB delay, and for YCCCCC systems, logic to select the dominant color primary. The advantage of System 2 is that full bit level video can be transported, but at double the normal data rate.

System 2A

System 2 sequences on a pixel to pixel basis. However, a quadrature method is also possible ("System 2A") that is operable to transport six primaries in stereo or twelve primary image information. Each quadrant of the frame contains three color primary data sets. These are combined in the display. A first set of three primaries is displayed in the upper left quadrant, a second set of three primaries is displayed in the upper right quadrant, a third set of primaries is displayed in the lower left quadrant, and a fourth set of primaries is displayed in lower right quadrant. In one embodiment, the first set of three primaries, the second set of three primaries, the third set of three primaries, and the fourth set of three primaries do not contain any overlapping primaries (i.e., twelve different primaries). Alternatively, the first set of three primaries, the second set of three primaries, the third set of three primaries, and the fourth set of three primaries contain overlapping primaries (i.e., at least one primary is contained in more than one set of three primaries). In one embodiment, the first set of three primaries and the third set of three primaries contain the same primaries and the second set of three primaries and the fourth set of three primaries contain the same primaries.

Figure 8A:
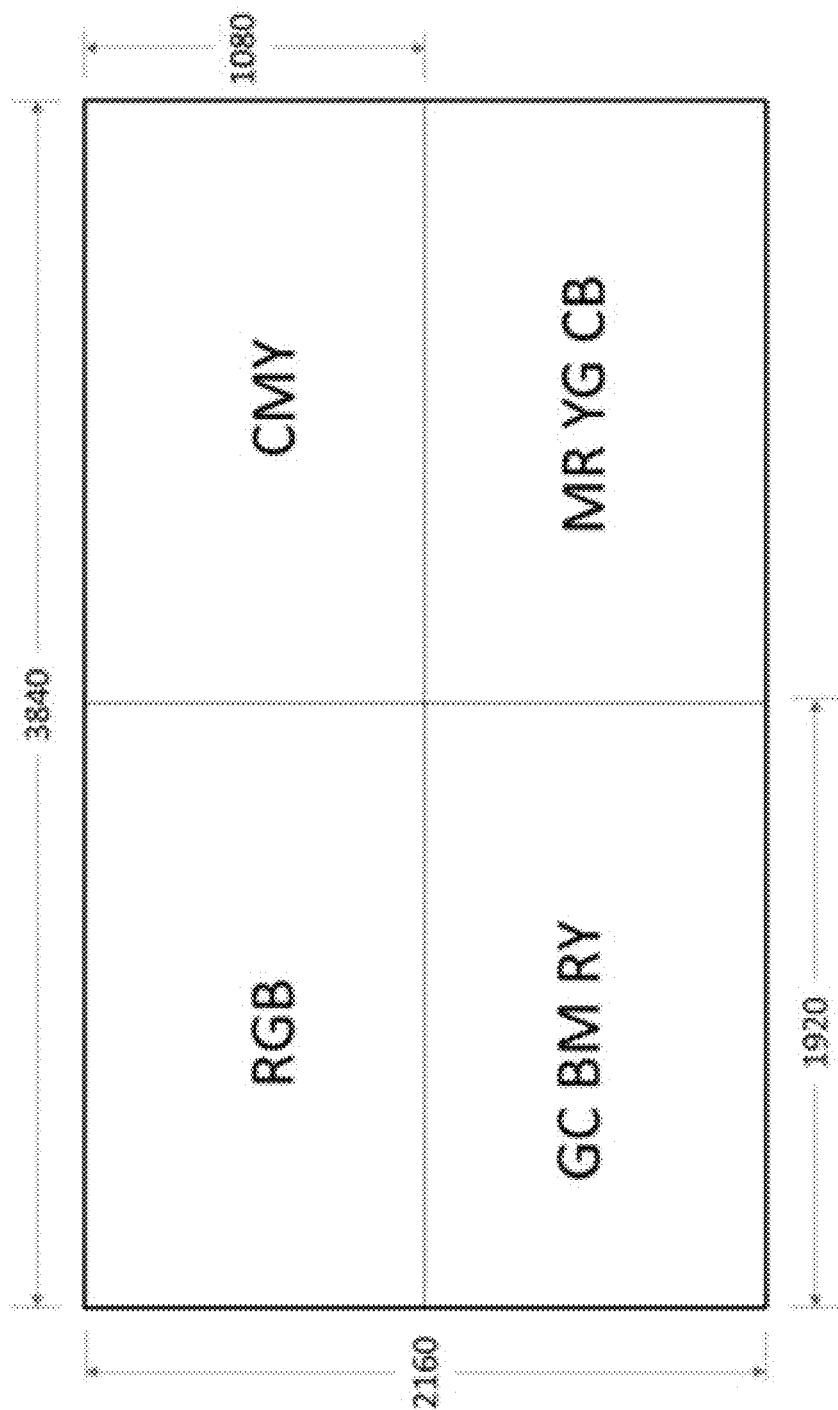
FIG. 8A illustrates one embodiment of a quadrature method ("System 2A").

FIG. 8A illustrates one embodiment of a quadrature method ("System 2A"). In the example shown in FIG. 8A, a first set of three primaries (e.g., RGB) is displayed in the upper left quadrant, a second set of three primaries (e.g., CMY) is displayed in the upper right quadrant, a third set of three primaries (e.g., GC, BM, and RY) is displayed in the lower left quadrant, and a fourth set of three primaries (e.g., MR, YG, and CB) is displayed in the lower right quadrant. Although the example shown in FIG. 8A illustrates a backwards compatible 12P system, this is merely for illustrative purposes. The present invention is not limited to the twelve primaries shown in FIG. 8A. Additionally, alternative pixel arrangements are compatible with the present invention.

Figure 8B:
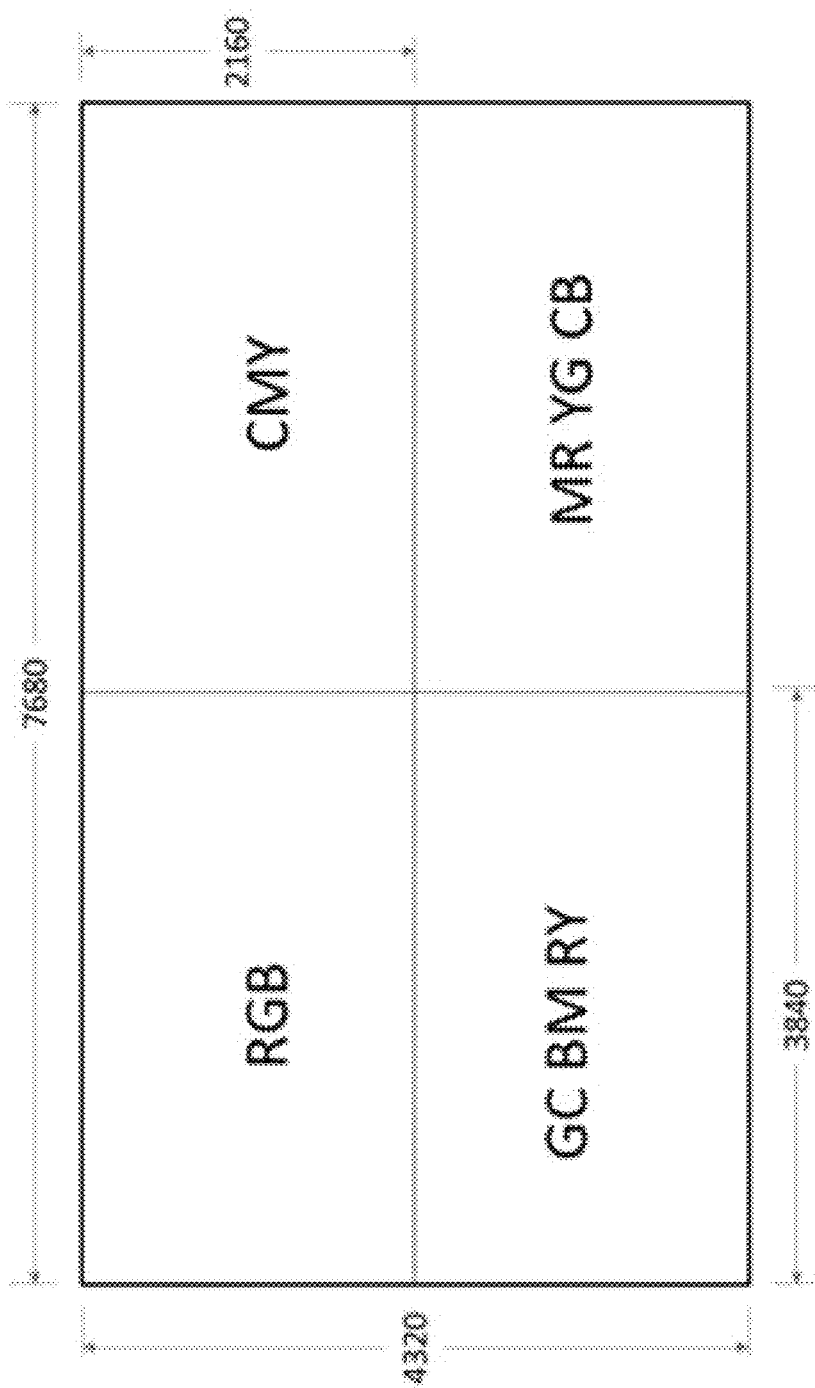
FIG. 8B illustrates another embodiment of a quadrature method ("System 2A").

FIG. 8B illustrates another embodiment of a quadrature method ("System 2A"). In the example shown in FIG. 8B, a first set of three primaries (e.g., RGB) is displayed in the upper left quadrant, a second set of three primaries (e.g., CMY) is displayed in the upper right quadrant, a third set of three primaries (e.g., GC, BM, and RY) is displayed in the lower left quadrant, and a fourth set of three primaries (e.g., MR, YG, and CB) is displayed in the lower right quadrant. Although the example shown in FIG. 8B illustrates a backwards compatible 12P system, this is merely for illustrative purposes. The present invention is not limited to the twelve primaries shown in FIG. 8B. Additionally, alternative pixel arrangements are compatible with the present invention.

Figure 8C:
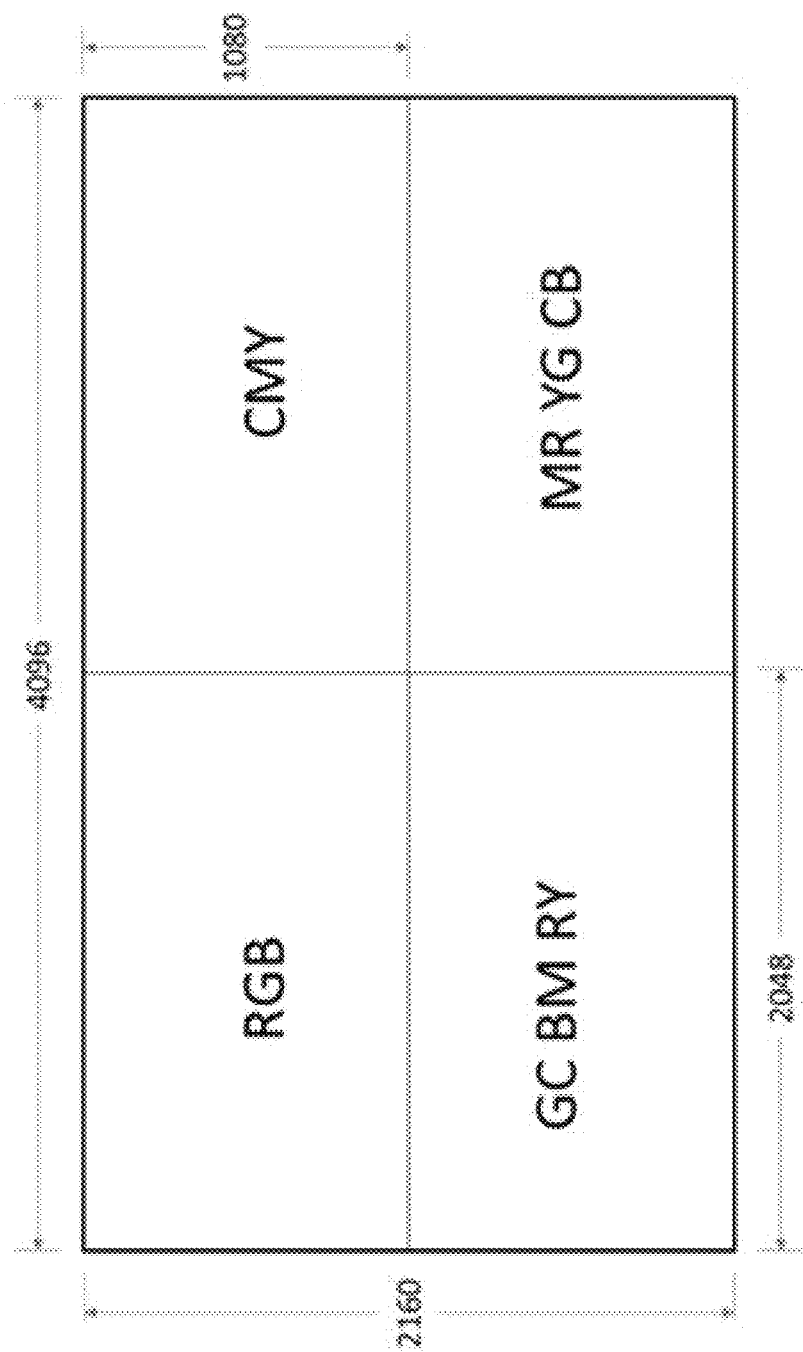
FIG. 8C illustrates yet another embodiment of a quadrature method ("System 2A").

FIG. 8C illustrates yet another embodiment of a quadrature method ("System 2A"). In the example shown in FIG. 8C, a first set of three primaries (e.g., RGB) is displayed in the upper left quadrant, a second set of three primaries (e.g., CMY) is displayed in the upper right quadrant, a third set of three primaries (e.g., GC, BM, and RY) is displayed in the lower left quadrant, and a fourth set of three primaries (e.g., MR, YG, and CB) is displayed in the lower right quadrant. Although the example shown in FIG. 8C illustrates a backwards compatible 12P system, this is merely for illustrative purposes. The present invention is not limited to the twelve primaries shown in FIG. 8C. Additionally, alternative pixel arrangements are compatible with the present invention.

Figure 9A:
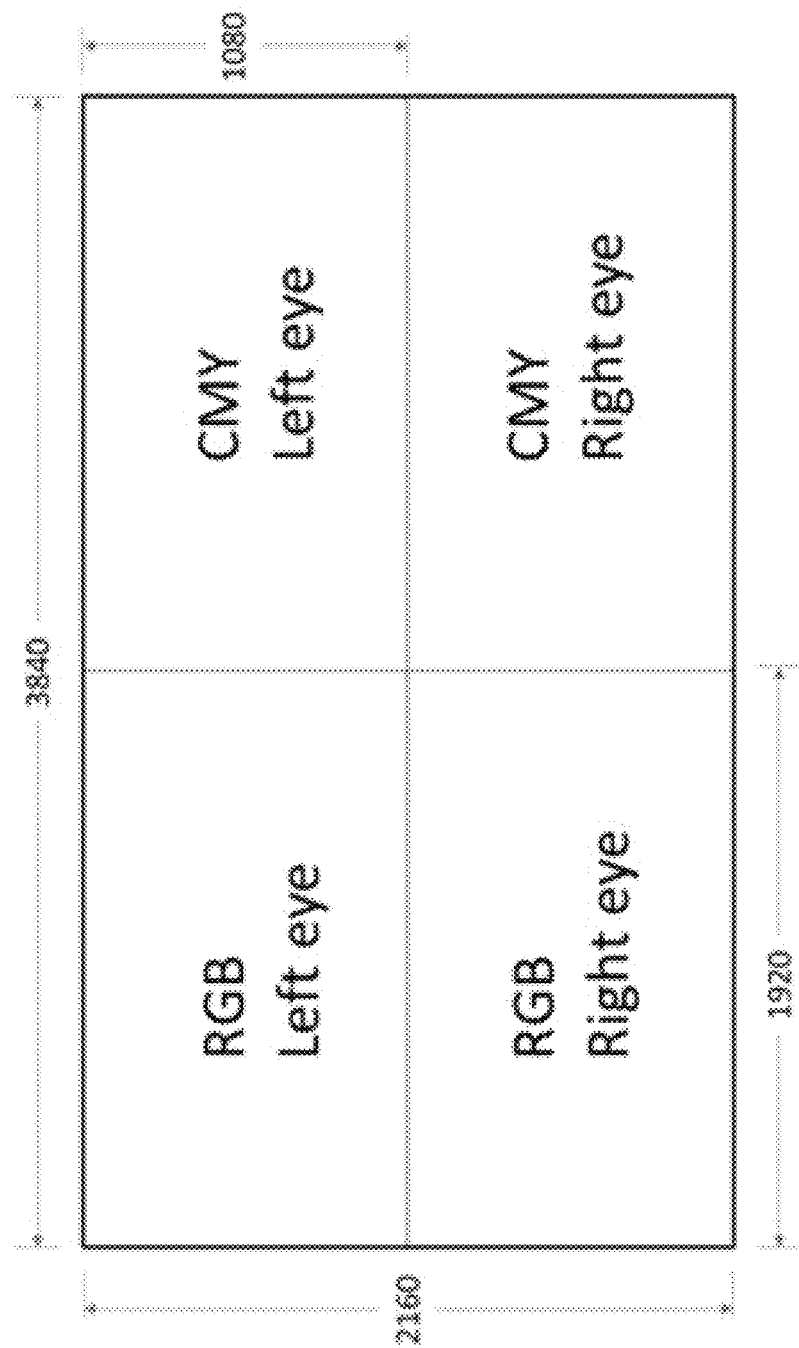
FIG. 9A illustrates an embodiment of a stereo quadrature method ("System 2A").

FIG. 9A illustrates an embodiment of a quadrature method ("System 2A") in stereo. In the example shown in FIG. 9A, a first set of three primaries (e.g., RGB) is displayed in the upper left quadrant, a second set of three primaries (e.g., CMY) is displayed in the upper right quadrant, a third set of three primaries (e.g., RGB) is displayed in the lower left quadrant, and a fourth set of three primaries (e.g., CMY) is displayed in the lower right quadrant. This embodiment allows for separation of the left eye with the first set of three primaries and the second set of three primaries and the right eye with the third set of three primaries and the fourth set of three primaries. Alternatively, a first set of three primaries (e.g., RGB) is displayed in the upper left quadrant, a second set of three primaries (e.g., RGB) is displayed in the upper right quadrant, a third set of three primaries (e.g., CMY) is displayed in the lower left quadrant, and a fourth set of three primaries (e.g., CMY) is displayed in the lower right quadrant. Alternative pixel arrangements are compatible with the present invention.

Figure 9B:
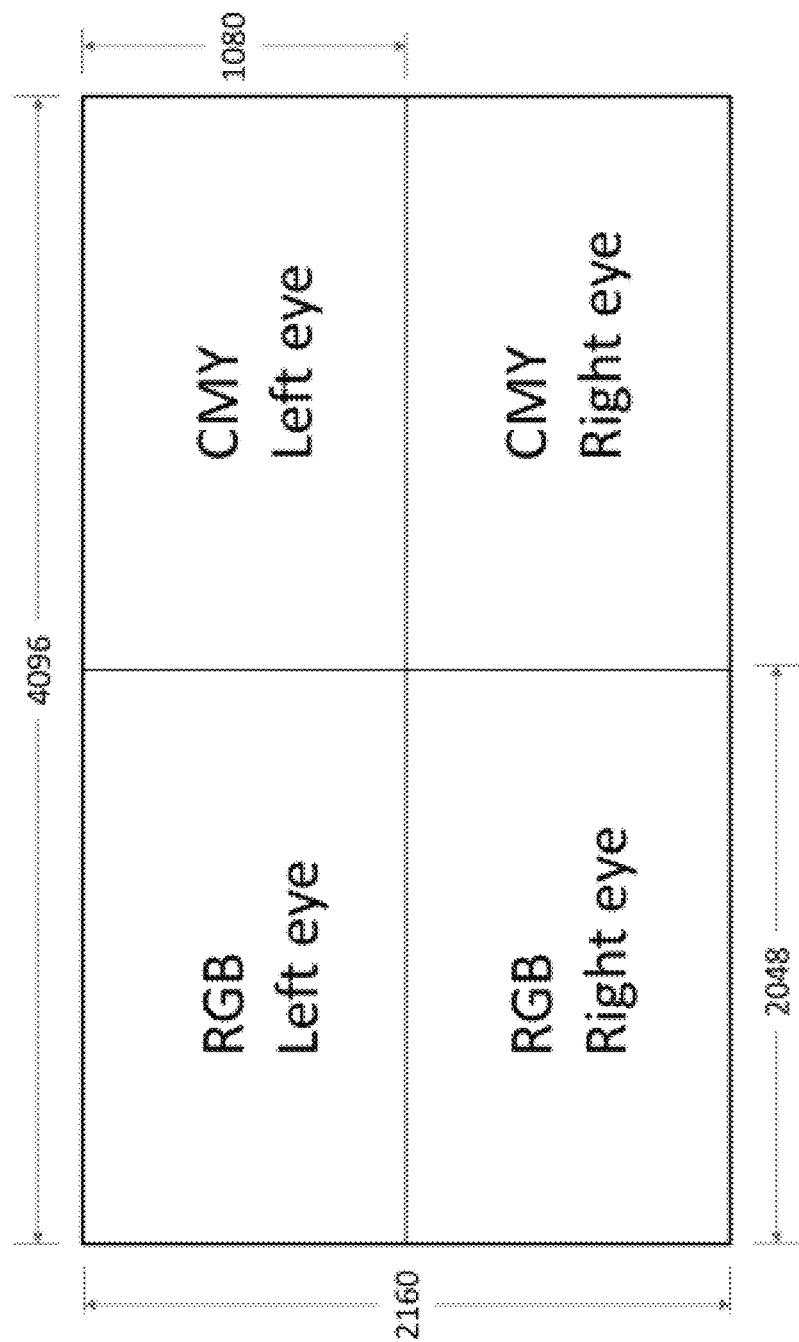
FIG. 9B illustrates another embodiment of a stereo quadrature method ("System 2A").

FIG. 9B illustrates another embodiment of a quadrature method ("System 2A") in stereo. Alternative pixel arrangements are compatible with the present invention.

Figure 9C:
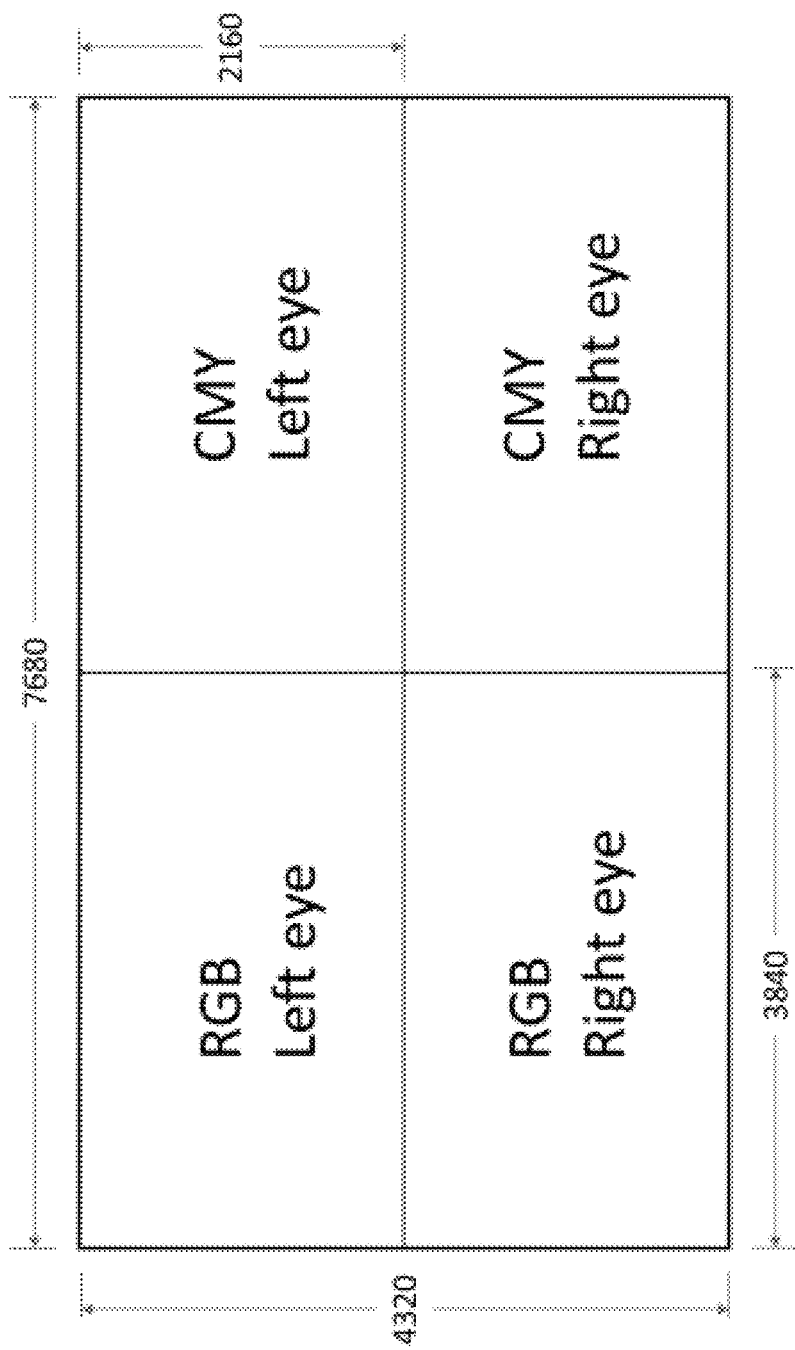
FIG. 9C illustrates yet another embodiment of a stereo quadrature method ("System 2A").

FIG. 9C illustrates yet another embodiment of a quadrature method ("System 2A") in stereo. Alternative pixel arrangements are compatible with the present invention.

Advantageously, System 2A allows for the ability to display multiple primaries (e.g., 12P and 6P) on a conventional monitor. Additionally, System 2A allows for a simplistic viewing of false color, which is useful in the production process and allows for visualizing relationships between colors. It also allows for display of multiple projectors (e.g., a first projector, a second projector, a third projector, and a fourth projector).

System 3

Figure 10:
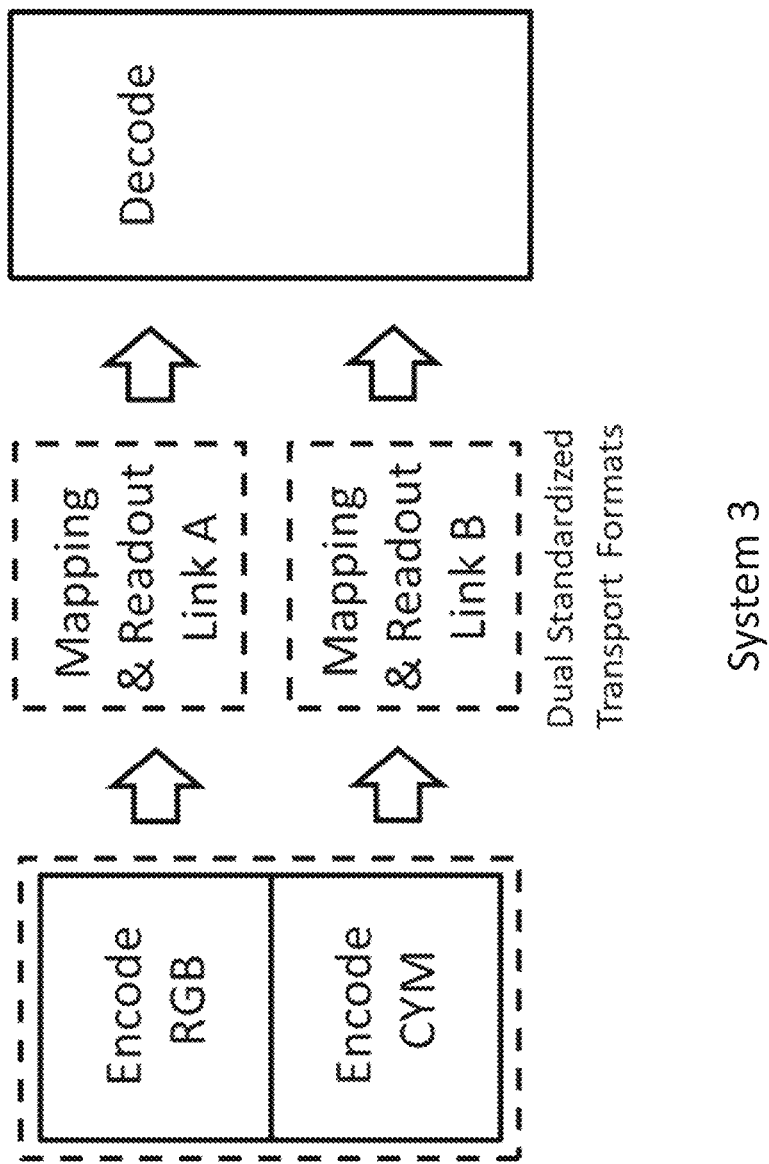
FIG. 10 illustrates one embodiment of a system encode and decode process using a dual link method ("System 3").

FIG. 10 illustrates one embodiment of a system encode and decode process using a dual link method ("System 3"). System 3 utilizes a dual link method where two wires are used. In one embodiment, RGB is sent to link A and CYM is sent to link B. After arriving at the image destination, the two links are recombined.

System 3 is simpler and more straight forward than Systems 1 and 2. The advantage with this system is that adoption is simply to format non-RGB primaries (e.g., CYM) on a second link. So, in one example, for an SDI design, RGB is sent on a standard SDI stream just as it is currently done. There is no modification to the transport and this link is operable to be sent to any RGB display requiring only the compensation for the luminance difference because the CYM components are not included. CYM data is transported in the same manner as RGB data. This data is then combined in the display to make up a 6P image. The downside is that the system requires two wires to move one image. This system is operable to work with most any format including SMPTE ST292, 424, 2082, and 2110. It also is operable to work with dual HDMI/CTA connections. In one embodiment, the system includes at least one transfer function (e.g., OETF, EOTF).

Figure 11:
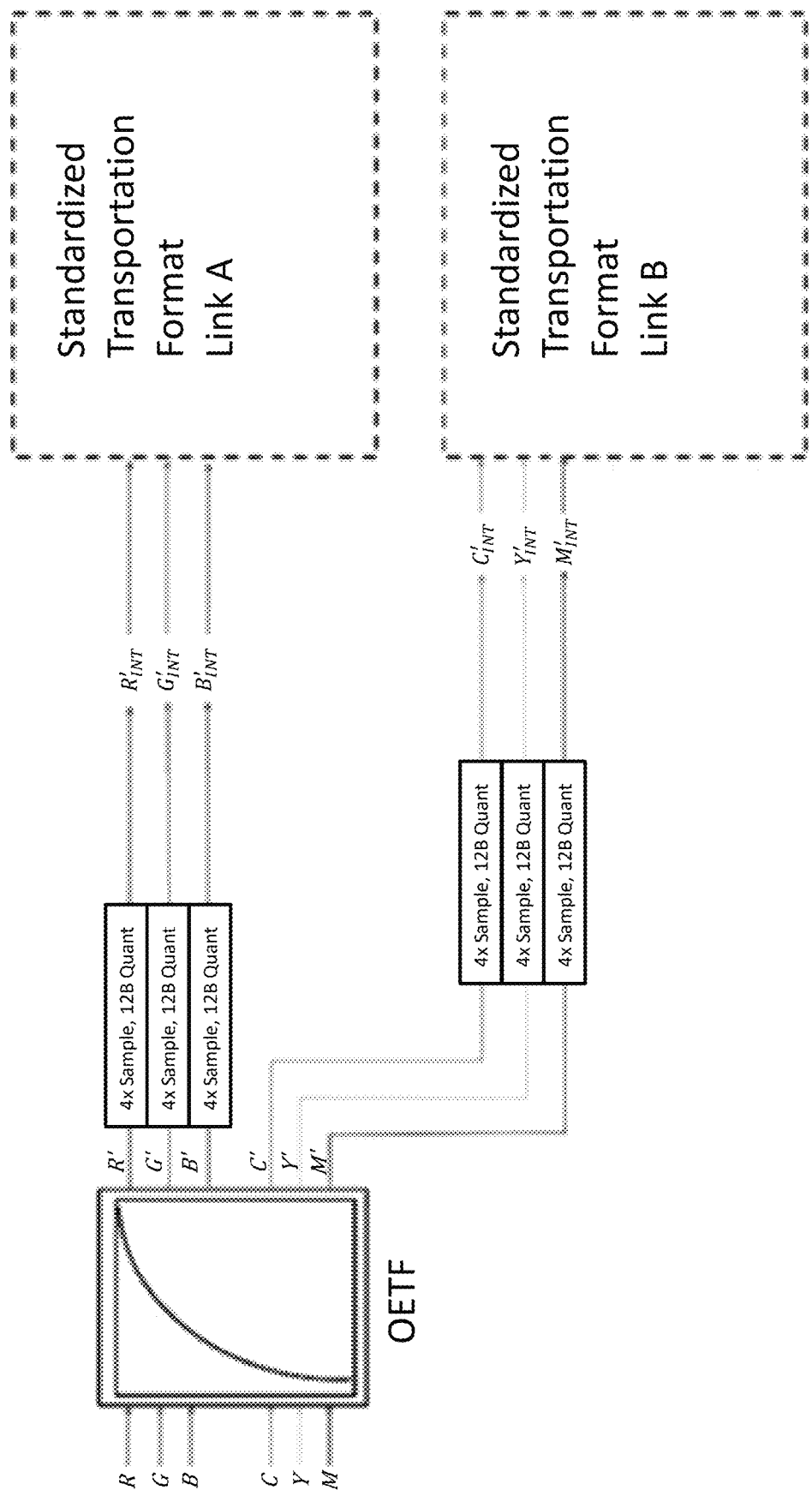
FIG. 11 illustrates one embodiment of an encoding process using a dual link method.

FIG. 11 illustrates one embodiment of an encoding process using a dual link method.

Figure 12:
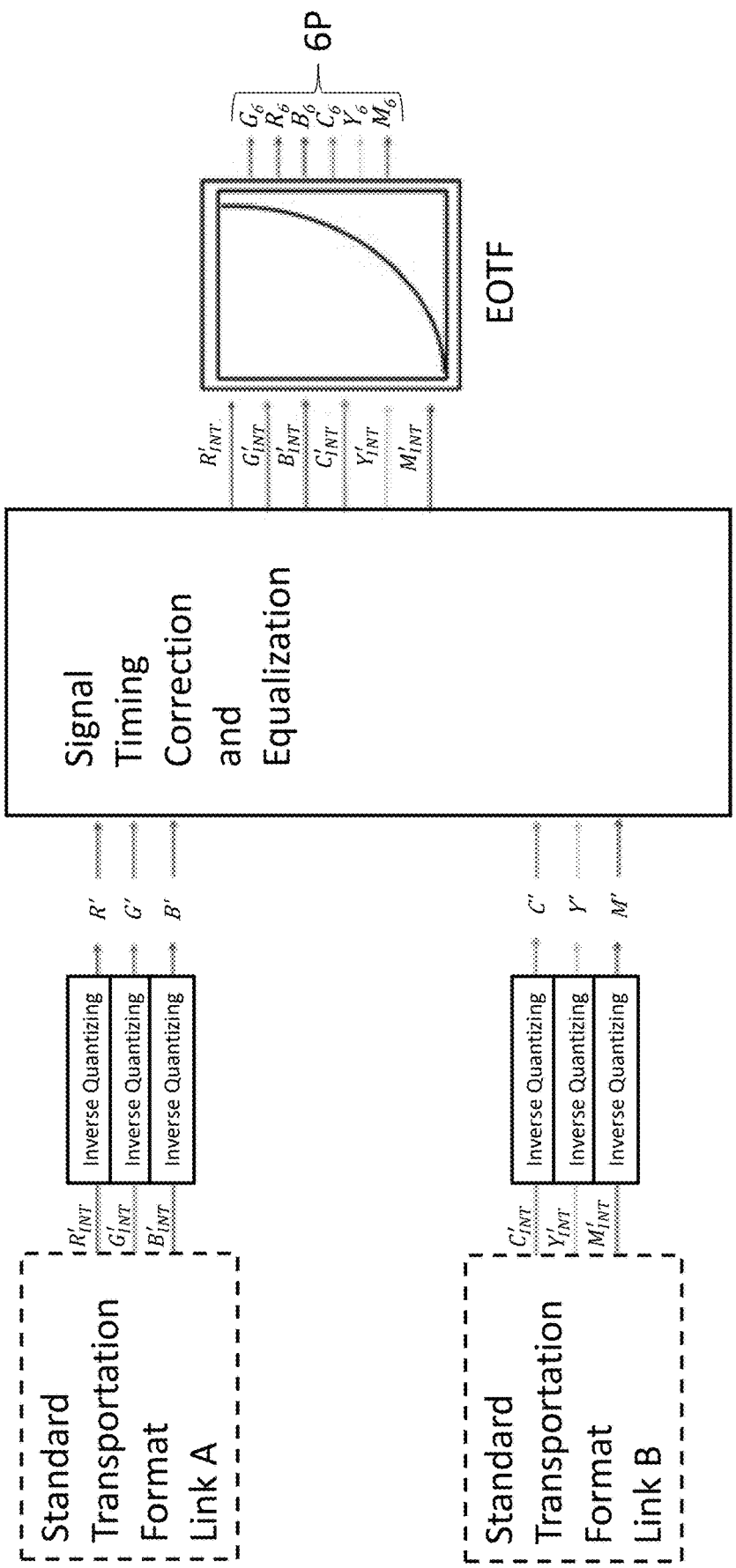
FIG. 12 illustrates one embodiment of a decoding process using a dual link method.

FIG. 12 illustrates one embodiment of a decoding process using a dual link method.

System 4

Color is generally defined by three component data levels (e.g., RGB, YCbCr). A serial data stream must accommodate a word for each color contributor (e.g., R, G, B). Use of more than three primaries requires accommodations to fit this data based on an RGB concept. This is why System 1, System 2, and System 3 use stacking, sequencing, and/or dual links. Multiple words are required to define a single pixel, which is inefficient because not all values are needed.

In a preferred embodiment, color is defined as a colorimetric coordinate. Thus, every color is defined by three words. Serial systems are already based on three color contributors (e.g., RGB). System 4 preferably uses XYZ or xyY as the three color contributors.

XYZ has been used in cinema for over 10 years. XYZ needs 16 float and 32 float encode or a minimum of 12 bits for log images for better quality. Transport of XYZ must be accomplished using a 4:4:4 sample system. Less than a 4:4:4 sample system causes loss of image detail because Y is used as a coordinate, not a value. Further, X and Z are not orthogonal to Y and, therefore, also include luminance information.

However, if Y is used as a luminance value with two independent colorimetric coordinates (e.g., x and y, u' and v', u and v, etc.) used to describe color, then a system using subsampling is possible. The system is operable to use any two independent colorimetric coordinates with similar properties to x and y, u' and v', and/or u and v. In a preferred embodiment, the two independent colorimetric coordinates are x and y and the system is an xyY system. Advantageously, the two independent colorimetric coordinates are independent of a white point. In a preferred embodiment, the image data includes a reference to at least one white point.

Current technology uses components derived from the legacy NTSC television system. Encoding described in SMPTE, ITU, and CTA standards includes methods using subsampling as 4:2:2, 4:2:0, and 4:1:1. Advantageously, this allows for color transportation of more than three primaries, including, but not limited to, at least four primaries, at least five primaries, at least six primaries, at least seven primaries, at least eight primaries, at least nine primaries, at least ten primaries, at least eleven primaries, and/or at least twelve primaries (e.g., through a SMPTE 292 or an HDMI 1.2 transport).

System 1, System 2, and System 3 use a YCbCr expansion to transport six color primary data sets, and the same transport is operable to accommodate the image information as xyY where Y is the luminance information and x,y describe CIE 1931 color coordinates in the half sample segments of the data stream (e.g., 4:2:2). Alternatively, x,y are fully sampled (e.g., 4:4:4). In yet another embodiment, the sampling rate is 4:2:0 or 4:1:1.

Advantageously, there is no need to add more channels, nor is there any need to separate the luminance information from the color components. Further, x,y have no reference to any primaries because x,y are explicit colorimetric positions. In the xyY space, x and y are chromaticity coordinates such that x and y can be used to define a gamut of visible color. Another advantage is that an image can be sent as linear (i.e., without a non-linear function applied) with a sum opto-optical transfer function (OOTF) added after the image is received, rather than requiring an OOTF within the signal. This allows for a much simpler encode and decode system.

Figure 13:
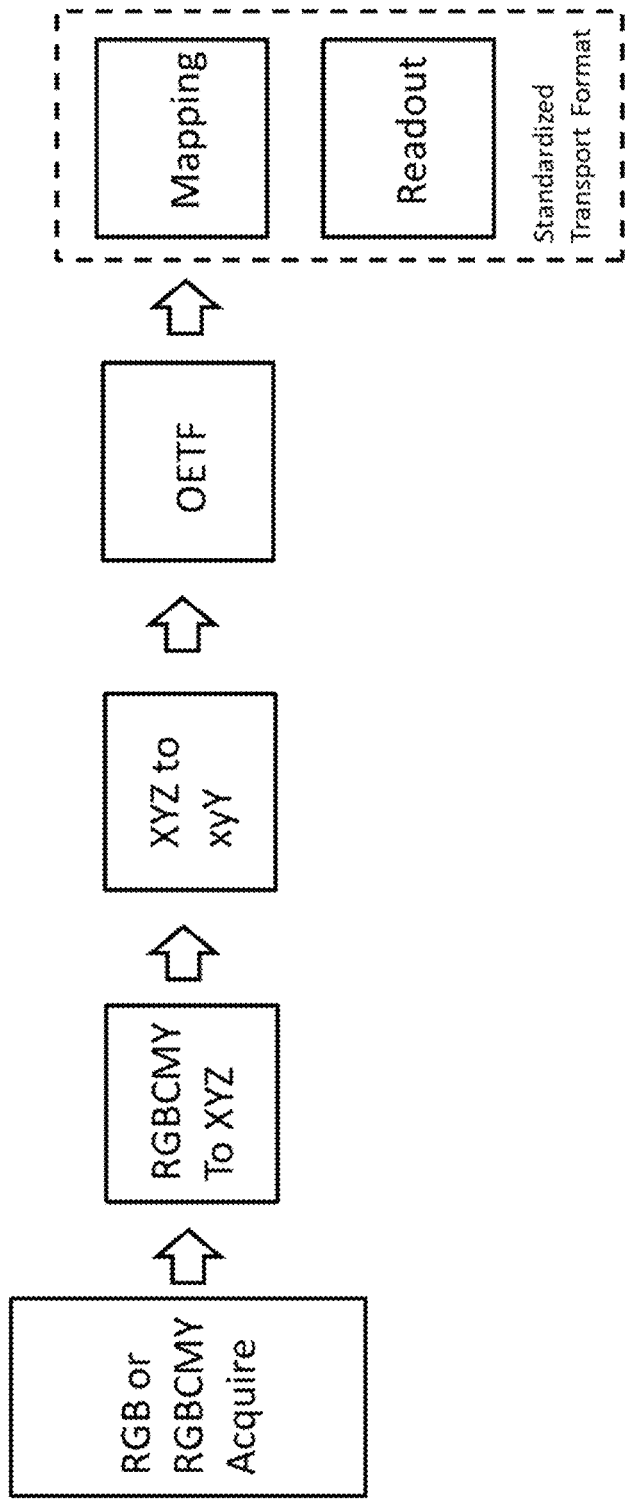
FIG. 13 illustrates one embodiment of an xyY encode with an OETF.

FIG. 13 illustrates one embodiment of an xyY encode with an OETF. Image data is acquired in any format operable to be converted to XYZ data (e.g., RGB, RGBCMY, CMYK). The XYZ data is then converted to xyY data, and the xyY data is processed through an OETF. The processed xyY data is then converted to a standardized transportation format for mapping and readout. Advantageously, x and y remain as independent colorimetric coordinates and the non-linear function (e.g., OETF, log, gamma, PQ) is only applied to Y. In one embodiment, the OETF is described in ITU-R BT.2100 or ITU-R BT.1886. Advantageously, Y is orthogonal to x and y, and remains orthogonal to x and y even when a non-linear function is applied.

There are many different RGB sets so the matrix used to convert the image data from a set of RGB primaries to XYZ will involve a specific solution given the RGB values:

$$\begin{bmatrix} X \\ Y \\ Z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix}$$

In an embodiment where the image data is 6P-B data, the following equation is used to convert to XYZ data:

$$\begin{bmatrix} X \\ Y \\ Z \end{bmatrix} = \begin{bmatrix} 0.4124000 & 0.3576000 & 0.1805000 & 0.1574900 & 0.3427600 & 0.4502060 \\ 0.2126000 & 0.7152000 & 0.0721998 & 0.3132660 & 0.1347200 & 0.5520130 \\ 0.0193001 & 0.1192000 & 0.9505000 & 0.4814200 & 0.5866620 & 0.0209755 \end{bmatrix} \begin{bmatrix} R \\ G \\ B \\ C \\ M \\ Y \end{bmatrix}_{6P-B}$$

In an embodiment where the image data is 6P-C data with a D60 white point, the following equation is used to convert to XYZ data:

$$\begin{bmatrix} X \\ Y \\ Z \end{bmatrix}_{D60_{ACES}} = \begin{bmatrix} 050836664 & 0.26237069 & 0.18337670 & 0.15745217 & 0.36881328 & 0.42784843 \\ 0.23923145 & 068739938 & 007336917 & 033094114 & 014901541 & 052004327 \\ -0.0001363 & 004521596 & 096599714 & 047964602 & 052900498 & 000242485 \end{bmatrix}$$

In an embodiment where the image data is 6P-C data with a D65 white point, the following equation is used to convert to XYZ data:

$$\begin{bmatrix} X \\ Y \\ Z \end{bmatrix}_{D65} =$$

$$\begin{bmatrix} 0.48657095 & 0.26566769 & 0.19821729 & 0.32295962 & -0.54969800 & 1.177199435 \\ 022897456 & 069173852 & 007928691 & 067867175 & -022203240 & 0543360700 \\ 000000000 & 004511338 & 104394437 & 098336936 & -078858190 & 0894270250 \end{bmatrix}$$

$$\begin{bmatrix} R \\ G \\ B \\ C \\ M \\ Y \end{bmatrix}_{6P-C_{refD65}}$$

To convert the XYZ data to xyY data, the following equations are used:

$$Y = Y \quad x = \frac{X}{(X+Y+Z)} \quad y = \frac{Y}{(X+Y+Z)}$$

Figure 14:
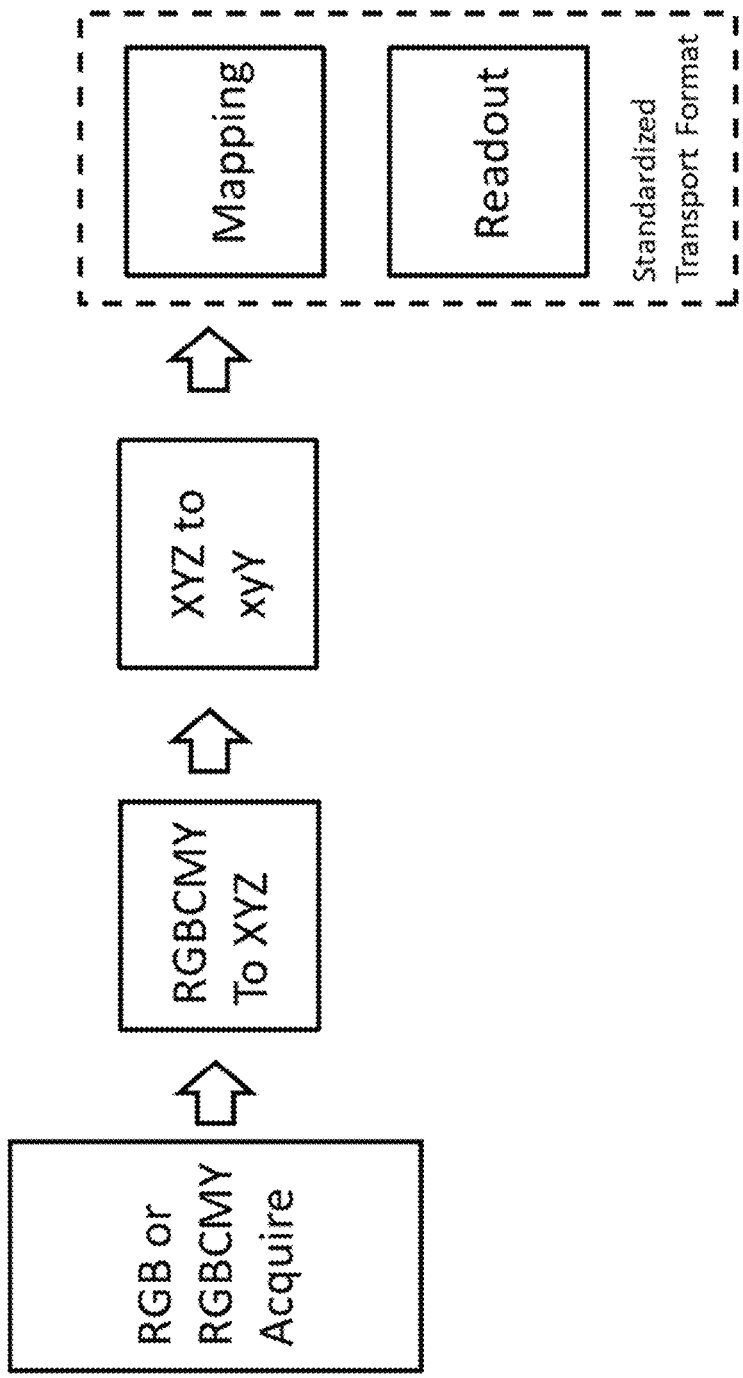
FIG. 14 illustrates one embodiment of an xyY encode without an OETF.

FIG. 14 illustrates one embodiment of an xyY encode without an OETF. Image data is acquired in any format operable to be converted to XYZ data (e.g., RGB, RGBCMY, CMYK). The XYZ data is then converted to xyY data, and then converted to a standardized transportation format for mapping and readout.

Figure 15:
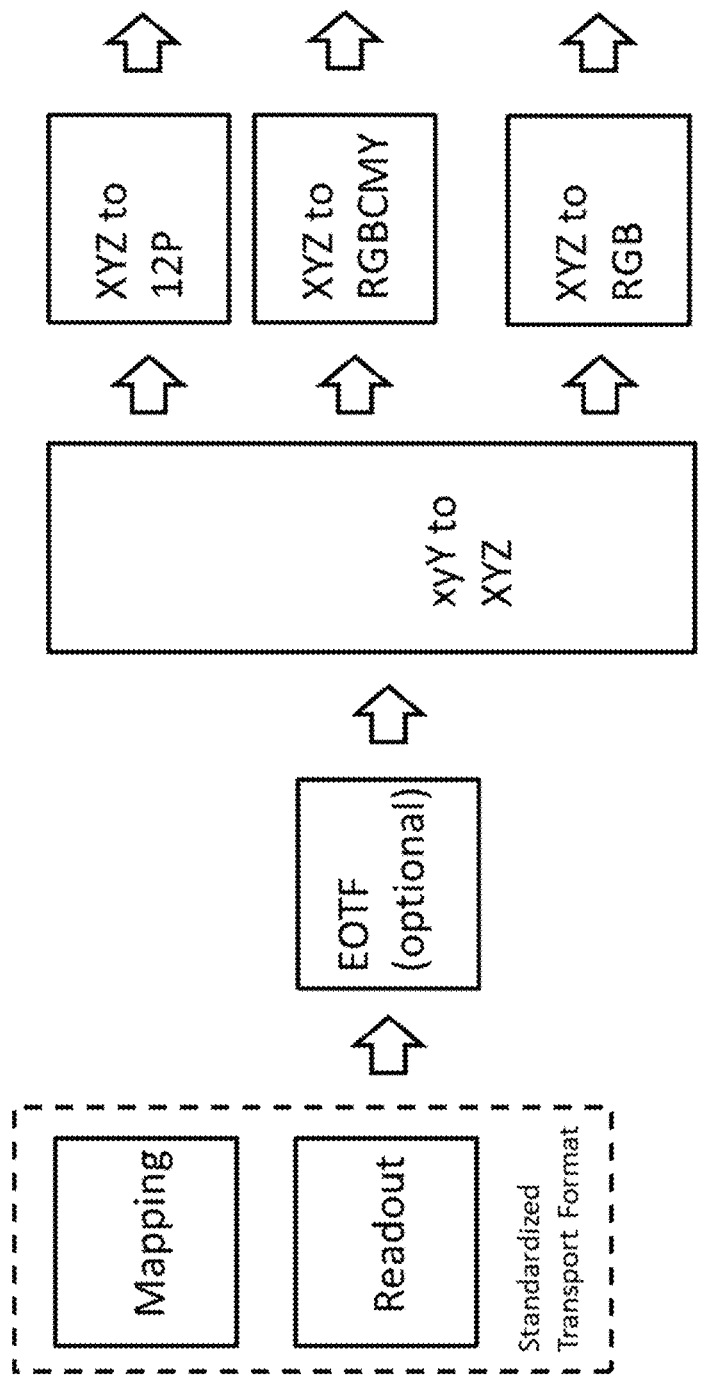
FIG. 15 illustrates one embodiment of an xyY decode with an electro-optical transfer function (EOTF).

FIG. 15 illustrates one embodiment of an xyY decode with an electro-optical transfer function (EOTF). After mapping and readout, the data is processed through an EOTF to yield the xyY data. The xyY data is then converted back to the XYZ data. The XYZ data is operable to be converted to multiple data formats including, but not limited to, RGB, CMYK, 6P (e.g., 6P-B, 6P-C), and gamuts including at least four primaries through at least twelve primaries. Finally, the XYZ data must converted to the correct standard color space.

To convert the xyY data to the XYZ data, the following equations are used:

$$Y = Y \quad X = \left(\frac{x}{y}\right)Y \quad Z = \left(\frac{(1-x-y)}{y}\right)Y$$

Figure 16:
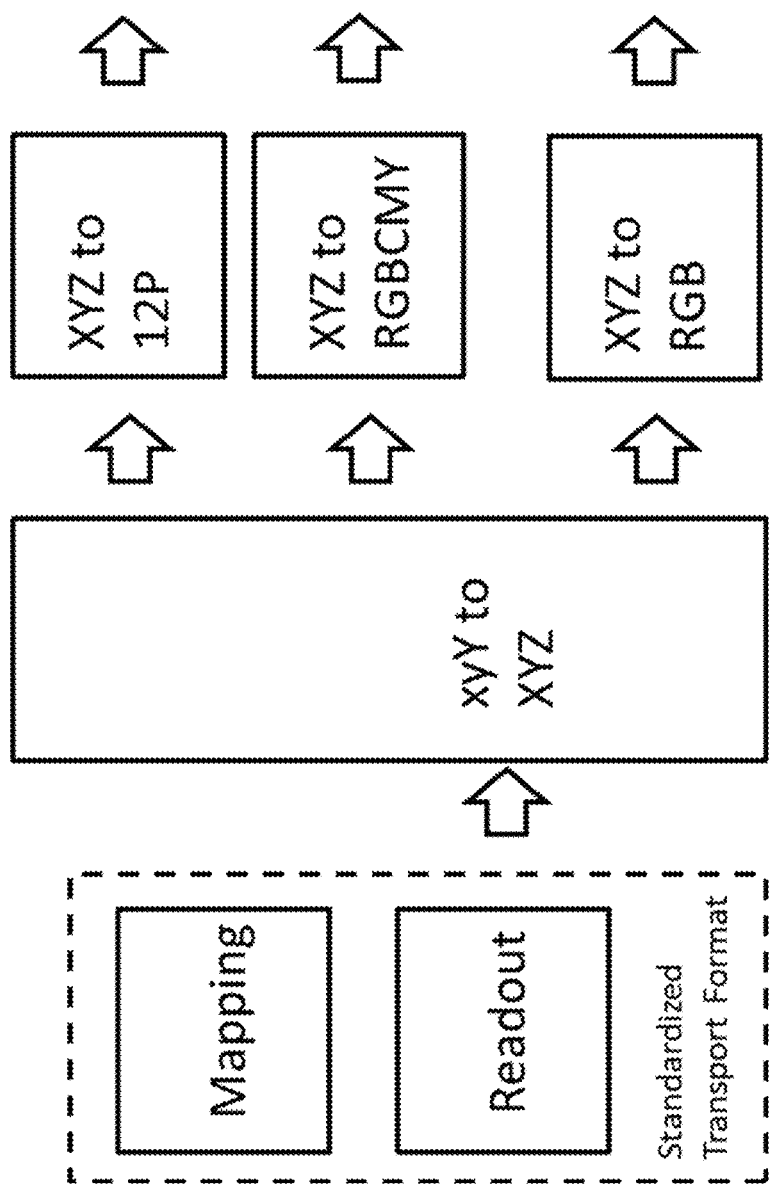
FIG. 16 illustrates one embodiment of an xyY decode without an EOTF.

FIG. 16 illustrates one embodiment of an xyY decode without an EOTF. After mapping and readout, the xyY data is then converted to the XYZ data. The XYZ data is operable to be converted to multiple data formats including, but not limited to, RGB, CMYK, 6P (e.g., 6P-B, 6P-C), and gamuts including at least four primaries through at least twelve primaries.

Figure 17:
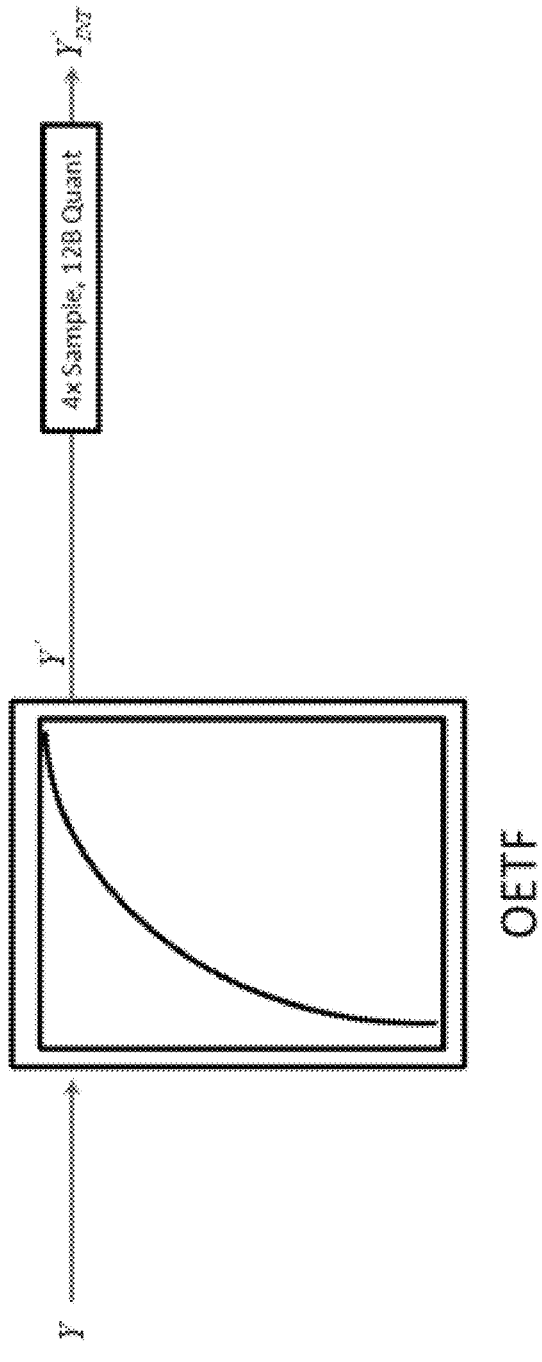
FIG. 17 illustrates one embodiment of a 4:2:2 xyY encode with an OETF.
Figure 17:
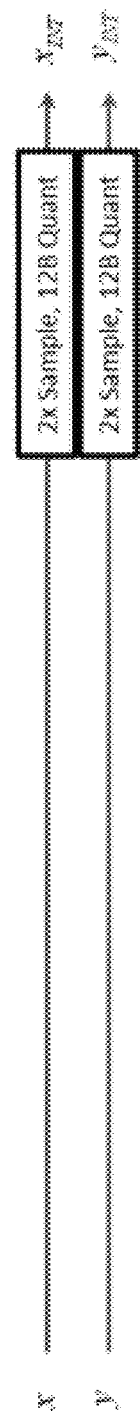

FIG. 17 illustrates one embodiment of a 4:2:2 xyY encode with an OETF. A full bandwidth luminance channel (Y) is used to carry image detail and the remaining color coordinate components (e.g., x,y) are half sampled. In the example shown in FIG. 17, the xyY data undergoes a 4:2:2 encode. Other encoding methods (e.g., 4:4:4, 4:2:0, 4:1:1) are compatible with the present invention. Other quantization methods and bit depths are also compatible with the present invention. In one embodiment, the bit depth is 8 bits, 10 bits, 12 bits, 14 bits, and/or 16 bits. In one embodiment, the xyY values are sampled as floats.

Figure 18:
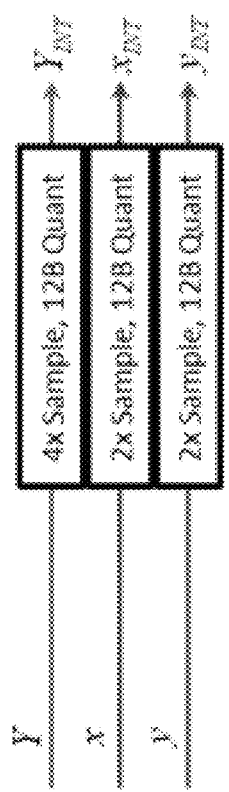
FIG. 18 illustrates one embodiment of a 4:2:2 xyY encode without an OETF.

FIG. 18 illustrates one embodiment of a 4:2:2 xyY encode without an OETF. In the example shown in FIG. 18, the xyY data undergoes a 4:2:2 encode. Other encoding methods (e.g., 4:4:4, 4:2:0, 4:1:1) are compatible with the present invention.

Figure 19:
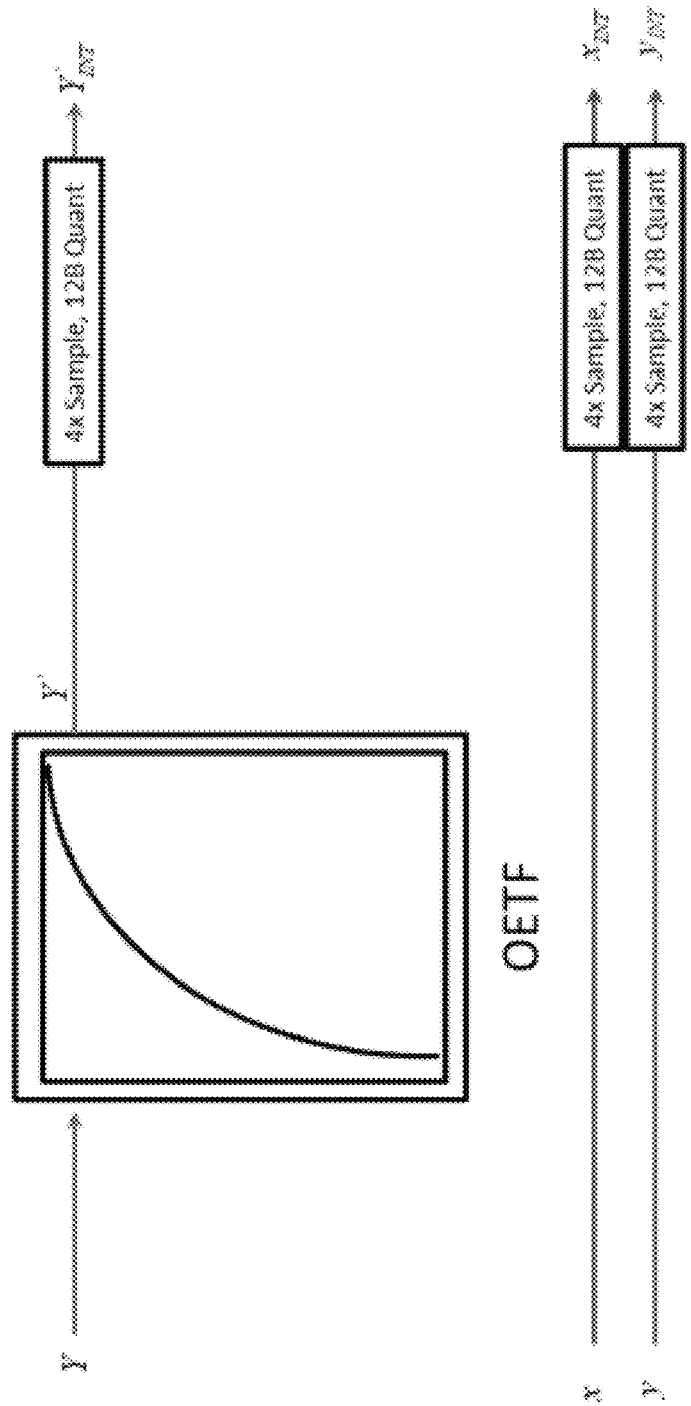
FIG. 19 illustrates one embodiment of a 4:4:4 xyY encode with an OETF.

FIG. 19 illustrates one embodiment of a 4:4:4 xyY encode with an OETF. A full bandwidth luminance channel (Y) is used to carry image detail and the remaining color coordinate components (e.g., x,y) are also fully sampled. In the example shown in FIG. 19, the xyY data undergoes a 4:4:4 encode. Other encoding methods (e.g., 4:2:2, 4:2:0, 4:1:1) are compatible with the present invention.

Figure 20:
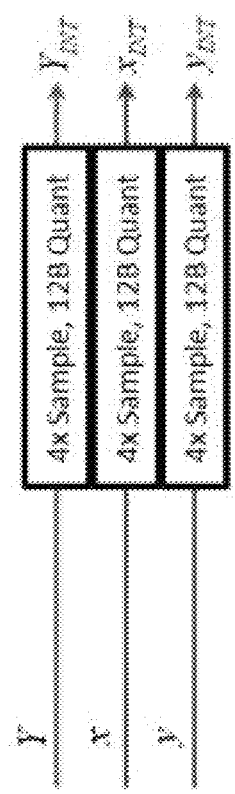
FIG. 20 illustrates one embodiment of a 4:4:4 xyY encode without an OETF.

FIG. 20 illustrates one embodiment of a 4:4:4 xyY encode without an OETF. In the example shown in FIG. 20, the xyY data undergoes a 4:4:4 encode. Other encoding methods (e.g., 4:2:2, 4:2:0, 4:1:1) are compatible with the present invention.

Figure 21:
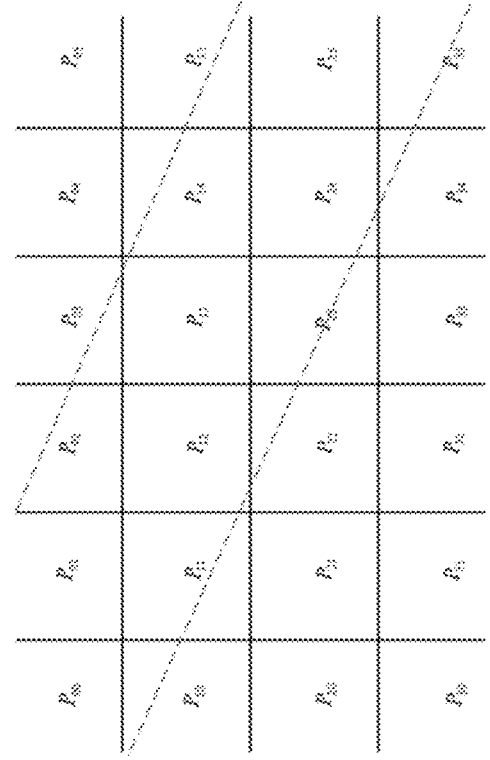
FIG. 21 illustrates sample placements of xyY system components for a 4:2:2 pixel mapping.

FIG. 21 illustrates sample placements of xyY system components for a 4:2:2 pixel mapping. A plurality of pixels (e.g., $P_{00}$-$P_{35}$) is shown in FIG. 21. The first subscript number refers to a row number and the second subscript number refers to a column number. For pixel $P_{00}$, $Y'_{INT00}$ is the luma and the color components are $x_{INT00}$ and $y_{INT00}$. For pixel $P_{01}$, $Y'_{INT01}$ is the luma. For pixel $P_{10}$, $Y'_{INT10}$ is the luma and the color components are $x_{INT10}$ and $y_{INT10}$. For pixel $P_1$, $Y'_{INT11}$ is the luma. In one embodiment, the luma and the color components (e.g., the set of image data) corresponding to a particular pixel (e.g., $P_{00}$) is used to calculate color and brightness of subpixels. Although the example shown in FIG. 21 includes luma, it is equally possible that the data is sent linearly as luminance (e.g., $Y'_{INT00}$).

Figure 22:
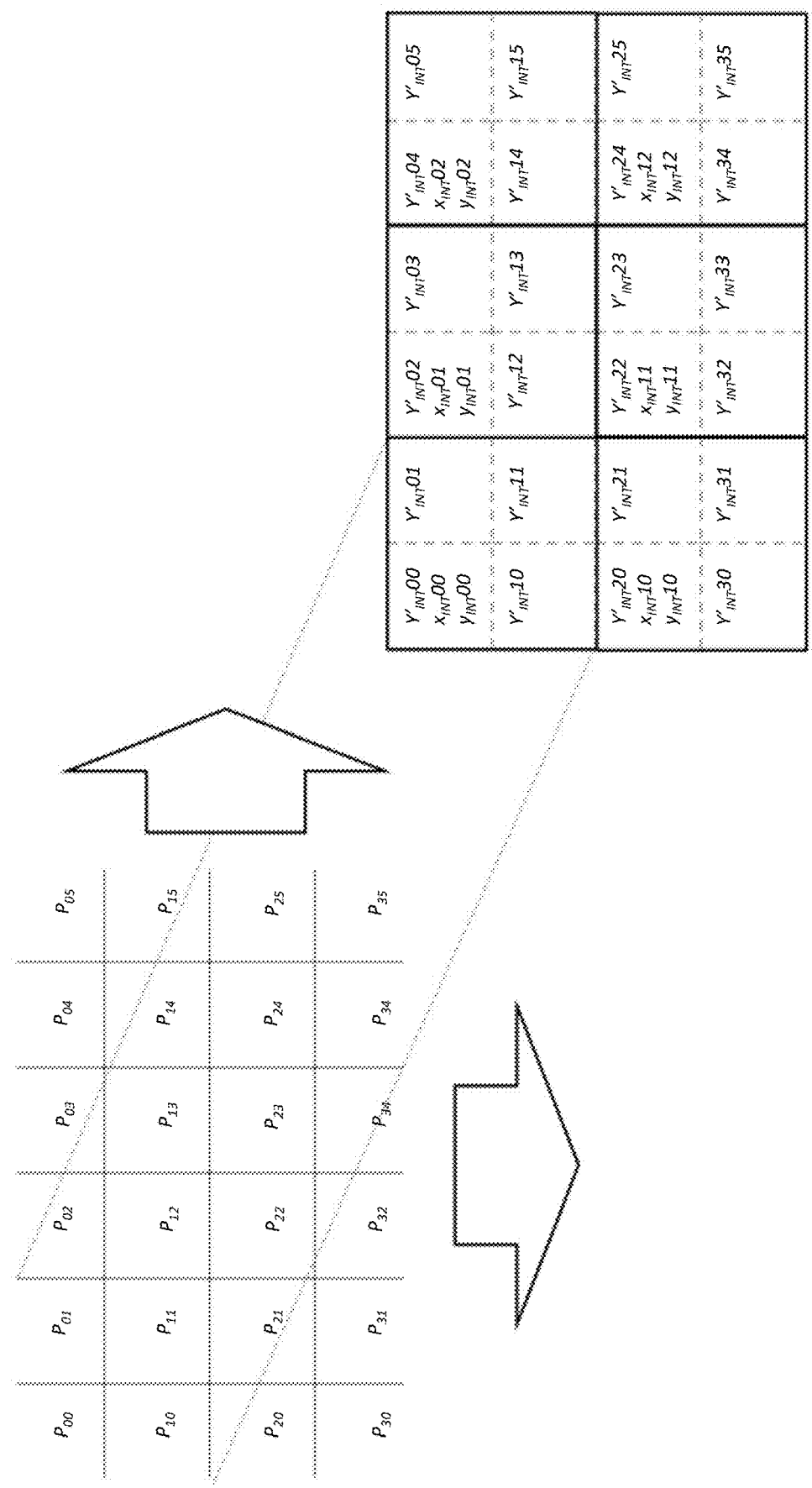
FIG. 22 illustrates sample placements of xyY system components for a 4:2:0 pixel mapping.

FIG. 22 illustrates sample placements of xyY system components for a 4:2:0 pixel mapping. A plurality of pixels (e.g., $P_{00}$-$P_{35}$) is shown in FIG. 22. The first subscript number refers to a row number and the second subscript number refers to a column number. For pixel $P_{00}$, $Y'_{INT00}$ is the luma and the color components are $x_{INT00}$ and $y_{INT00}$. For pixel $P_{01}$, $Y'_{INT01}$ is the luma. For pixel $P_{10}$, $Y'_{INT10}$ is the luminance. For pixel $P_1$, $Y'_{INT11}$ is the luma. In one embodiment, the luma and the color components corresponding to a particular pixel (e.g., $P_{00}$) is used to calculate color and brightness of subpixels. Although the example shown in FIG. 22 includes luma, it is equally possible that the data is sent linearly as luminance (e.g., $Y_{INT00}$).

In one embodiment, the set of image data includes pixel mapping data. In one embodiment, the pixel mapping data includes a subsample of the set of values in xyY color space (e.g., 4:2:2). In one embodiment, the pixel mapping data includes an alignment of the set of values in xyY color space.

Table 7 illustrates mapping to SMPTE 52110 for 4:2:2 sampling. Table 8 illustrates mapping to SMPTE 52110 for 4:4:4 linear and non-linear sampling.

Advantageously, XYZ is used as the basis of ACES for cinematographers and allows for the use of colors outside of the ITU-R BT.709 and/or the P3 color spaces. Further, XYZ is used for other standards (e.g., JPEG 2000, Digital Cinema Initiatives (DCI)), which could be easily adapted for System 4.

In one embodiment, the image data converter includes at least one look-up table (LUT). In one embodiment, the at least one look-up table maps out of gamut colors to zero. In one embodiment, the at least one look-up table maps out of gamut colors to a periphery of visible colors.

Transfer Functions

The system design minimizes limitations to use standard transfer functions for both encode and/or decode processes. Current practices used in standards include, but are not limited to, ITU-R BT.1886, ITU-R BT.2020, SMPTE ST274, SMPTE ST296, SMPTE ST2084, and ITU-R BT.2100. These standards are compatible with this system and require no modification.

Encoding and decoding 6P images is formatted into several different configurations to adapt to image transport frequency limitations. The highest quality transport is obtained by keeping all components as RGBCMY components. This uses the highest sampling frequencies and requires the most signal bandwidth. An alternate method is

TABLE 7

| Sampling | Bit Depth | pgroup octets | pgroup pixels | Y PbPr Sample Order | xyY |
|---|---|---|---|---|---|
| 4:2:2 | 8 | 8 | 2 | $C_B'$, Y0', $C_R'$, Y1' | y0, Y0', x0, y1, Y1', x1 |
|  | 10 | 10 | 2 | $C_B'$, Y0', $C_R'$, Y1' | y0, Y0', x0, y1, Y1', x1 |
|  | 12 | 12 | 2 | $C_B'$, Y0', $C_R'$, Y1' | y0, Y0', x0, y1, Y1', x1 |
|  | 16, 16f | 16 | 2 | $C'_B$, Y0', $C'_R$, Y'1 | y0, Y0', x0, y1, Y1', x1 |

TABLE 8

| Sampling | Bit Depth | pgroup octets | pgroup pixels | RGB/XYZ Sample Order | xyY |
|---|---|---|---|---|---|
| 4:4:4 Linear | 8 | 3 | 1 | R, G, B | x, Y', y |
|  | 10 | 15 | 4 | R0, G0, B0, R1, G1, B1, R2, G2, B2 | x, Y0', y, x, Y1', y, x, Y2', y |
|  | 12 | 9 | 2 | R0, G0, B0, R1, G1, B1 | x, Y0', y, x, Y1', y |
|  | 16, 16f | 6 | 1 | R, G, B | x, Y', y |
| 4:4:4 Non-Linear | 8 | 3 | 1 | R', G', B' | x, Y', y |
|  | 10 | 15 | 4 | R0', G0', B0', R1', G1', B1', R2', G2', B2' | x, Y0', y, x, Y1', y, x, Y2', y |
|  | 12 | 9 | 2 | R0', G0', B0', R1', G1', B1' | x, Y0', y, x, Y1', y |
|  | 16, 16f | 6 | 1 | R', G', B' | x, Y', y |

Figure 23:
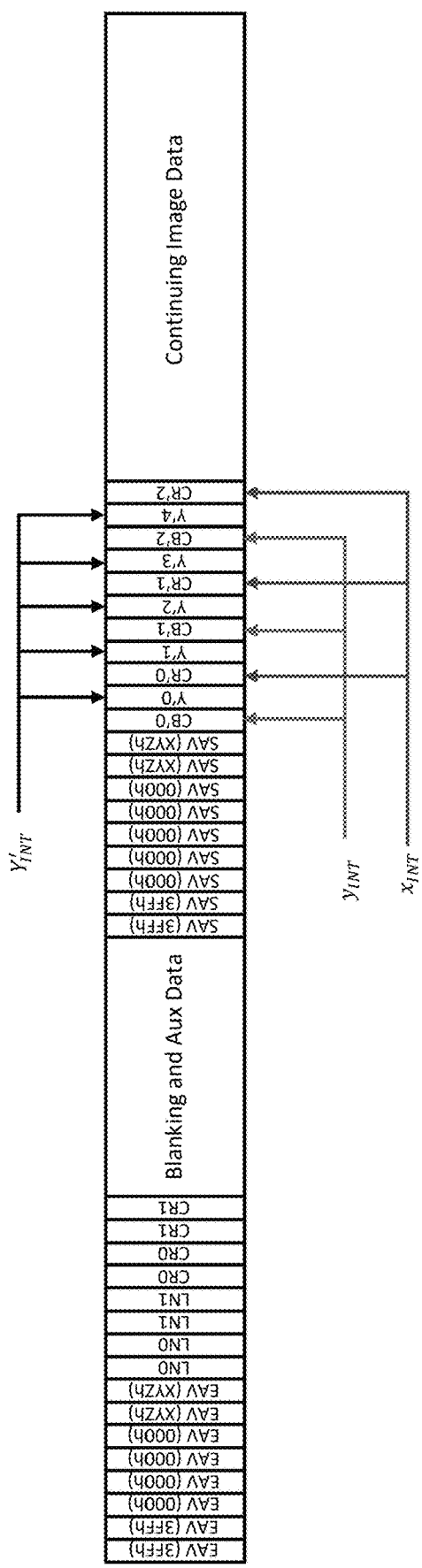
FIG. 23 illustrates one embodiment of a SMPTE ST292 xyY system mapping.

FIG. 23 illustrates one embodiment of a SMPTE ST292 xyY system mapping. To fit an xyY system into a SMPTE ST292 stream involves the following substitutions: $Y'_{INT}$ is placed in the Y data segments, $x_{INT}$ is placed in the Cr data segments, and $y_{INT}$ is placed in the Cb data segments.

Figure 24:
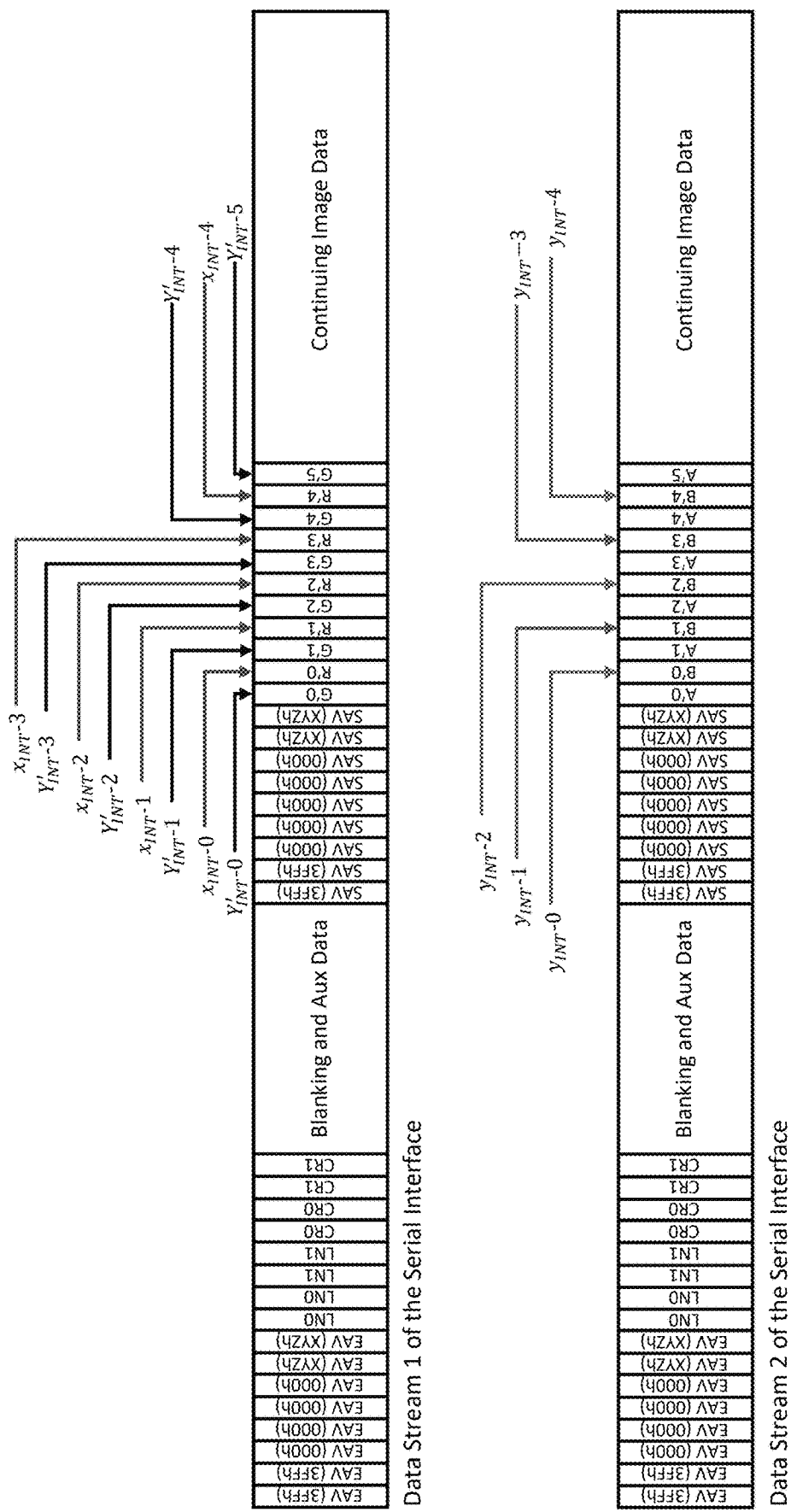
FIG. 24 illustrates one embodiment of a SMPTE ST2082 xyY system mapping.

FIG. 24 illustrates one embodiment of a SMPTE ST2082 xyY system mapping. To fit an xyY system into a SMPTE ST292 stream involves the following substitutions: $Y'_{INT}$ is placed in the G data segments, $x_{INT}$ is placed in the R data segments, and $y_{INT}$ is placed in the B data segments.

Figure 25:
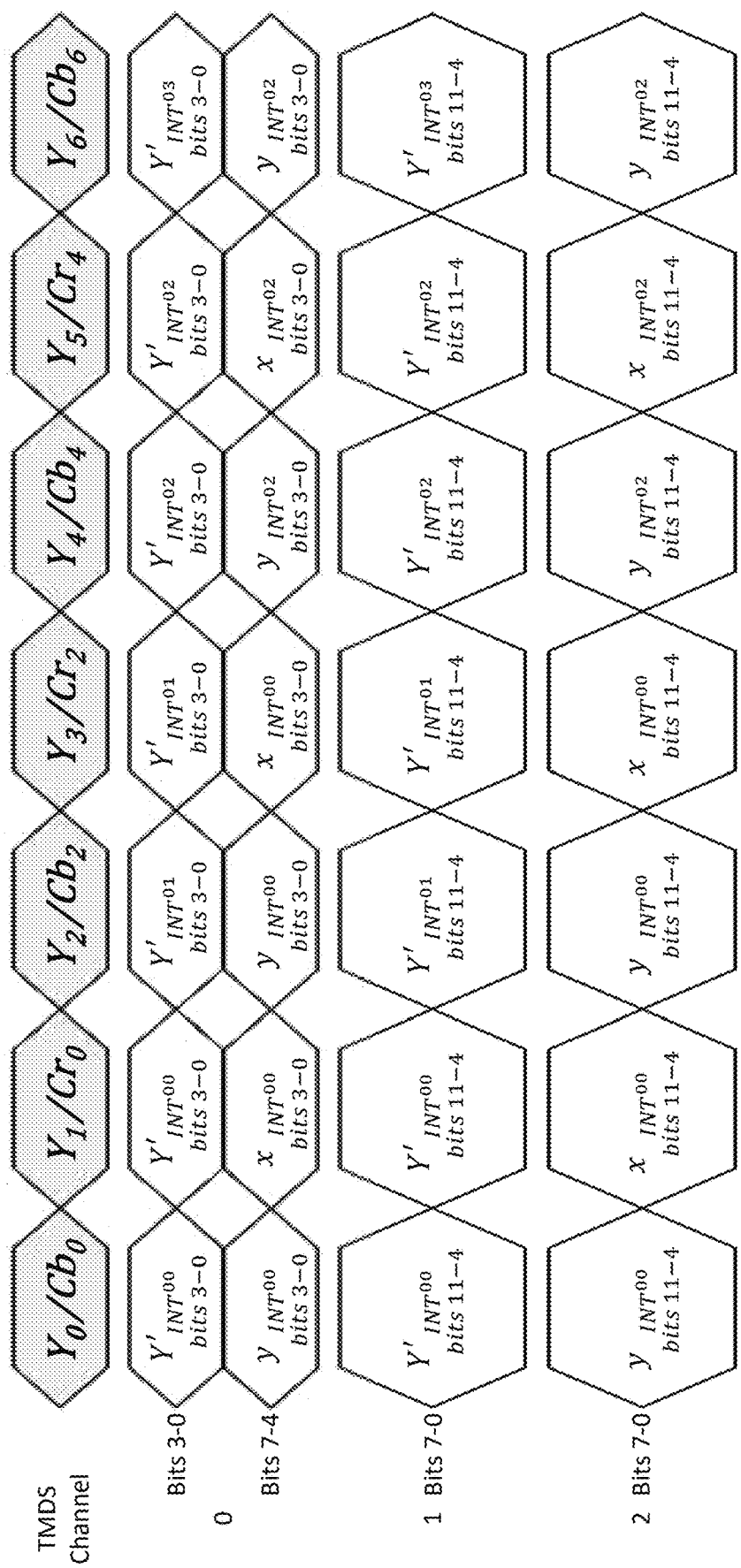
FIG. 25 illustrates one embodiment of xyY inserted into a CTA 861 stream.

FIG. 25 illustrates one embodiment of xyY inserted into a CTA 861 stream.

Figure 26:
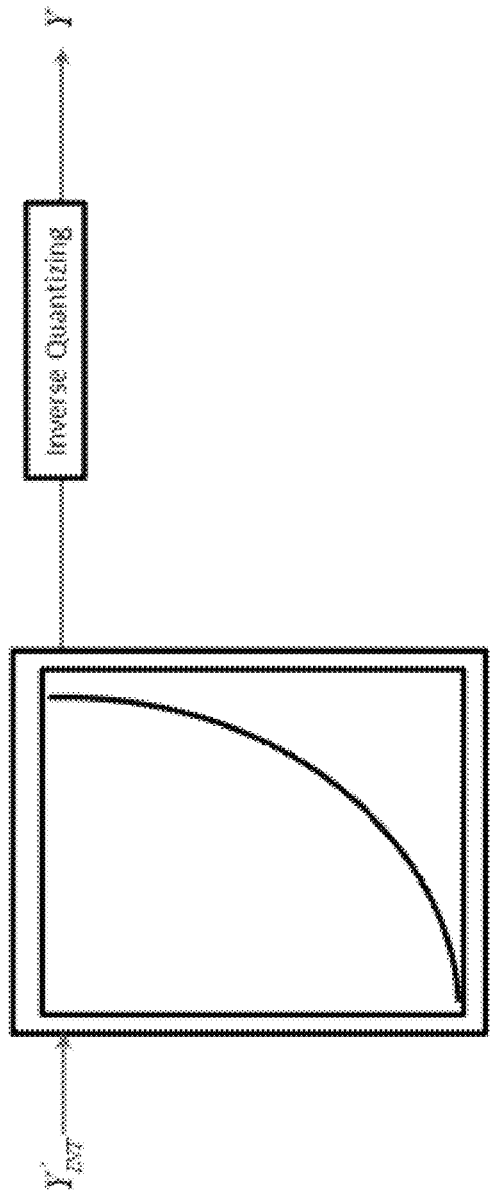
FIG. 26 illustrates one embodiment of an xyY decode with an EOTF.
Figure 26:
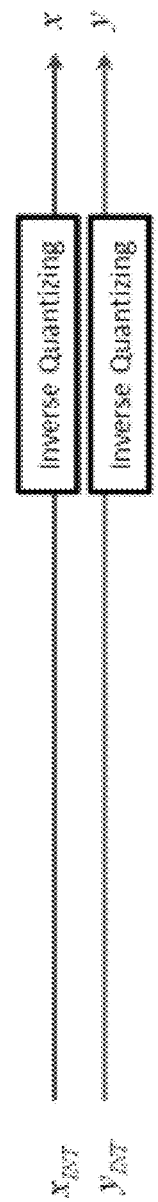

FIG. 26 illustrates one embodiment of an xyY decode with an EOTF.

Figure 27:
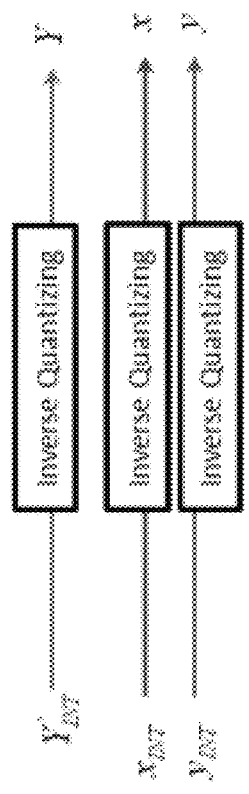
FIG. 27 illustrates one embodiment of an xyY decode without an EOTF.

FIG. 27 illustrates one embodiment of an xyY decode without an EOTF.

to sum the image details in a luminance channel at full bandwidth and then send the color difference signals at half or quarter sampling (e.g., Y Cr Cb Cc Cy). This allows a similar image to pass through lower bandwidth transports.

An IPT system is a similar idea to the xyY system with several exceptions. An IPT system or an $IC_TC_P$ system is still an extension of XYZ and is operable to be derived from RGB and RGBCMY color coordinates. An IPT color description can be substituted within a 4:4:4 sampling structure, but XYZ has already been established and does not require the same level of calculations. For an $IC_TC_P$ transport system, similar substitutions can be made. However, both substitution systems are limited in that an OOTF is contained in all three components.

For transport, simple substitutions can be made using the foundation of what is described with transport of XYZ for the use of IPT in current systems as well as the current standards used for $IC_TC_P$.

Figure 28A:
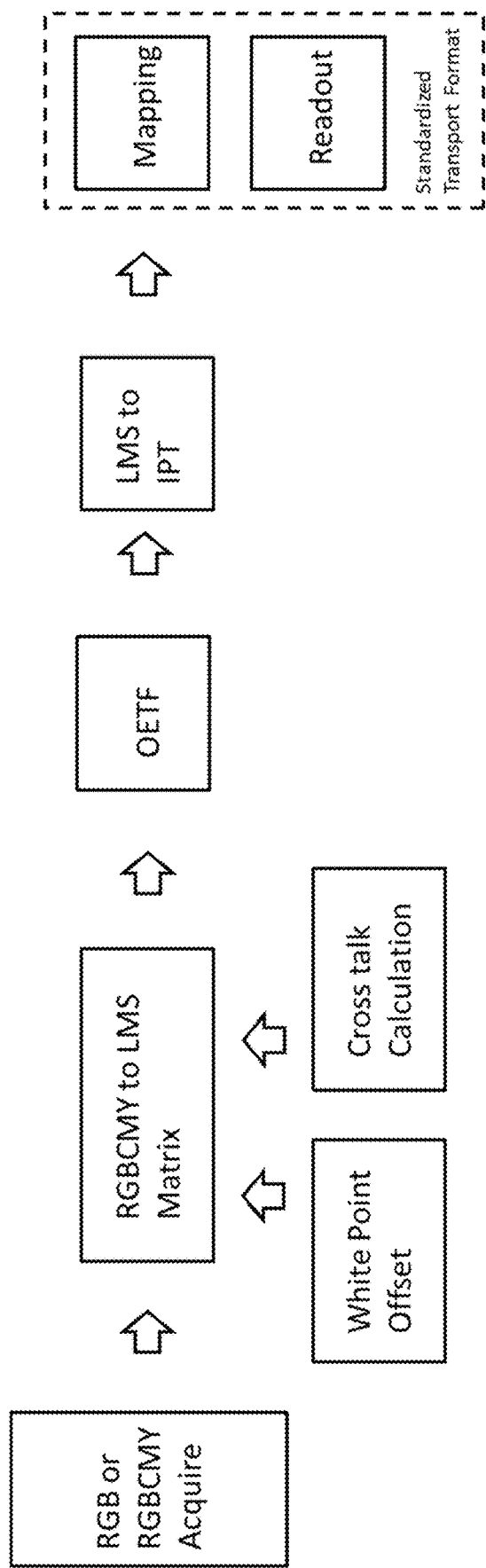
FIG. 28A illustrates one embodiment of an IPT 4:4:4 encode.

FIG. 28A illustrates one embodiment of an IPT 4:4:4 encode.

Figure 28B:
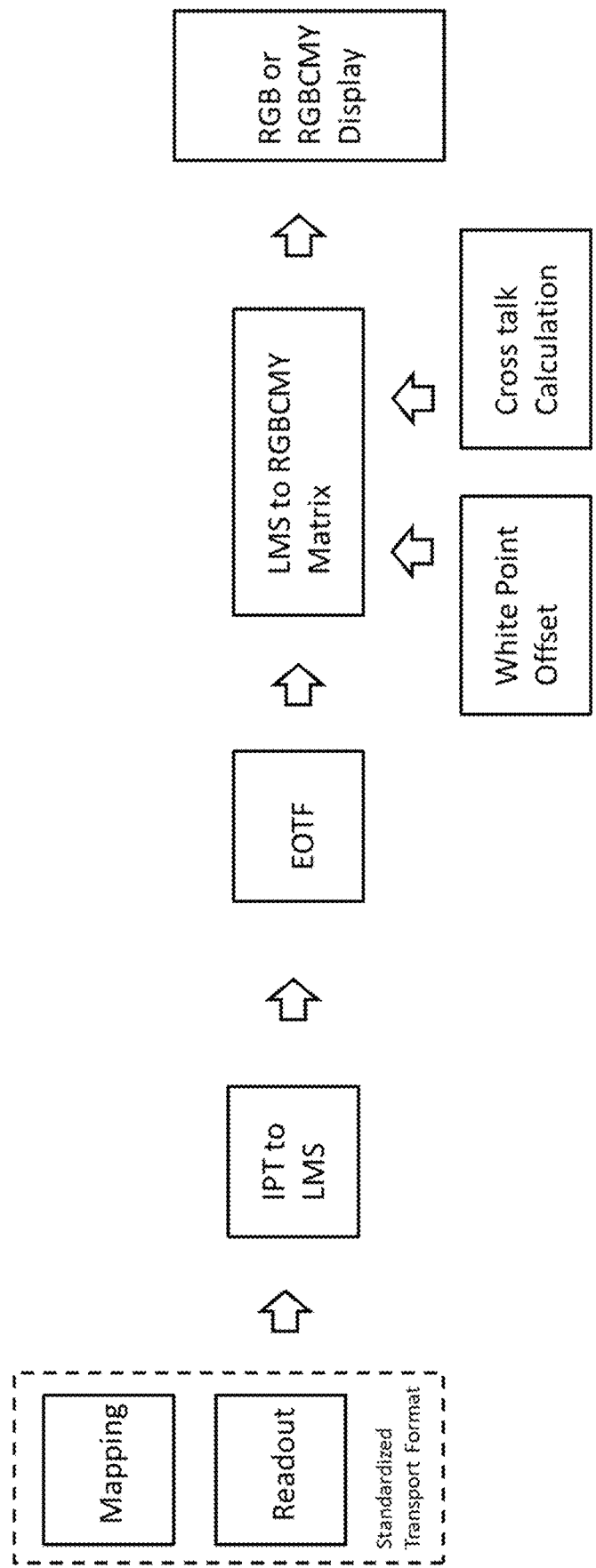
FIG. 28B illustrates one embodiment of an IPT 4:4:4 decode.

FIG. 28B illustrates one embodiment of an IPT 4:4:4 decode.

Figure 29A:
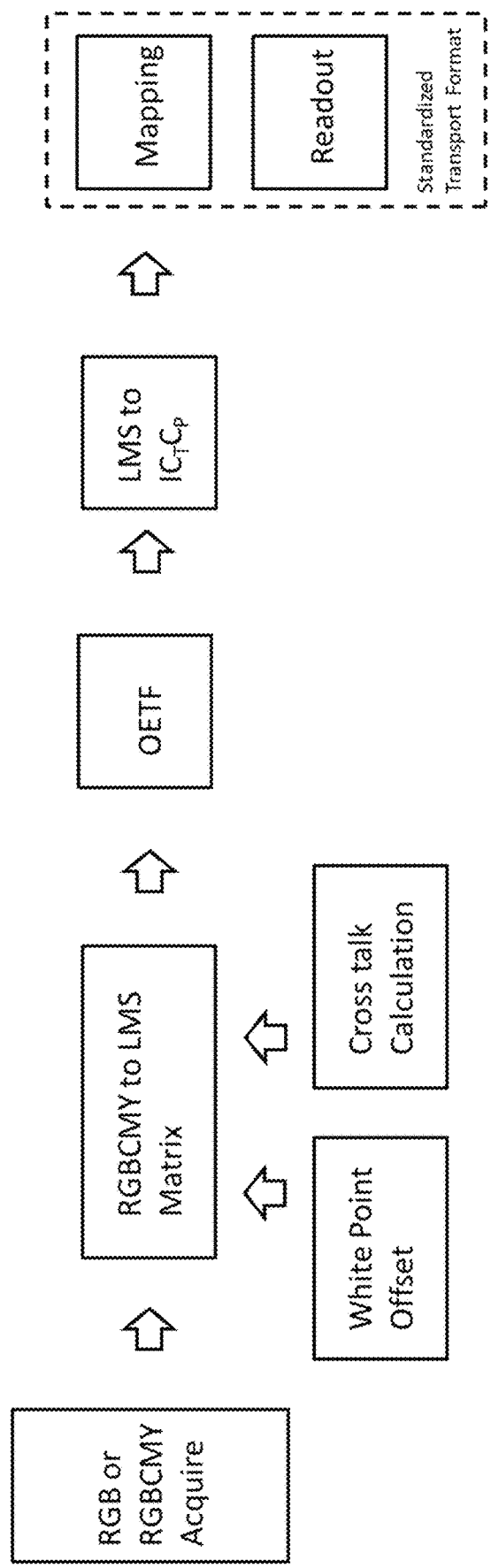
FIG. 29A illustrates one embodiment of an $IC_TC_P$ 4:2:2 encode.

FIG. 29A illustrates one embodiment of an $IC_TC_P$ 4:2:2 encode.

Figure 29B:
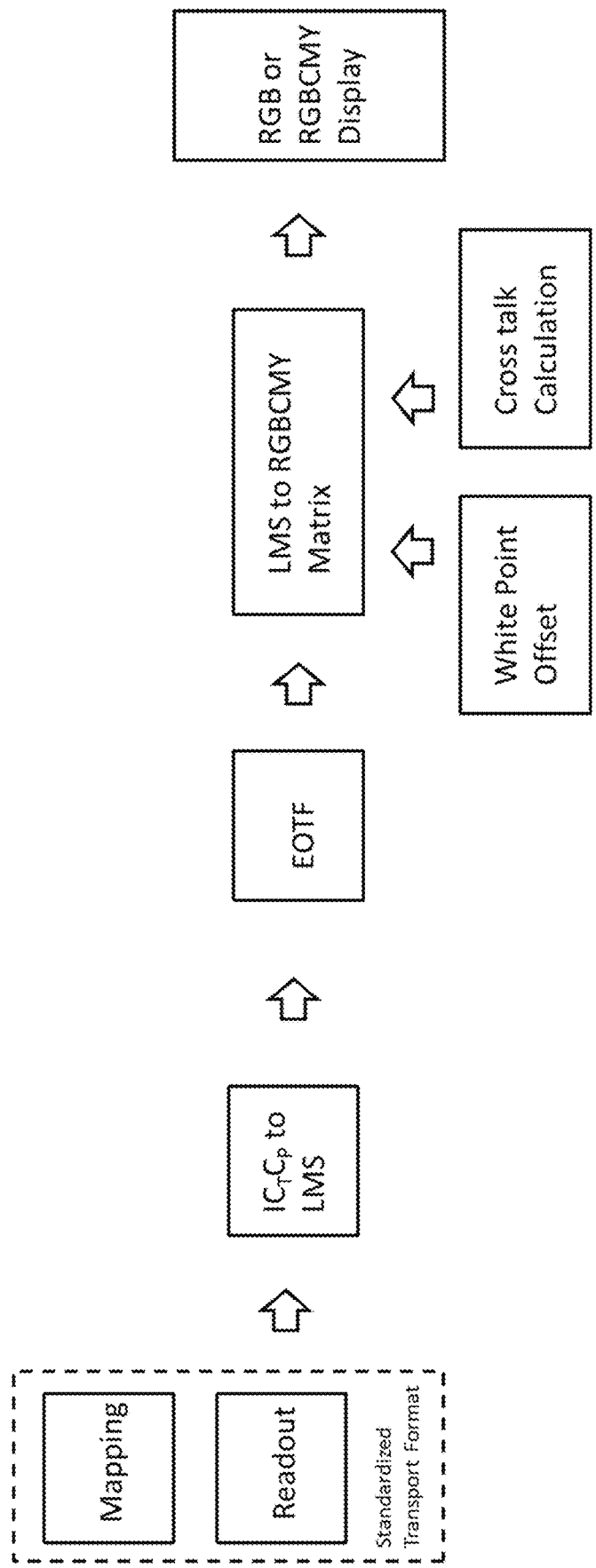
FIG. 29B illustrates one embodiment of an $IC_TC_P$ 4:2:2 decode.

FIG. 29B illustrates one embodiment of an $IC_TC_P$ 4:2:2 decode.

Transfer functions used in systems 1, 2, and 3 are generally framed around two basic implementations. For images displaying using a standard dynamic range, the transfer functions are defined within two standards. The OETF is defined in ITU-R BT.709-6, table 1, row 1.2. The inverse function, the EOTF, is defined in ITU-R BT.1886. For high dynamic range imaging, the perceptual quantizer (PQ) and hybrid log-gamma (HLG) curves are described in ITU-R BT.2100-2: 2018, table 4.

System 4 is operable to use any of the transfer functions, which can be applied to the Y component. However, to improve compatibility and to simplify conversion between standard transfer functions, a new method has been developed: a ½ gamma function. Advantageously, the ½ gamma function allows for a single calculation from the Y component of the xyY signal to the display. Advantageously, the ½ gamma function is designed for data efficiency, not as an optical transform function. In one embodiment, the ½ gamma function is used instead of a nonlinear function (e.g., OETF or EOTF). In one embodiment, signal input to the ½ gamma function is assumed to be linear and constrained between values of 0 and 1. In one embodiment, the ½ gamma function is optimized for 10 bit transport and/or 12 bit transport. Alternatively, the ½ gamma function is optimized for 14 bit transport and/or 16 bit transport. In an alternative embodiment, the ½ gamma function is optimized for 8 bit transport. A typical implementation applies an inverse of the ½ gamma function, which linearizes the signal. A conversion to a display gamut is then applied.

Figure 30:
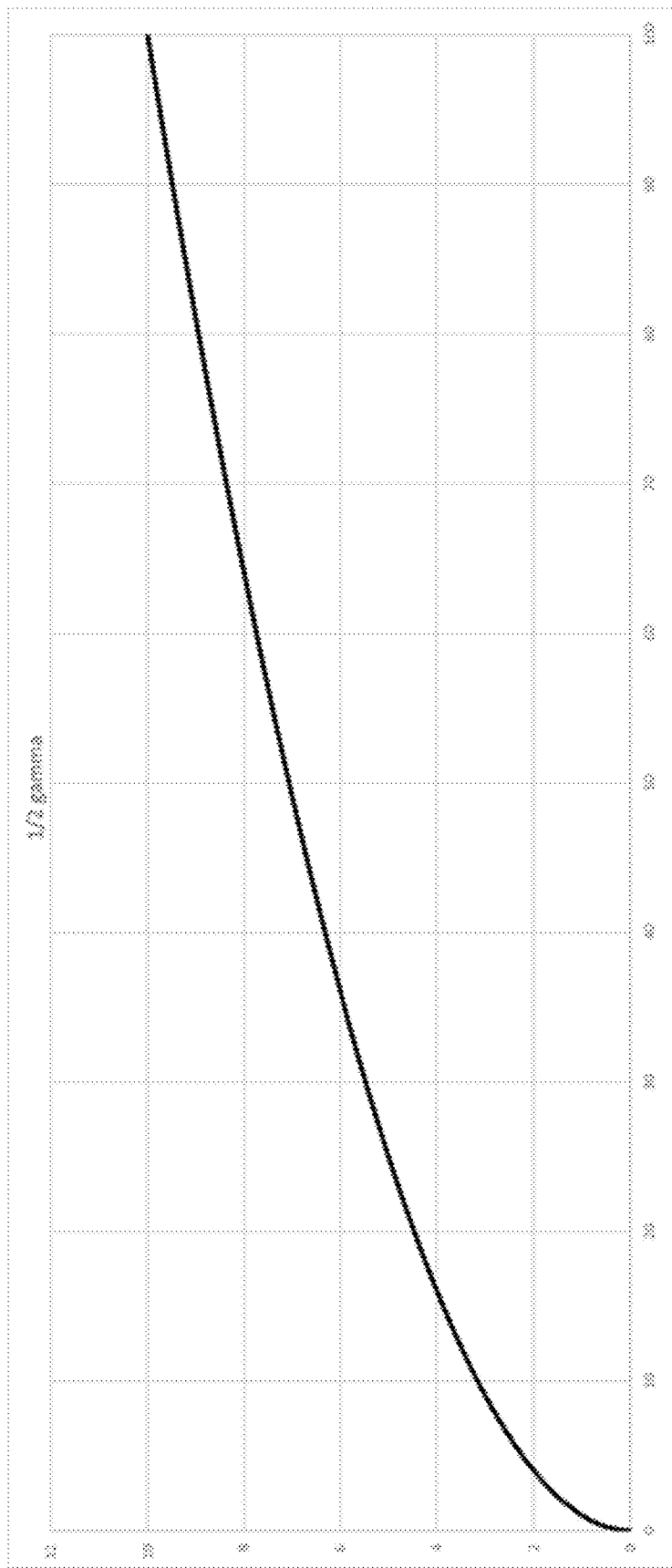
FIG. 30 illustrates one embodiment of a ½ gamma function.

FIG. 30 illustrates one embodiment of a ½ gamma function.

In one embodiment, for a source $n=\sqrt{L}$ and for a display $L=n^2$. In another embodiment, a display gamma is calculated as $L=n^{2/\lambda}$, where $\lambda$ is a desired final EOTF. Advantageously, using the ½ gamma function with the display gamma combines the functions into a single step rather than utilizing a two-step conversion process. In one embodiment, at least one tone curve is applied after the ½ gamma function. The ½ gamma function advantageously provides ease to convert to and from linear values. Given that all color and tone mapping has to be done in the linear domain, having a simple to implement conversion is desirable and makes the conversion to and from linear values easier and simpler.

Figure 31:
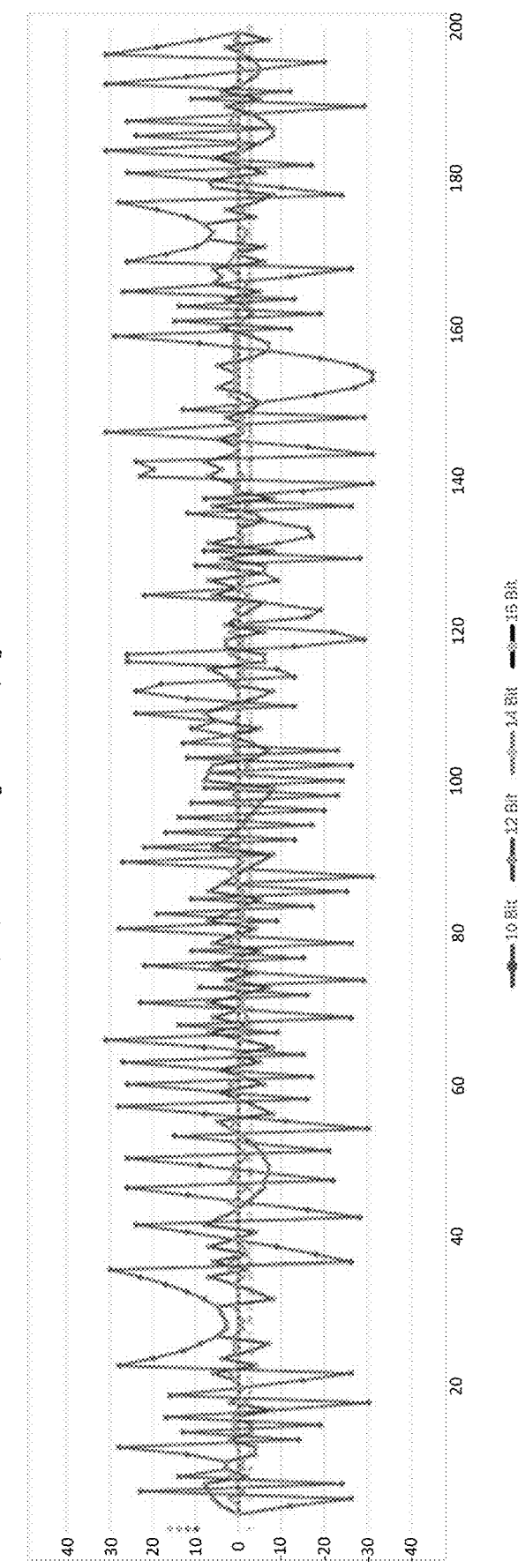
FIG. 31 illustrates a graph of maximum quantizing error using the ½ gamma function.

FIG. 31 illustrates a graph of maximum quantizing error using the ½ gamma function. The maximum quantizing error from an original 16 bit image (black trace) to a 10 bit (blue trace) signal is shown in the graph. In the embodiment shown in the graph, the maximum quantizing error is less than 0.1% (e.g., 0.0916%) for 16 bit to 10 bit conversion using the ½ gamma function. This does not include any camera log functions designed into a camera. The graph also shows the maximum quantizing error from the original 16 bit image to a 12 bit (red trace) signal and a 14 bit (green trace) signal.

Encoder and Decoder

In one embodiment, the multi-primary system includes an encoder operable to accept image data input (e.g., RAW, SDI, HDMI, DisplayPort). In one embodiment, the image data input is from a camera, a computer, a processor, a flash memory card, a network (e.g., local area network (LAN)), or any other file storage or transfer medium operable to provide image data input. The encoder is operable to send processed image data (e.g., xyY, XYZ) to a decoder (e.g., via wired or wireless communication). The decoder is operable to send formatted image data (e.g., SDI, HDMI, Ethernet, DisplayPort, xyY, XYZ, legacy RGB) to at least one viewing device (e.g., display, monitor, projector) for display (e.g., via wired or wireless communication). In one Embodiment, the decoder is operable to send formatted image data to at least two viewing devices simultaneously. In one embodiment, two or more of the at least two viewing devices use different color spaces and/or formats. In one example, the decoder sends formatted image data to a first viewing device in HDMI and a second viewing device in SDI. In another example, the decoder sends formatted image data as RGBCMY to a first viewing device and as legacy RGB (e.g., Rec. 709) to a second viewing device. In one embodiment, the Ethernet formatted image data is compatible with SMPTE 2022. Additionally or alternatively, the Ethernet formatted image data is compatible with SMPTE 2110.

The encoder and the decoder preferably include at least one processor. By way of example, and not limitation, the at least one processor is a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information. In one embodiment, one or more of the at least one processor is operable to run predefined programs stored in at least one memory of the encoder and/or the decoder.

The encoder and/or the decoder include hardware, firmware, and/or software. In one embodiment, the encoder and/or the decoder is operable to be inserted into third party software (e.g., via a dynamic-link library (DLL)). In one embodiment, functionality and/or features of the encoder and/or the decoder are combined for efficiency.

Figure 32A:
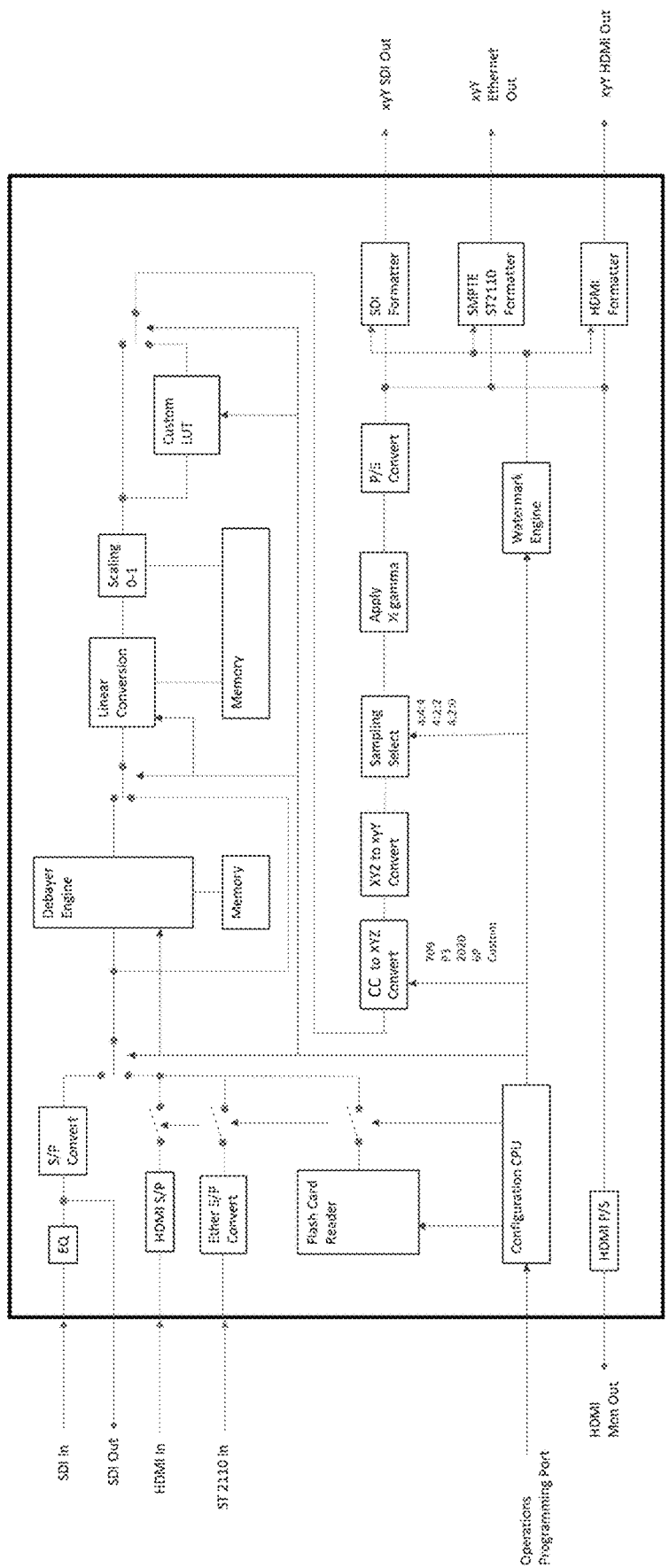
FIG. 32A illustrates one embodiment of an encoder.

FIG. 32A illustrates one embodiment of an encoder. The encoder includes at least one encoder input (e.g., SDI, HDMI, SMPTE 2110, SMPTE 2022, DisplayPort, fiber) and at least one encoder output (e.g., SDI, HDMI, SMPTE 2110, SMPTE 2022, xyY SDI, xyY HDMI, DisplayPort, fiber). The encoder preferably includes an encoder operations programming port operable to provide updates to firmware and/or software on the encoder. For example, the encoder operations programming port is operable to update library functions, internal formatting, camera DeBayer pattern algorithms, and/or look-up tables in the encoder. In one embodiment, the encoder includes an encoder configuration central processing unit (CPU) operable to interface with at least one encoder memory. The encoder further includes an encoder equalizer, at least one encoder serial to parallel (S/P) converter (e.g., SDI S/P converter, HDMI S/P, Ethernet S/P converter), at least one encoder flash card reader, at least one Ethernet port, a DeBayer engine, a linear converter, a scaler (e.g., 0-1), at least one custom encoder LUT, a color channel-to-XYZ converter (e.g., RGB in Rec. 709, P3, Rec.

2020; 6P; custom), an XYZ-to-xyY converter, a gamma function (e.g., ½ gamma), a sampling selector (e.g., 4:4:4, 4:2:2, 4:2:0), at least one encoder parallel to serial (P/S) converter (e.g., SDI P/S converter, HDMI P/S converter, Ethernet P/S converter), at least one encoder formatter (e.g., SDI formatter, HDMI formatter, Ethernet formatter), and/or a watermark engine. In one embodiment, the input data is operable to bypass any combination of processing stages and/or components in the encoder.

The at least one encoder input includes, but is not limited to, an SDI input, an HDMI input, a DisplayPort input, and/or a ST2110 input. The SDI input preferably follows a modified version of SMPTE ST352 payload ID standard. In one embodiment, the SDI input is SMPTE ST292, SMPTE ST425, and/or SMPTE ST2082. In one embodiment, a video signal from the SDI input is then sent to the encoder equalizer to compensate for cable type and length. In one embodiment, the HDMI input is decoded with a standard HDMI receiver circuit. In one embodiment, the HDMI input is converted to a parallel format. In one embodiment, the HDMI input is defined within the CTA 861 standard. In another embodiment, the at least one encoder input includes image data (e.g., RAW data) from a flash device. The configuration CPU identifies a format on the flash card and/or a file type, and has software operable to read the image data and make it available to the encoder.

In one embodiment, the encoder operations port is operable to connect to an encoder control system (e.g., via a micro universal serial bus (USB) or equivalent). In one embodiment, the encoder control system is operable to control the at least one encoder memory that holds tables for the DeBayer engine, load modifications to the linear converter and/or scaler, select the at least one input, loads a table for the at least one custom encoder LUT, bypass one or more of the at least one custom encoder LUT, bypass the DeBayer engine, add or modify conversion tables for the RGB to XYZ converter, modify the gamma function (e.g., a ½ gamma function), turn the watermark engine on or off, modify a digital watermark for the watermark engine, and/or perform functions for the flash memory player (e.g., play, stop, forward, fast forward, rewind, fast rewind, frame selection).

In one embodiment, the at least one S/P converter is up to n bit for improved processing efficiency. The at least one S/P converter preferably formats the processed image data so that the encoder and/or the decoder is operable to use parallel processing. Advantageously, parallel processing keeps processing fast and minimizes latency.

The at least one encoder formatter is operable to organize the serial stream as a proper format. In a preferred embodiment, the encoder includes a corresponding encoder formatter for each of the at least one encoder output. For example, if the encoder includes at least one HDMI output in the at least one encoder output, the encoder also includes at least one HDMI formatter in the at least one encoder formatter; if the encoder includes at least one SDI output in the at least one encoder output, the encoder also includes at least one SDI formatter in the at least one encoder formatter; if the encoder includes at least one Ethernet output in the at least one encoder output, the encoder also includes at least one Ethernet formatter in the at least one encoder formatter; and so forth.

There is an advantage of inputting a RAW camera image to take advantage of the extended dynamic range and wider color gamut versus using a standard video input. In one embodiment, the DeBayer engine is operable to convert RAW image data into a raster image. In one embodiment, the raster image is a 3-channel image (e.g., RGB). In one embodiment, the DeBayer engine is bypassed for data that is not in a RAW image format. In one embodiment, the DeBayer engine is configured to accommodate at least three primaries (e.g., 3, 4, 5, 6, 7, 8, etc.) in the Bayer or stripe pattern. To handle all of the different DeBayer options, the operations programming port is operable to load a file with code required to adapt a specific Bayer pattern. For images that are not RAW, a bypass path is provided and switched using the encoder configuration CPU.

The encoder configuration CPU is operable to recognize an input nonlinearity value and provide an inverse value to the linear converter to linearize the image data. The scaler is operable to map out of gamut values into in gamut values.

In one embodiment, the at least one custom encoder LUT is operable to transform an input (e.g., a standard from a manufacturer) to XYZ or xyY. Examples of the input include, but are not limited to, RED Log 3G10, ARRI log C, ACEScc, SONY S-Log, CANON Log, PANASONIC V Log, PANAVISION Panalog, and/or BLACK MAGIC CinemaDNG. In one embodiment, the at least one customer encoder LUT is operable to transform the input to an output according to artistic needs. In one embodiment, the encoder does not include the color channel-to-XYZ converter or the XYZ-to-xyY converter, as this functionality is incorporated into the at least one custom encoder LUT. In one embodiment, the at least one custom encoder LUT is a 65-cube look-up table. The at least one custom encoder LUT is preferably compatible with ACES Common LUT Format (CLF)—A Common File Format for Look-Up Tables S-2014-006, which is incorporated herein by reference in its entirety. In one embodiment, the at least one custom encoder LUT is a multi-column LUT. The at least one custom encoder LUT is preferably operable to be loaded through the operations programming port. If no LUT is required, the encoder configuration CPU is operable to bypass the at least one custom encoder LUT.

In one embodiment, RGB or multi-primary (e.g., RGBCMY) data is converted into XYZ data using the color channel-to-XYZ converter. In a preferred embodiment, a white point value for the original video data (e.g., RGB, RGBCMY) is stored in one or more of the at least one encoder memory. The encoder configuration CPU is operable to provide an adaption calculation using the white point value. The XYZ-to-xyY converter is operable to convert XYZ data to xyY data. Advantageously, the xyY image data is segmented into a luminance value and a set of colorimetric values, the relationship between Y and x,y is operable to be manipulated to use lower data rates. The configuration CPU is operable to set the sample selector to fit one or more of the at least one encoder output. In one embodiment, the sampling selector sets a sampling structure (e.g., 4:4:4, 4:2:2, 4:2:0, 4:1:1). The sampling selector is preferably controlled by the encoder configuration CPU. In a preferred embodiment, the sampling selector also places each component in the correct serial data position as shown in Table 9.

TABLE 9

|   | 4:4:4 | 4:2:2, 4:2:0, or 4:1:1 |
|---|---|---|
| Y | G | Y |
| x | R | $C_R$ |
| y | B | $C_B$ |

The watermark engine is operable to modify an image from an original image to include a digital watermark. In one embodiment, the digital watermark is outside of the ITU-R BT.2020 color gamut. In one embodiment, the digital watermark is compressed, collapsed, and/or mapped to an edge of the smaller color gamut such that it is not visible and/or not detectable when displayed on a viewing device with a smaller color gamut than ITU-R BT.2020. In another embodiment, the digital watermark is not visible and/or not detectable when displayed on a viewing device with an ITU-R BT.2020 color gamut. In one embodiment, the digital watermark is a watermark image (e.g., logo), alphanumeric text (e.g., unique identification code), and/or a modification of pixels. In one embodiment, the digital watermark is invisible to the naked eye. In a preferred embodiment, the digital watermark is perceptible when decoded by an algorithm. In one embodiment, the algorithm uses an encryption key to decode the digital watermark. In another embodiment, the digital watermark is visible in a non-obtrusive manner (e.g., at the bottom right of the screen). The digital watermark is preferably detectable after size compression, scaling, cropping, and/or screenshots. In yet another embodiment, the digital watermark is an imperceptible change in sound and/or video. In one embodiment, the digital watermark is a pattern (e.g., a random pattern, a fixed pattern) using a luminance difference (e.g., 1 bit luminance difference). In one embodiment, the pattern is operable to change at each frame. The digital watermark is a dynamic digital watermark and/or a static digital watermark. In one embodiment, the dynamic digital watermark works as a full frame rate or a partial frame rate (e.g., half frame rate). The watermark engine is operable to accept commands from the encoder configuration CPU.

In an alternative embodiment, the at least one encoder input already includes a digital watermark when input to the encoder. In one embodiment, a camera includes the digital watermark on an image signal that is input to the encoder as the at least one encoder input.

The at least one encoder output includes, but is not limited to SDI, HDMI, DisplayPort, and/or ethernet. In one embodiment, at least one encoder formatter formats the image data to produce the at least one encoder output. The at least one encoder formatter includes, but is not limited to, an SDI formatter, an SMPTE ST2110, and/or an HDMI formatter. The SDI formatter formats the serial video data into an SDI package as an xyY output. The SMPTE ST2110 formatter formats the serial video data into an ethernet package as an xyY output. The HDMI formatter formats the serial video data into an HDMI package as an xyY output.

Figure 32B:
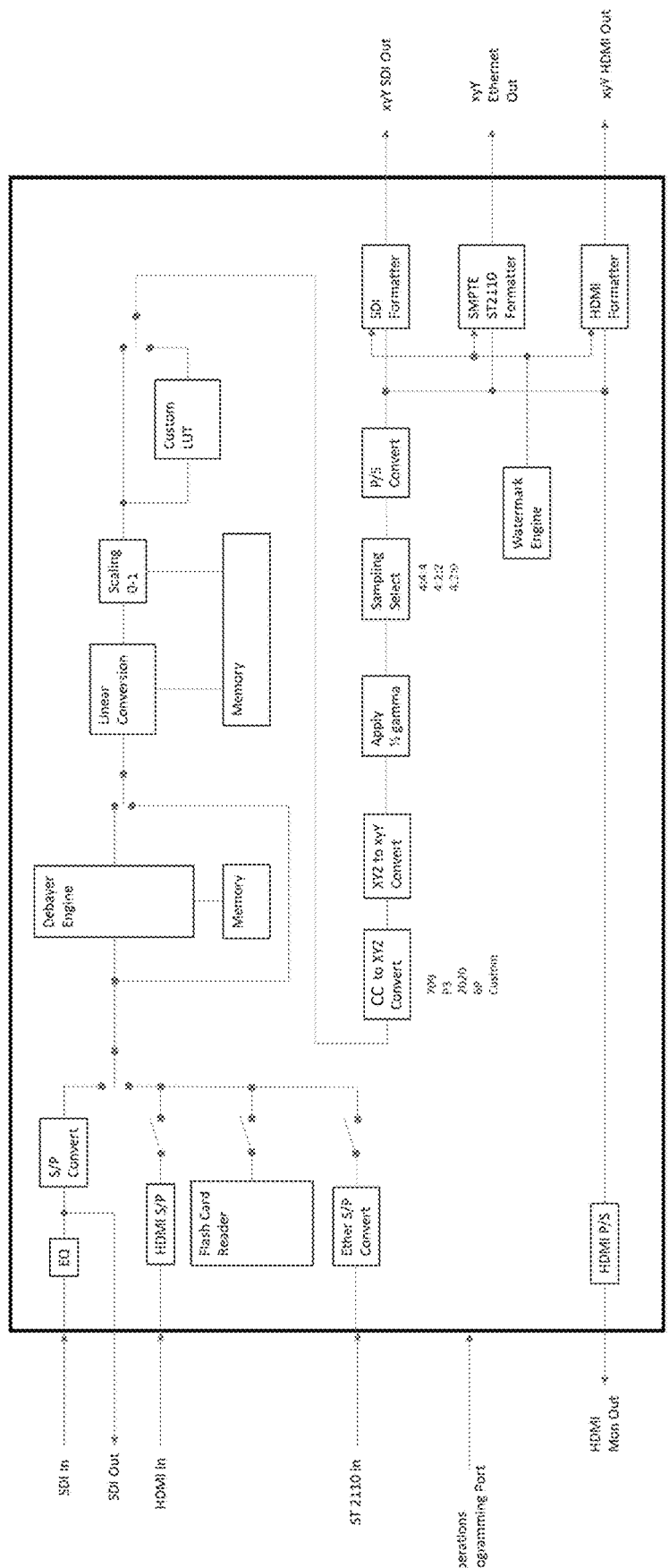
FIG. 32B illustrates another embodiment of an encoder.

FIG. 32B illustrates another embodiment of an encoder.

Figure 32C:
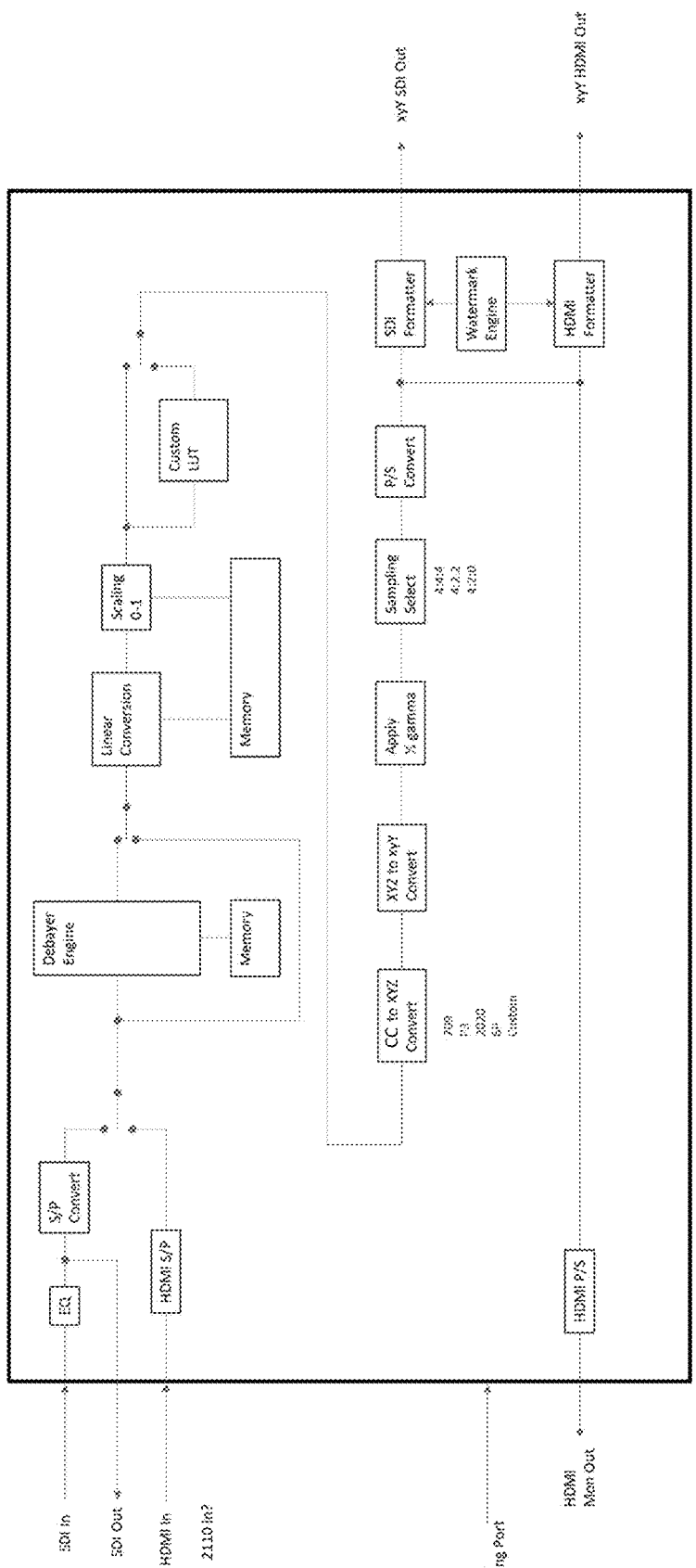
FIG. 32C illustrates yet another embodiment of an encoder.

FIG. 32C illustrates yet another embodiment of an encoder.

Figure 33A:
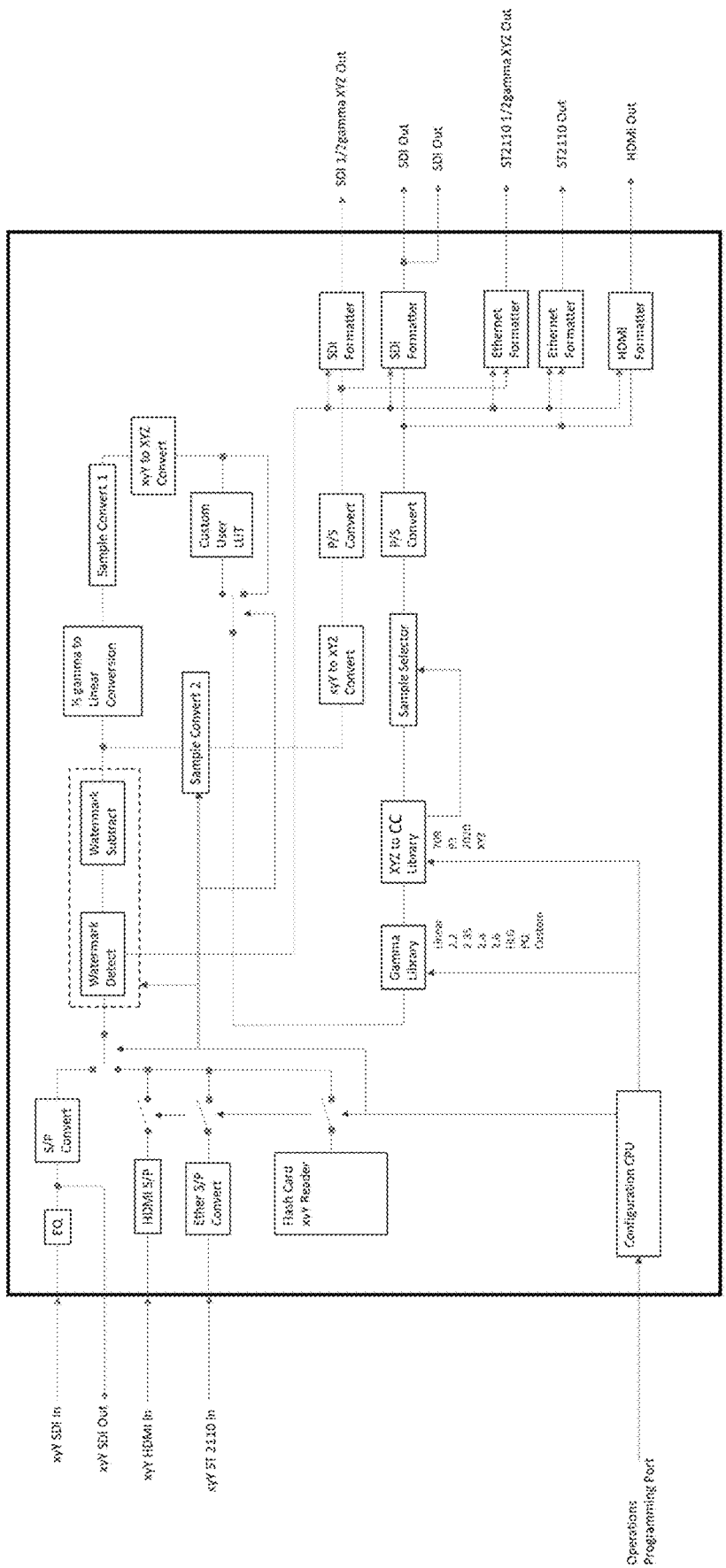
FIG. 33A illustrates one embodiment of a decoder.

FIG. 33A illustrates one embodiment of a decoder. The decoder includes at least one decoder input (e.g., SDI, HDMI, Ethernet, xyY SDI, xyY HDMI, xyY Ethernet, DisplayPort, fiber) and at least one decoder output (e.g., xyY SDI, at least one SDI, ½ gamma XYZ, HDMI, Ethernet, DisplayPort, fiber). In one embodiment, the decoder includes a decoder configuration central processing unit (CPU) operable to interface with at least one decoder memory. The decoder preferably includes a decoder operations programming port operable to provide updates to firmware and/or software on the decoder. The decoder further includes a decoder equalizer, at least one decoder serial to parallel (S/P) converter (e.g., SDI S/P converter, HDMI S/P converter, Ethernet S/P converter), a watermark detection engine, a watermark subtraction engine, a gamma-to-linear converter (e.g., ½ gamma-to-linear converter), at least one sampling converter (e.g., 4:2:2 or 4:2:0 to 4:4:4 converter), at least one xyY-to-XYZ converter, a gamma library (e.g., linear, 2.2, 2.35, 2.4, 2.6, HLG, PQ, custom), an XYZ-to-RGB library (e.g., Rec. 709, P3, Rec. 2020), at least one custom decoder LUT, at least one decoder parallel to serial (P/S) converter (e.g., SDI 1% gamma XYZ, at least one SDI, HDMI), and/or at least one decoder formatter (e.g., SDI 1% gamma XYZ formatter, SDI RGB formatter, SDI CMY formatter, HDMI formatter). In one embodiment, the processed image data is operable to bypass any combination of processing stages and/or components in the decoder.

In one embodiment, the decoder operations port is operable to connect to a decoder control system (e.g., via a micro universal serial bus (USB) or equivalent). In one embodiment, the decoder control system is operable to select the at least one decoder input, perform functions for the flash memory player (e.g., play, stop, forward, fast forward, rewind, fast rewind, frame selection), turn watermark detection on or off, add or modify the gamma library and/or look-up table selection, add or modify the XYZ-to-RGB library and/or look-up table selection, load data to the at least one custom decoder LUT, select bypass of one or more of the custom decoder LUT, and/or modify the Ethernet SDP. The gamma library preferably takes linear data and applies at least one non-linear function to the linear data. The at least non-linear function includes, but is not limited to, at least one standard gamma (e.g., those used in standard dynamic range (SDR) and high definition range (HDR) formats) and/or at least one custom gamma.

In one embodiment, the output of the gamma library is fed to the XYZ-to-RGB library, where tables are included to map the XYZ data to a standard RGB or YCbCr output format. In another embodiment, the output of the gamma library bypasses the XYZ-to-RGB library. This bypass leaves an output of XYZ data with a gamma applied. The selection of the XYZ-to-RGB library or bypass is determined by the configuration CPU. If the output format selected is YCbCr, then the XYZ-to-RGB library flags which sampling method is desired and provides that selection to the sampling selector. The sampling selector then formats the YCbCr data to a 4:2:2, 4:2:0, or 4:1:1 sampling structure.

In one embodiment, an input to the decoder does not include full pixel sampling (e.g., 4:2:2). The at least one sampling converter is operable to take subsampled images and convert the subsampled images to full 4:4:4 sampling. The 4:4:4 xyY image data is then converted to XYZ using the at least one xyY-to-XYZ converter. Image data is then converted from a parallel form to a serial stream.

In one embodiment, the at least one SDI output includes more than one SDI output. Advantageously, this allows for output over multiple links (e.g., System 3). In one embodiment, the at least one SDI output includes a first SDI output and a second SDI output. In one embodiment, the first SDI output is used to transport a first set of color channel data (e.g., RGB) and the second SDI output is used to transport a second set of color channel data (e.g., CMY).

The watermark detection engine detects the digital watermark. In one embodiment, a pattern of the digital watermark is loaded to the decoder using the operations programming port. In one embodiment, the decoder configuration CPU is operable to turn the watermark detection engine on and off. The watermark subtraction engine removes the digital watermark from image data before formatting for display on the at least one viewing device. In one embodiment, the decoder configuration CPU is operable to allow bypass of the watermark subtraction engine, which will leave the digital watermark on an output image. In a preferred embodiment, the decoder requires the digital watermark in the processed image data sent from the encoder to provide the at least one decoder output. Thus, the decoder does not send color channel data to the at least one viewing device if the digital watermark is not present in the processed image data. In an alternate embodiment, the decoder is operable to provide the at least one decoder output without the digital watermark in the processed image data sent from the encoder. If the digital watermark is not present in the processed image data, an image displayed on the at least one viewing device preferably includes a visible watermark.

In one embodiment, output from the watermark subtraction process includes luminance data including a non-linearity (e.g., ½ gamma). Non-linear luminance data (i.e., luma) is converted back to a linear image using the gamma-to-linear converter.

In one embodiment, the at least one custom decoder LUT includes a 9-column LUT. In one embodiment, the 9-column LUT includes 3 columns for a legacy RGB output (e.g., Rec. 709, Rec. 2020, P3) and 6 columns for multi-primary display (e.g., RGBCMY). In one embodiment, the at least one custom decoder LUT (e.g., the 9-column LUT) is operable to produce output values using tetrahedral interpolation. Advantageously, tetrahedral interpolation uses a smaller volume of color space to determine the output values, resulting in more accurate color channel data. In one embodiment, each of the tetrahedrons used in the tetrahedral interpolation includes a neutral diagonal. Advantageously, this embodiment works even with having less than 6 color channels. For example, a 4P output (e.g., RGBC) or a 5P output (e.g., RGBCY) using an FPGA is operable to be produced using tetrahedral interpolation. Further, this embodiment allows for an encoder to produce legacy RGB output in addition to multi-primary output. In an alternative embodiment, the at least one custom decoder LUT is operable to produce output value using cubic interpolation. The at least one custom decoder LUT is preferably operable to accept linear XYZ data. In one embodiment, the at least one custom decoder LUT is a multi-column LUT. The at least one custom decoder LUT is preferably operable to be loaded through the operations programming port. If no LUT is required, the decoder configuration CPU is operable to bypass the at least one custom decoder LUT.

In one embodiment, the at least one custom decoder LUT is operable to be used for streamlined HDMI transport. In one embodiment, the at least one custom decoder LUT is a 3D LUT. In one embodiment, the at least one custom decoder LUT is operable to take in a 3-column input (e.g., RGB, XYZ) and produce an output of greater than three columns (e.g., RGBC, RGBCY, RGBCMY). Advantageously, this system only requires 3 channels of data as the input to the at least one custom decoder LUT. In one embodiment, the at least one custom decoder LUT applies a gamma function and/or a curve to produce a linear output. In another embodiment, the at least one custom decoder LUT is a trimming LUT.

The at least one decoder formatter is operable to organize a serial stream as a proper format for the at least one output. In a preferred embodiment, the decoder includes a corresponding decoder formatter for each of the at least one decoder output. For example, if the decoder includes at least one HDMI output in the at least one decoder output, the decoder also includes at least one HDMI formatter in the at least one decoder formatter; if the decoder includes at least one SDI output in the at least one decoder output, the decoder also includes at least one SDI formatter in the at least one decoder formatter; if the decoder includes at least one Ethernet output in the at least one decoder output, the decoder also includes at least one Ethernet formatter in the at least one decoder formatter; and so forth.

Figure 33B:
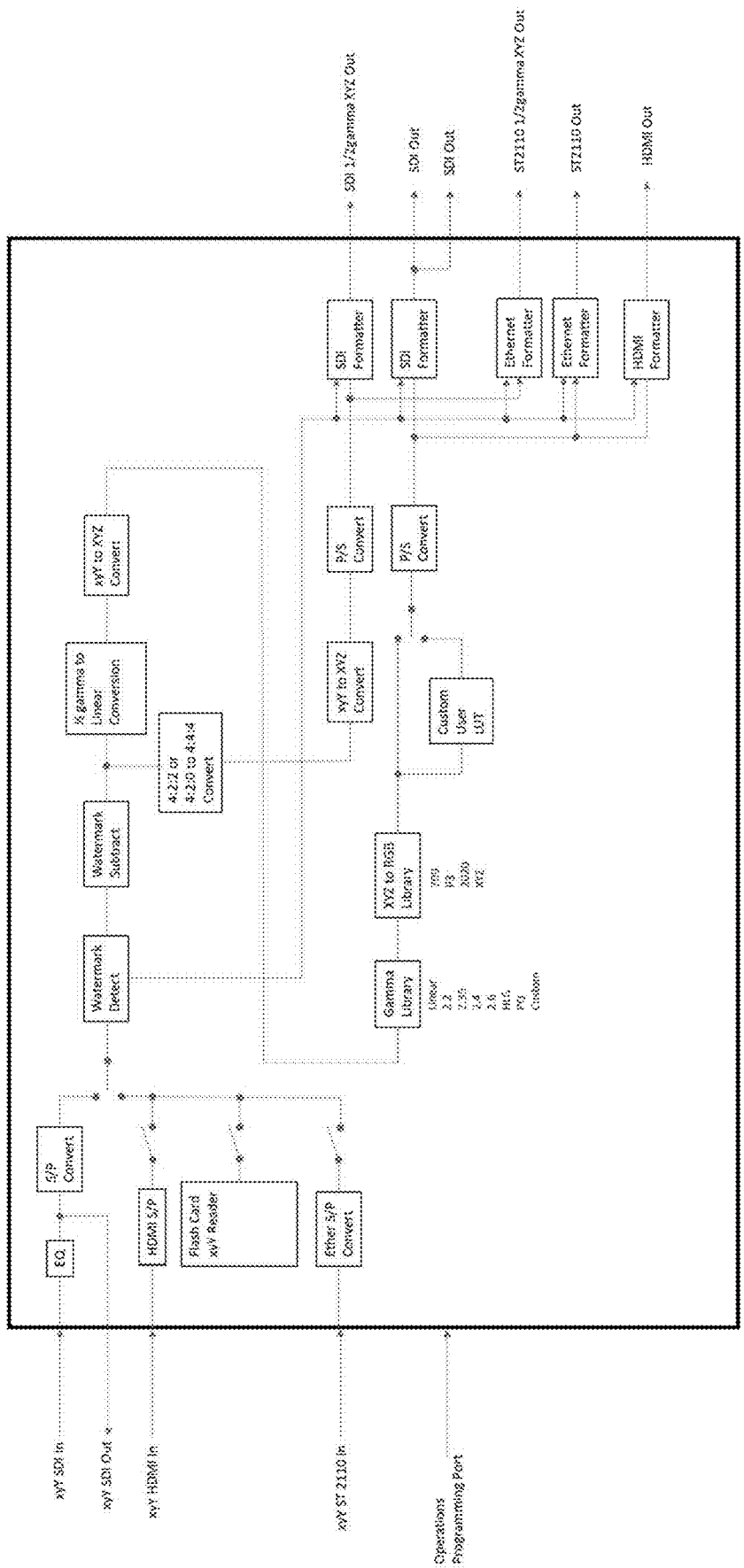
FIG. 33B illustrates another embodiment of a decoder.

FIG. 33B illustrates another embodiment of a decoder.

Figure 33C:
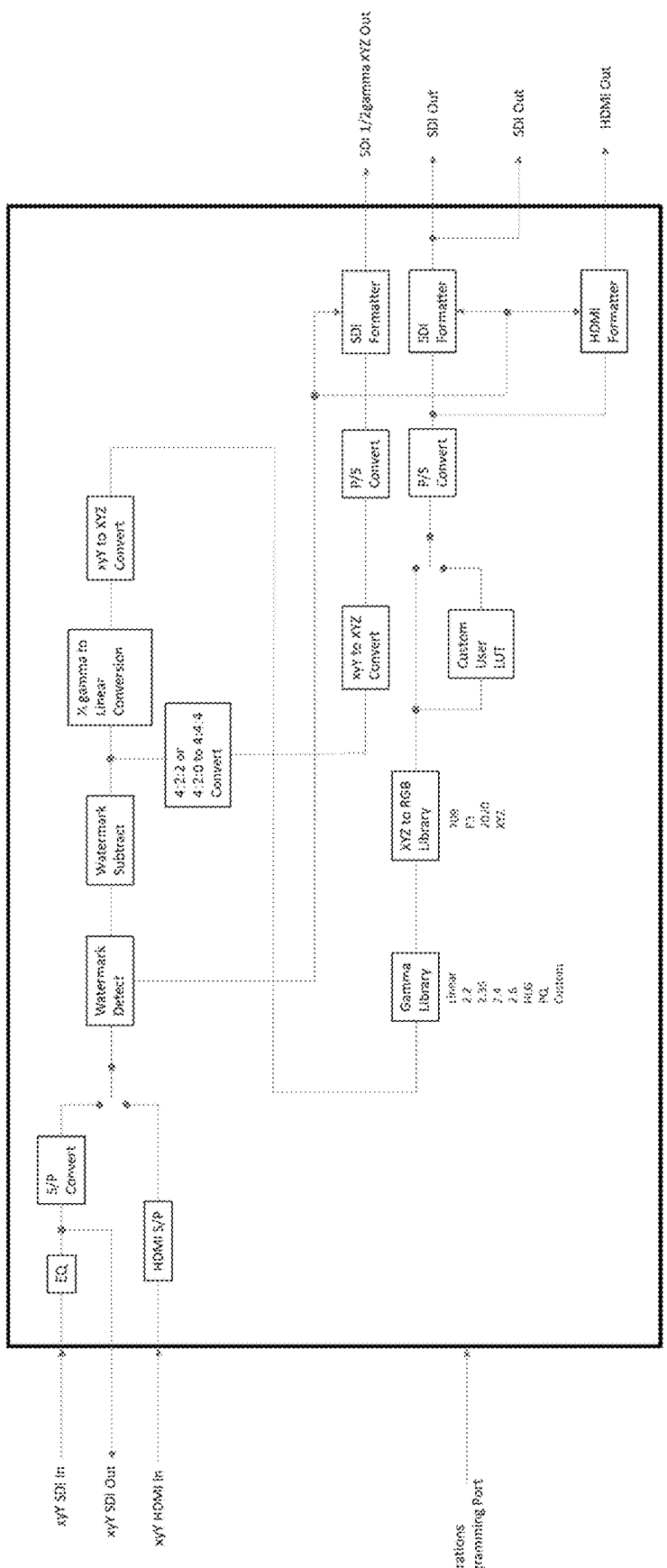
FIG. 33C illustrates yet another embodiment of a decoder.

FIG. 33C illustrates another embodiment of a decoder.

The encoder and/or the decoder are operable to generate, insert, and/or recover metadata related to an image signal. The metadata includes, but is not limited to, a color space (e.g., 6P-B, 6P-C), an image transfer function (e.g., gamma, PQ, HLG, ½ gamma), a peak white value, and/or a signal format (e.g., RGB, xyY, RGBCMY). In one embodiment, the metadata is inserted into SDI or ST2110 using ancillary (ANC) data packets. In another embodiment, the metadata is inserted using Vendor Specific InfoFrame (VSIF) data as part of the CTA 861 standard. In one embodiment, the metadata is compatible with SMPTE ST 2110-10:2017, SMPTE ST 2110-20:2017, SMPTE ST 2110-40:2018, SMPTE ST 352:2013, and/or SMPTE ST 352:2011, each of which is incorporated herein by reference in its entirety.

Additional details about the multi-primary system and the display are included in U.S. application Ser. Nos. 17/180,441 and 17/209,959, and U.S. Patent Publication Nos. 20210027693, 20210020094, 20210035487, and 20210043127, each of which is incorporated herein by reference in its entirety.

Display Engine

In one embodiment, the present invention provides a display engine operable to interact with a graphics processing unit (GPU) and provide xyY configured outputs. In one embodiment, the display engine and the GPU are on a video card. Alternatively, the display engine and the GPU are embedded on a motherboard or a central processing unit (CPU) die. The display engine and the GPU are preferably included in and/or connected to at least one viewing device (e.g., display, video game console, smartphone, etc.). Additional information related to GPUs are disclosed in U.S. Pat. Nos. 9,098,323; 9,235,512; 9,263,000; 9,318,073; 9,442,706; 9,477,437; 9,494,994; 9,535,815; 9,740,611; 9,779,473; 9,805,440; 9,880,851; 9,971,959; 9,978,343; 10,032,244; 10,043,232; 10,114,446; 10,185,386; 10,191,759; 10,229,471; 10,324,693; 10,331,590; 10,460,417; 10,515,611; 10,521,874; 10,559,057; 10,580,105; 10,593,011; 10,600,141; 10,628,909; 10,705,846; 10,713,059; 10,769,746; 10,839,476; 10,853,904; 10,867,362; 10,922,779; 10,923,082; 10,963,299; and 10,970,805 and U.S. Patent Publication Nos. 20140270364, 20150145871, 20160180487, 20160350245, 20170178275, 20170371694, 20180121386, 20180314932, 20190034316, 20190213706, 20200098082, 20200183734, 20200279348, 20200294183, 20200301708, 20200310522, 20200379864, and 20210049030, each of which is incorporated herein by reference in its entirety.

In one embodiment, the GPU includes a render engine. In one embodiment, the render engine includes at least one render pipeline (RP), a programmable pixel shader, a programmable vector shader, a vector array processor, a curvature engine, and/or a memory cache. The render engine is operable to interact with a memory controller interface, a command CPU, a host bus (e.g., peripheral component interconnect (PCI), PCI Express (PCIe), accelerated graphics port (AGP)), and/or an adaptive full frame anti-aliasing. The memory controller interface is operable to interact with a display memory (e.g., double data rate (DDR) memory), a pixel cache, the command CPU, the host bus, and a display engine. The command CPU is operable to exchange data with the display engine.

Figure 34:
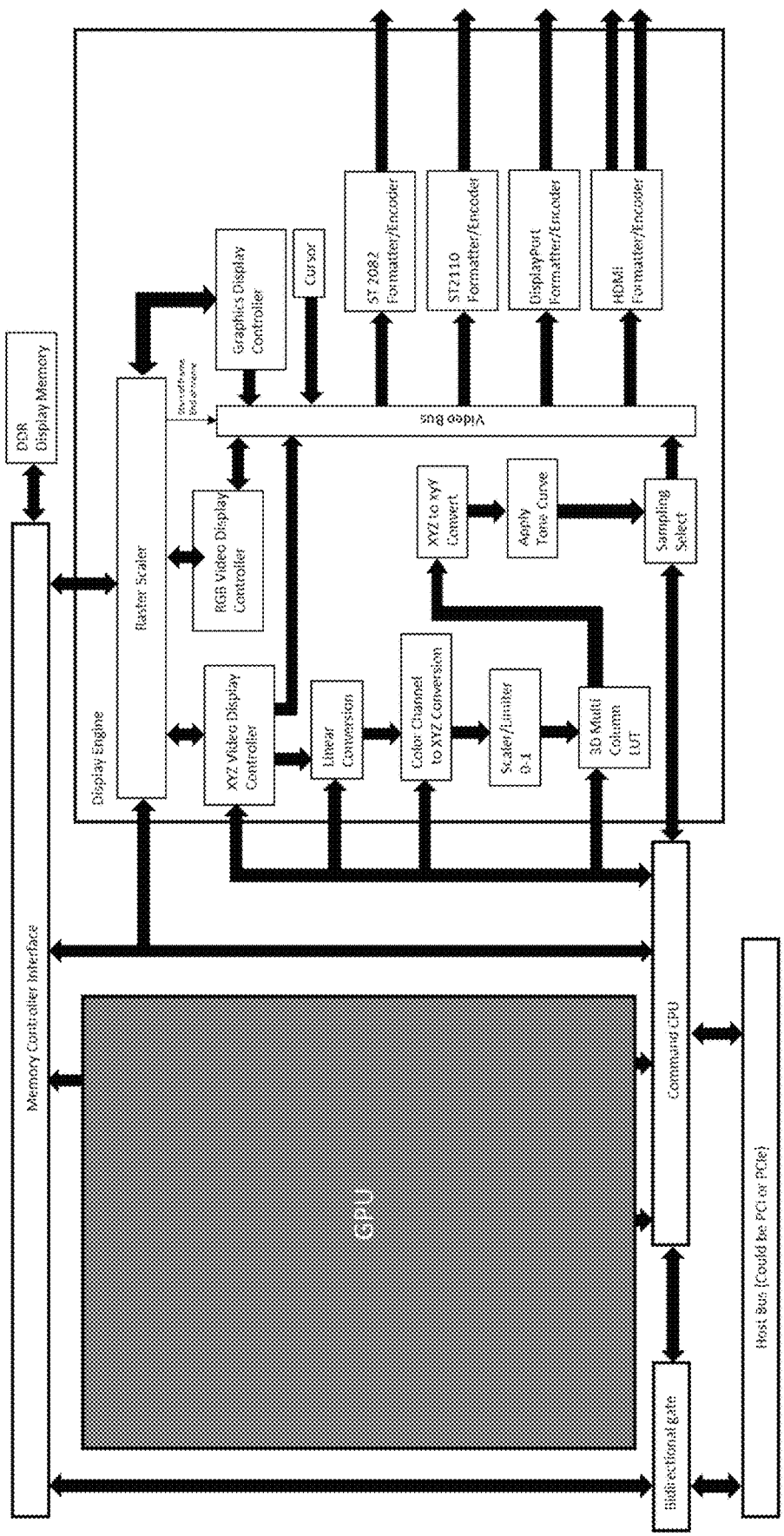
FIG. 34 illustrates one embodiment of a display engine operable to interact with a graphics processing unit (GPU) according to the present invention.

FIG. 34 illustrates one embodiment of a display engine operable to interact with a graphics processing unit (GPU) according to the present invention. In a preferred embodiment, the display engine operable to interact with the GPU is included on a video card. The video card is operable to interface with a computer. In a preferred embodiment, the video card is operable to be inserted into a connector (e.g., PCIe connector, PCI connector, accelerated graphics port (AGP) connector, etc.) located within a computer. The computer includes a command central processing unit (CPU). The command CPU is dedicated to communication between the video card and the computer core. The command CPU is preferably operable to input instructions from an application programming interface (API). The command CPU is further operable to distribute appropriate commands to components in the video card. The video card further includes a memory controller interface. The memory controller interface is preferably a bus including hardware operable to manage which data is allowed on the bus and where the data is routed.

In one embodiment, the video card includes a plurality of video cards linked together to allow scaling of graphics processing. In one embodiment, the plurality of video cards is linked with a PCIe connector. Other connectors are compatible with the plurality of video cards. In one embodiment, each of the plurality of video cards has the same technical specifications. In one embodiment, the API includes methods for scaling the graphics processing, and the command CPU is operable to distribute the graphics processing across the plurality of video cards. The command CPU is operable to scale up the graphics processing as well as scale down the graphics processing based on processing demands and/or power demands of the system.

The display engine is operable to take rendered data from the GPU and convert the rendered data to a format operable to be displayed on at least one viewing device. The display engine includes a raster scaler, at least one video display controller (e.g., XYZ video display controller, RGB video display controller), a color channel-to-XYZ converter, a linear converter, a scaler and/or limiter, a multi-column three-dimensional (3D) LUT (e.g., 1293 LUT), an XYZ-to-xyY converter, a non-linear function and/or tone curve applicator (e.g., ½ gamma), a sampling selector, a video bus, and/or at least one output formatter and/or encoder (e.g., ST 2082, ST 2110, DisplayPort, HDMI). In one embodiment, the color channel-to-XYZ converter is an RGB-to-XYZ converter. The video bus is operable to receive input from a graphics display controller and/or at least one input device (e.g., a cursor, a mouse, a joystick, a keyboard, a videogame controller, etc.).

The video card is operable to connect through any number of lanes provided by hardware on the computer. The video card is operable to communicate through a communication interface including, but not limited to, a PCIe Physical Layer (PHY) interface. In one embodiment, the communication interface is an API supported by the computer (e.g., OpenGL, Direct3D, OpenCL, Vulkan). Image data in the form of vector data or bitmap data is output from the communication interface into the command CPU. The communication interface is operable to notify the command CPU when image data is available. The command CPU opens the bus bidirectional gate and instructs the memory controller interface to transmit the image data to a double data rate (DDR) memory. The memory controller interface is operable to open a path from the DDR memory to allow the image data to pass to the GPU for rendering. After rendering, the image data is channeled back to the DDR for storage pending output processing by the display engine.

After the image data is rendered and stored in the DDR memory, the command CPU instructs the memory controller interface to allow rendered image data to load into the raster scaler. The command CPU loads the raster scaler with framing information. The framing information includes, but is not limited to, a start of file (SOF) identifier, an end of file (EOF) identifier, a pixel count, and/or a frame rate. In one embodiment, the framing information includes HDMI and/or DisplayPort (e.g., CTA 861 format) information. In one embodiment, Extended Display Identification Data (EDID) is operable to override specifications in the API. The raster scaler provides output as image data formatted as a raster in the same format as the file which being read (e.g., RGB, XYZ, xyY). In one embodiment, the output of the raster scaler is RGB data, XYZ data, or xyY data.

In one embodiment, the output of the raster scaler is sent to a graphics display controller. In one embodiment, the graphics display controller is operable to provide display information for a graphical user interface (GUI). In one embodiment, the RGB video controller and the XYZ video controller block image data from entering the video bus. Raster data includes, but is not limited to, synchronization data, an SOF, an EOF, a frame rate, and/or a pixel count. In one embodiment, the raster data is limited to an RGB output that is operable to be transmitted to the at least one output formatter and/or encoder.

For common video display, a separate path is included. The separate path is operable to provide outputs including, but not limited to, SMPTE SDI, Ethernet, DisplayPort, and/or HDMI to the at least one output formatter and/or encoder. The at least one video display controller (e.g., RGB video display controller) is operable to limit and/or optimize video data for streaming and/or compression. In one embodiment, the RGB video display controller and the XYZ video display controller block image data from entering the video bus.

In a preferred embodiment, image data is provided by the raster scaler in the format provided by the file being played (e.g., RGB, RGBCMY, XYZ, xyY). In one embodiment, the raster scaler presets the XYZ video display controller as the format provided and contained within the raster size to be displayed. In one embodiment, non-linear information (e.g., OOTF) sent from the API through the command CPU is sent to the linear converter. The linear converter is operable to use the non-linear information. For example, if the image data was authored using an OETF, then an inverse of the OETF is operable to be used by the linear converter, or, if the image information already has an EOTF applied, the inverse of the EOTF is operable to be used by the linear converter. In one embodiment, the linear converter develops an EOTF map to linearize input data (e.g., when EOTF data is available). In one embodiment, the linear converter uses an EOTF when already available. After linear data is loaded and a summation process is developed, the XYZ video display controller passes the image data in its native format (e.g., RGB, multi-primary data (e.g., RGBCMY), XYZ, xyY), but without a non-linearity applied to the Y component. The color channel-to-XYZ converter is operable to accept a native format (e.g., RGB, multi-primary data (e.g., RGBCMY), XYZ, xyY) and convert to an XYZ format. In one embodiment, the XYZ format includes at least one chromatic adaptation (e.g., D60 to D65). For RGB, the XYZ video display controller uses data supplied from the command CPU, which obtains color gamut and white point specifications from the API to convert to an XYZ output. For a multi-primary system, a corresponding matrix or a look-up table (LUT) is used to convert from the multi-primary system to XYZ. In one embodiment, the multi-primary system is RGBCMY (e.g., 6P-B, 6P-C, S6Pa, S6Pb). For an xyY system, the color channel-to-XYZ converter formats the xyY data back to XYZ data. In another embodiment, the color channel-to-XYZ converter is bypassed. For example, the color channel-to-XYZ converter is bypassed if there is a requirement to stay within a multi-primary system. Additionally, the color channel-to-XYZ converter is bypassed for XYZ data.

In one embodiment, the input to the scaler and/or limiter is XYZ data or multi-primary data. In one embodiment, the multi-primary data includes, but is not limited to, RGBCMY (e.g., 6P-B, 6P-C, S6Pa, S6Pb), RGBC, $RG_1G_2B$, RGBCW, RGBCY, $RG_1G_2BW$, $RGBW_RW_GW_B$, or $R_1R_2G_1G_2B_1B_2$. Other multi-primary data formats are compatible with the present invention. The scaler and/or limiter is operable to map out of gamut values (e.g., negative values) to in gamut values (e.g., out of gamut values developed in the process to convert to XYZ). In one embodiment, the scaler and/or limiter uses a gamut mapping algorithm to map out of gamut values to in gamut values.

In one embodiment, the input to the scaler and/or limiter is multi-primary data and all channels are optimized to have values between 0 and 1. For example, if the input is RGBCMY data, all six channels are optimized to have values between 0 and 1. In one embodiment, the output of the scaler and/or limiter is operable to be placed into a three-dimensional (3-D) multi-column LUT. In one embodiment, the 3-D multi-column LUT includes one column for each channel. For example, if the output is RGBCMY data, the 3-D multi-column LUT includes six columns (i.e., one for each channel). Within the application feeding the API, each channel is operable to be selected to balance out the white point and/or shade the image toward one particular color channel. In one embodiment, the 3-D multi-column LUT is bypassed if the output of the scaler and/or limiter is XYZ data. The output of the 3-D multi-column LUT is sent to the XYZ-to-xyY converter, where a simple summation process is used to make the conversion. In one embodiment, if the video data is RGBCMY, the XYZ-to-xyY converter process is bypassed.

Because the image data is linear, any tone curve can be added to Y. The advantage to the present invention using xyY data is that only one of the three color components needs a tone curve modification. The tone curve is operable to be added to Y only, with the x and y channels remaining linear. The tone curve is operable to be anything (e.g., a non-linear function), including standard values currently used. In one embodiment, the tone curve is an EOTF (e.g., those described for television and/or digital cinema). Additionally or alternatively, the tone curve includes HDR modifications.

In one embodiment, the output has been handled through this process as three to six individual components (e.g., three components for xyY or XYZ, six components for RGBCMY, etc.). Alternative number of primaries and components are compatible with the present invention. However, in some serial formats, this level of payload is too large. In one embodiment, the sampling selector sets a sampling structure (e.g., 4:4:4, 4:2:2, 4:2:0, 4:1:1). In one embodiment, the sampling selector is operable to subsample processed image data. The sampling selector is preferably controlled by the command CPU. In one embodiment, the command CPU gets its information from the API and/or the display EDID. In a preferred embodiment, the sampling selector also places each component in the correct serial data position as shown in Table 8 (supra).

The output of the sampling select is fed to the main video bus, which integrates SOF and EOF information into the image data. It then distributes this to the at least one output formatter and/or encoder. In one embodiment, the output is RGBCMY. In one embodiment, the RGBCMY output is configured as 4:4:4:4:4:4 data. The format to the at least one viewing device includes, but is not limited to, SMPTE ST2082 (e.g., 3, 6, and 12G serial data output), SMPTE ST2110 (e.g., to move through ethernet), and/or CTA 861 (e.g., DisplayPort, HDMI). The video card preferably has the appropriate connectors (e.g., DisplayPort, HDMI) for distribution through any external system (e.g., computer) and connection to at least one viewing device (e.g., monitor, television, etc.). The at least one viewing device includes, but is not limited to, a smartphone, a tablet, a laptop screen, a light emitting diode (LED) display, an organic light emitting diode (OLED) display, a miniLED display, a microLED display, a liquid crystal display (LCD), a quantum dot display, a quantum nano emitting diode (QNED) device, a personal gaming device, a virtual reality (VR) device and/or an augmented reality (AR) device, an LED wall, a wearable display, and at least one projector. In one embodiment, the at least one viewing device is a single viewing device.

Viewing Device

As previously described, the image is operable to be displayed on a viewing device. In one embodiment, the viewing device is a smartphone, a tablet, a laptop screen, a light emitting diode (LED) display, an organic light emitting diode (OLED) display, a miniLED display, a microLED display, a liquid crystal display (LCD), a quantum dot display, a quantum nano emitting diode (QNED) device, a personal gaming device, a virtual reality (VR) device, an augmented reality (AR) device, a mixed reality (MR) device, an LED wall, a wearable display (e.g., VR/AR headset, glasses, contact lenses), and/or at least one projector. In one embodiment, the at least one projector includes more than one aligned and/or synchronized projector (e.g., manually, automatically via software). Examples of contact lenses with integrated LEDs include those in U.S. Pat. Nos. 8,446,341; 9,488,853; 10,732,416 and 10,873,401, each of which is incorporated by reference herein in its entirety. In one embodiment, the viewing device is foldable and/or flexible.

In one embodiment, the viewing device includes a sensor to detect light in an environment. For example, the sensor is a camera (e.g., smartphone camera). In one embodiment, the viewing device includes a sensor operable to detect light in non-visible wavelengths (e.g., ultraviolet (UV) camera, infrared (IR) camera). In one embodiment, the sensor is used to capture images and the viewing device displays the images in real time or near-real time.

In one embodiment, the viewing device is operable to display colors outside of an ITU-R BT.2020 color gamut, a P3 color gamut, and/or an ITU-R BT.709 color gamut. The viewing device preferably is operable to display colors outside of the ITU-R BT.2020 color gamut. The ITU-R BT.2020 gamut covers 75.8% of the CIE 1931 color space. The viewing device is preferably operable to display at least 76% of the CIE 1931 color space. In a more preferred embodiment, the viewing device is operable to display at least 80% of the CIE 1931 color space. In one embodiment, the viewing device is operable to display at least 85% of the CIE 1931 color space. In another embodiment, the viewing device is operable to display at least 90% of the CIE 1931 color space. In yet another embodiment, the viewing device is operable to display at least 95% of the CIE 1931 color space. In still another embodiment, the viewing device is operable to display at least 97% of the CIE 1931 color space.

In a preferred embodiment, the viewing device is advantageously constructed and configured to display at least four primaries. Increasing the number of primaries in the viewing device to at least four primaries increases color accuracy of the viewing device relative to conventional RGB displays. Additionally, this allows for accurate display of colors that are traditionally difficult to reproduce on conventional RGB displays. The viewing devices includes at least one component to provide the at least four primaries (e.g., at least one color wheel, a plurality of LEDs, etc.). In one embodiment, the at least four primaries include red, green, blue, and cyan. In another embodiment, the at least four primaries include red, green, blue, cyan, and yellow. In yet another embodiment, the at least four primaries include red, green, blue, cyan, yellow, and magenta. In still another embodiment, the at least four primaries include red, a first green, a second green, and blue. In yet another embodiment, the at least four primaries includes at least one white primary. For example, teal is a color that is difficult to reproduce using conventional RGB displays. Adding a cyan primary increases the color accuracy of teal and the sensitivity of the display to colors in the region between green and blue on an RGBC display when compared to a conventional RGB display. In another embodiment, the viewing device is an RGB or CMY display.

The viewing device is preferably operable to display flesh tones with increased color accuracy. As previously described, flesh tones are important for entertainment, medical, and/or scientific purposes. In particular, the ability to identify and detect flesh tones is important for diagnostic imaging related to the skin and other organs (e.g., brain, lungs, etc.). A person's skin tone can vary slightly due to a number of factors, but the two main influences are health and emotion. The human visual system has been optimized to detect small changes in skin reflectivity due to blood flow and oxygenation. The M (green) and L (red) cones are operable to detect these changes. There is a long-standing, unmet need for an extended gamut providing more accurate flesh tones. In a preferred embodiment, the viewing device is an RGBCMY viewing device. The viewing device preferably includes a yellow primary. In one embodiment, the viewing device has a red primary with a longer wavelength than 615 nm. Flesh tones often appear yellowish or reddish after color correction. Additionally, skin often appears shiny after color correction. Increasing a cyan component and/or a magenta component improves the color accuracy of the flesh tones and reduces the shiny appearance of skin.

The viewing device is preferably operable to display natural surfaces (e.g., natural reflective surfaces) with increased color accuracy. As previously described, the multi-primary systems of the present invention provide an extended gamut in the cyan region. The extension into the cyan area as well as into the shorter wavelength green area expands the reproduction of foliage, water, ice, and other natural items. There is a long-standing, unmet need for an extended gamut providing more accurate reproduction of natural items.

In one embodiment, the viewing device includes pixels in a hexagonal shape. In one embodiment, the viewing device includes six primaries and each pixel in the six-primary color system is a hexagonal shape. Each hexagonal pixel is divided into six equilateral triangles and each of the primaries in the six-primary color system is displayed by one of the six equilateral triangles as described in U.S. patent application Ser. No. 12/005,931, filed Jul. 3, 2008, which is incorporated herein by reference in its entirety.

In one embodiment, each pixel in the viewing device is comprised of subpixels of the same size and area arranged in at least one row and/or at least one column. In one embodiment, each pixel is divided into six subpixels of the same size and area arranged in two rows of three columns for a six-primary color system. In another embodiment, each pixel is divided into six subpixels of the same size and area arranged in three rows of two columns. In yet another embodiment, each pixel is divided into six subpixels of the same size and area arranged in one row. In yet another embodiment, each pixel is divided into six subpixels of the same size and area arranged in one column. The luminance and intensity of each subpixel is dependent on the luminance and intensity of the adjacent subpixels in order to minimize the distinct visibility of individual subpixel and pixel structures. In one embodiment, complementary primary color subpixels are adjacent to each other to eliminate visual artifacts.

In one embodiment, each pixel is divided into subpixels of different shapes, sizes, and/or areas. The size and number of subpixels for each primary color minimize blue and cyan spatial resolution without affecting the overall resolution of the viewing device as described in U.S. patent application Ser. No. 12/909,742, filed Oct. 21, 2010, now U.S. Pat. No. 8,451,405, which is incorporated herein by reference in its entirety.

In another embodiment, each pixel unit is divided into two subpixel units wherein one of the two subpixels is a first set of primaries and the other subpixel is a second set of primaries. In one embodiment, the second set of primaries is complementary to the first set of primaries. In one embodiment, one of the two subpixels is an RGB color and the other subpixel is the complementary CYM color of the first subpixel as described in U.S. patent application Ser. No. 12/229,845, filed Mar. 5, 2009, which is incorporated herein by reference in its entirety.

In one embodiment, each pixel includes at least one white subpixel to eliminate visual artifacts. In one embodiment, the at least one white subpixel includes a D65 white subpixel, a D60 white subpixel, a D45 white subpixel, a D27 white subpixel, and/or a D25 white subpixel. Advantageously, using a D65 white subpixel eliminates most of the problems with metamerism. In a preferred embodiment, the at least one white subpixel is a single white subpixel that matches the white point (e.g., a D65 white subpixel for a D65 white point). In another embodiment, the at least one white subpixel is at least two white subpixels. The at least two white subpixels are preferably separated such that a linear combination of the at least two white subpixels covers a desired white Kelvin range. In one embodiment, the at least two white subpixels include a D65 white subpixel and a D27 white subpixel. In another embodiment, the at least two white subpixels include a D65 white subpixel and a D25 white subpixel.

In yet another embodiment, the at least two white subpixels includes three white subpixels. In one embodiment, the three white subpixels include a D65 white subpixel, a D45 white subpixel, and a D27 white subpixel. Alternatively, the three white subpixels include a D65 white subpixel, a mid-Kelvin white subpixel (e.g., D45), and a D27 white subpixel. In a preferred embodiment, the mid-Kelvin white subpixel includes a green bias. Advantageously, the green bias compensates for the slight magenta shift (e.g., when going from D25 to D65 with the straight line between the two points below the blackbody locus). Colors near the white locus and beyond are then a combination of the at least two white subpixels (e.g., two white subpixels, three white subpixels). A majority of colors will have a white component that is broad band. Therefore, the resultant spectra of a mixture of color primaries and white primaries will also be broad band with an extent dependent on an amount of the at least one white primary. A higher broad band character of light results in fewer metameric problems. This is due to a white point being comprised of a combination of color primaries (e.g., RGB, CMY, RGBC, RGBCMY, etc.) in a non-white subpixel system. Total luminance is then related to intensities of the color primaries (e.g., RGB, CMY, RGBC, RGBCMY, etc.).

Advantageously, if at least one white subpixel is included, increased luminance can be achieved separate from the color primaries. Additionally, colors such as vibrantly colored pastels are attained by using the color primaries to "color shift" a bright white to the pastel. Alternatively, a fine balance of the color primaries is required, and small changes in a ratio of the color primaries will produce an unwanted color shift. Thus, a system with at least one white subpixel is more tolerant to minor variations of intensity of the color primaries.

In one embodiment, the white point of the multi-primary color system changes depending on the viewing device or the display mode. In one embodiment, the addition of white subpixels widens the bandwidth of the filter for each non-white primary.

In one embodiment, each pixel is formed of fewer than the at least four primaries (e.g., three of four primaries, four of five primaries, five of six primaries, etc.). In one embodiment, each pixel is composed of fewer than six primary colors from the 6P gamut. The viewing device is composed of alternating and repeating subpixel patterns. In another embodiment, the viewing device is composed of nonrepeating subpixel patterns.

In one embodiment, the subpixel colors in a pixel and in adjacent pixels are arranged to minimize the spatial distance between colors that have maximal color distance from each other as described in U.S. patent application Ser. No. 10/543,511, filed Jan. 13, 2003, now U.S. Pat. No. 8,228,275, which is incorporated herein by reference in its entirety.

In one embodiment, each pixel is one single primary color from the multi-primary system (e.g., 6P gamut). In one embodiment, patterns of pixels are repeated across the viewing device to minimize visibility of individual pixel structures as described in U.S. patent application Ser. No. 13/512,914, filed Nov. 25, 2010, which is incorporated herein by reference in its entirety.

In one embodiment, the viewing device includes at least one perovskite. In one embodiment, the at least one perovskite is a lead halide perovskite. In one embodiment, the at least one perovskite is used as a quantum dot nanocrystal. In one embodiment, the at least one perovskite is a perovskite polymer bead. When light shines through the perovskite polymer bead, the color changes depending on the composition of the perovskite polymer bead (e.g., green, red, etc.). In one embodiment, the at least one perovskite is incorporated into a perovskite LED. Examples of perovskite LEDs are described in Lin, K., et al. (2018). Perovskite light-emitting diodes with external quantum efficiency exceeding 20 percent. Nature, 562(7726), 245-248, which is incorporated herein by reference in its entirety. In one embodiment, the at least one perovskite is 3D printed. See, e.g., Zhou, Nanjia, Yehonadav Bekenstein, Carissa N. Eisler, Dandan Zhang, Adam M. Schwartzberg, Peidong Yang, A. Paul Alivisatos, and Jennifer A. Lewis. 2019. "Perovskite Nanowire-Block Copolymer Composites With Digitally Programmable Polarization Anisotropy." Science Advances, which is incorporated herein by reference in its entirety.

In yet another embodiment, the viewing device is a direct emissive assembled display. The design for a direct emissive assembled display includes a matrix of color emitters grouped as a multi-primary color system (e.g., 6P system). Individual channel inputs drive each Quantum Dot (QD) element illuminator and/or micro LED element. In one embodiment, the quantum dots modulate light according to image data as described in U.S. patent application Ser. No. 15/905,085, filed Feb. 26, 2018, now U.S. Pat. No. 10,373,574, which is incorporated herein by reference in its entirety.

Additional details about the multi-primary system and the display are included in U.S. application Ser. No. 17/180,441 and U.S. Patent Publication Nos. 20210295762, 20210027693, 20210020094, 20210035487, and 20210043127, each of which is incorporated herein by reference in its entirety.

Super Saturated Colors

A white point is a set of chromaticity values that define the color "white" in an image. Standard video processing is based on an RGB system where the maximum white is attained when all three primaries are near maximum, only varied slightly to produce the desired color point for the white. Convention dictates that white is the sum of the color primaries, so peak white in a red, green, and blue (RGB) system is defined as [1 1 1] and the individual red, green, and blue primaries are defined as [1 0 0], [0 1 0], and [0 0 1], respectively. However, this definition of the white point is a result of convention rather than a constraint.

In this type of system, the maximum luminance of individual colors (e.g., RGB) is tied to the white point. For example, a white of 100 nits (1 nit=1 cd/m$^2$) luminance has a component red channel whose characteristics has a luminance of 25 nits. In this case, the luminance limit of the red is 25 nits.

In a super saturated system of the present invention, image data for display on a display or viewing device with a potential white luminance in a standard system with a maximum luminance (e.g., of 125 nits) is processed such that colors near the white point are reduced to a limited luminance (e.g., 100 nits). As the chroma (color saturation) of the displayed color is increased, a luminance attenuation is decreased. At very high chroma, there is no restriction on the luminance and the luminance of the red from the previous example with a standard 25 nit maximum is now 25*125/100=31.25 nits with the white still at 100 nits.

The overall image neutral scale ranges from 0 to the limited luminance (e.g., 100 nits), but the color neutral scale ranges from 0 to standard color luminance*maximum luminance/limited luminance. For example, the color neutral scale ranges from 0 to 25*125/100. The 25, 125, and 100 are just arbitrary values for illustration, and the present invention is compatible with other values of standard color luminance, maximum luminance, and limited luminance. In another example, a high-powered display capable of a 2000 nit white is processed such that the white is at 1000 nits. This is a reasonable High Dynamic Range (HDR) setup. In terms of the preceding example, this results in a high chroma red with a luminance of 0.25*2000=500 nits instead of the standard 0.25*1000=250 nits. The high chroma red appears much brighter than expected in a standard system and look more like a fluorescent color. True fluorescent colors get their properties from their normal reflectance characteristics as well as the absorption, excitation, and emission of light that adds the emission to the reflection such that the resulting light to the eye is perceived as high chroma or "fluorescent." In the present invention, high chroma colors are operable to be displayed as fluorescent colors by scaling the luminance by the maximum luminance relative to the white point.

Relative luminance includes values normalized (e.g., to 1, to 100) to a white point. Relative luminance is defined as Y in color spaces, such as Yxy and XYZ. No separate calculation is necessary to determine relative luminance because it is explicitly defined as Y in those color spaces. However, other color spaces do require a calculation of relative luminance. For example, in ITU-R BT.709, relative luminance is calculated using the following equation:

$$Y=0.2126R+0.7152G+0.0722B$$

This formula reflects the fact that humans perceive green light as contributing most to luminance, and blue light as contributing least.

In some high dynamic range (HDR) systems (e.g., the perceptual quantizer (PQ) system), the RGB sum has a peak luminance of 10,000 cd/m². For example, if a viewing device has a brightness of 10,000 cd/m², a 100% white pixel is displayed as 10,000 cd/m² on the viewing device. However, if this level of white light is not required, then colors beyond the RGB sum are possible. If the neutral tone scale (e.g., from 0 to a maximum white Y value) selected has a neutral tone maximum white with Y below the maximum Y value of all primaries at maximum value, then the allowable individual color tone scales will range from 0 to the maximum Y of each color. Advantageously, this allows a higher achievable Y value for bright and high chroma colors relative to the white point Y value. The systems and methods described herein are operable to be used with other peak luminance values.

The workflow for this process is quite simple when combined with transport systems that separate luminance from chroma, such as System 4 (Yxy). In color spaces where luminance is a separate component, Y is limited to a lower value than the maximum Y value of the display or the viewing device. In one embodiment, a linear scaling method is used to limit Y to a lower value (e.g., 90%, 80%, 75%, 70%, 60%, 50%). For example, when Y is limited to 75%, this results in a maximum white brightness that is 25% lower than when maximum R, G, and B are summed. However, no limit is placed on the original R, G, and B values. This allows saturated colors to be brighter than white, resulting in colors within the gamut, but shown as far more saturated than in a system where white is the sum of the maximum primaries (e.g., RGB). Thus, if an RGB color of [1 0 0] is displayed on a viewing device, the red is increased by 33% relative to the luminance of the white, and thereby the red is brighter and perceived as seemingly fluorescent when compared to a system with a traditional white point. Advantageously, this approach achieves the display of emulated fluorescent images without the use of fluorescent materials in the viewing device. Similarly, if a color of [1 1 1] is displayed on a viewing device, the white is increased by 33% relative to the brightness of the white point, and thereby produces a white that that is perceived as a "super white" color relative to the white point.

In one embodiment, the luminance (Y value) of at least one color is reduced depending on a chroma of the at least one color. In one embodiment, low chroma leads to the highest reduction in Y value and a high chroma leaves the Y value unchanged. Typically, neutrals have zero or very low chroma. Chroma can be defined in many ways. In one embodiment, the chroma is defined in a Yxy system. In a Yxy system, the chroma is preferably defined as a length of a vector in x,y space. Conventional vector length calculation in this case is as follows:

$$\mathrm{chroma}=\sqrt{(x-x_{\mathrm{white}})^2+(y-y_{\mathrm{white}})^2}$$

This is a distance formula where $x_{white}$ and $y_{white}$ are the x and y of the white point selected. Therefore, if x is close to $x_{white}$ and y is close to $y_{white}$, then the chroma (i.e., distance) is near 0.0 and a greater Y reduction is applied. In the case of a maximum red in a conventional system, if the Y value of the white ($Y_{white}$) is reduced to 0.75 of the maximum potential Y value, the Y value of the red ($Y_{red}$) follows along and is reduced to 0.75 of the maximum potential. An image will be identical to the maximum position albeit less bright. In the process of the present invention, the Y value of the neutral scale will be reduced by 0.75, but the red is not changed. So, in a typical RGB system where the $Y_{red}=0.2126*R$ with R=1 results in $Y_{red}=0.2126$ and $Y_{white}=1$. In the super saturated colors process described in the present invention, the $Y_{white}$ is 0.75, but the $Y_{red}$ is unchanged at 0.2126. The ratio of $Y_{red}/Y_{white}$ increases from the conventional system of 0.2126 (i.e., 0.2126/1.00) to 0.2835 (i.e., 0.2126/0.75), which represents an increase in relative luminance of red by 33%.

The scaling of the reduction between the neutral scale and the color scale is operable to be a linear function (e.g., multiplication by 0.75) or any other function (e.g., a non-linear function). In one embodiment, the non-linear function is a gamma function with a gamma value. In one embodiment, the gamma value is greater than 1.0, which decelerates the Y reduction to higher chroma positions before achieving the point of no Y reduction. In another embodiment, the gamma value is less than 1.0, which results in a decrease in the Y value being accelerated in colors near the white point. Any other reduction curve is possible to achieve the desired perceptual effect.

In one embodiment, the transition from 0 to full attenuation is a non-linear function (e.g., gamma 2.0), where the attenuation is delayed near neutral and then speeds up as it approaches the highest chroma color position. This transition is operable to be tailored to an application and/or a desired look of the overall image.

The methodology is to process image data such that for each color point, a value of a chroma is determined. A luminance of the color point is decreased depending on a proximity to a neutral (zero chroma) scale. If the algorithm is just linear, then a simple linear attenuation is performed on the color point based on the value of the chroma. If near zero chroma, full attenuation to the chosen reduction level. If highest chroma, the luminance of the color point is unchanged.

Skin chroma is usually fairly close to the neutral scale and techniques such as a gamma transition curve (or others) that leave the color point of a skin sample unchanged or minorly changed may be desired to keep the skin color perception the same, but allow the high chroma colors to be exaggerated. Advantageously, a gamma value greater than 1.0 preserves flesh tones. Skin has relatively low chroma relative to individual red, green, and blue values. The gamma value greater than 1.0 compresses the low values and enhances the higher values. So, by adjusting the gamma of the scale, the look of the flesh is preserved by minimizing increase in Y, but any colors higher in chroma will be boosted in Y.

Figure 35A:
FIG. 35A illustrates an example image of a woman with a chip chart.
Figure 35B:
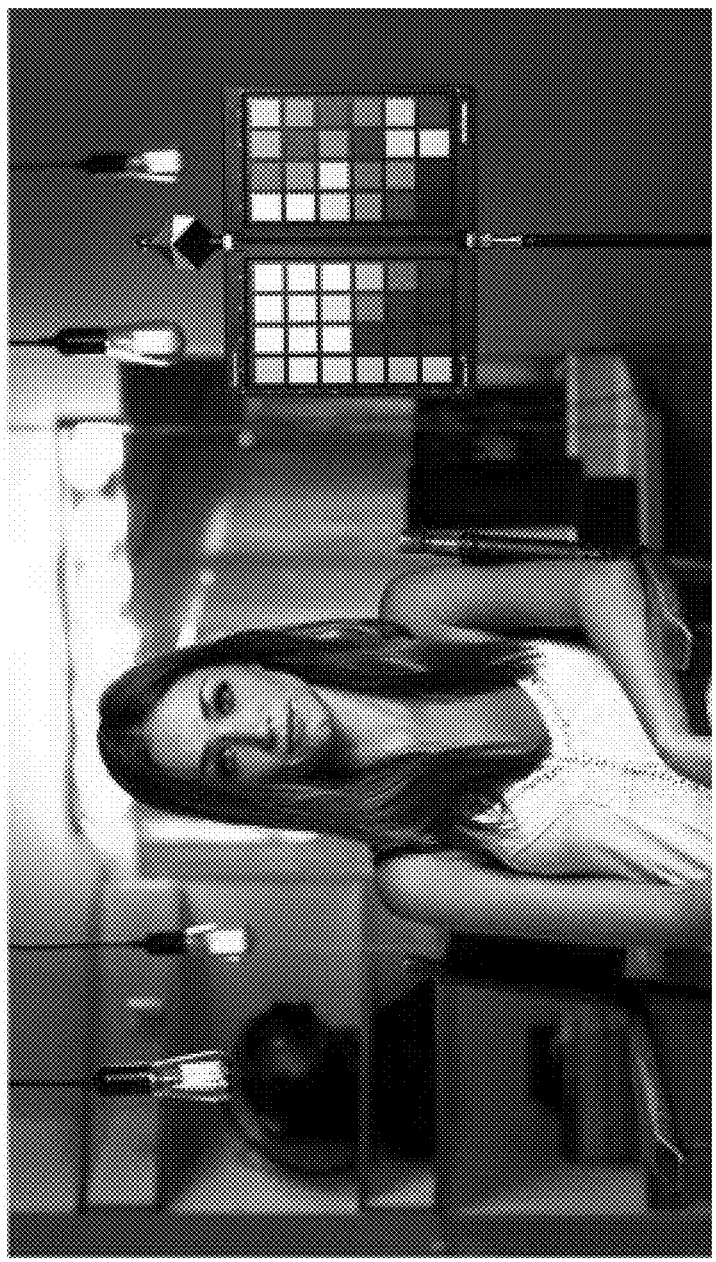
FIG. 35B illustrates a modified image of the woman with the chip chart.
Figure 35C:
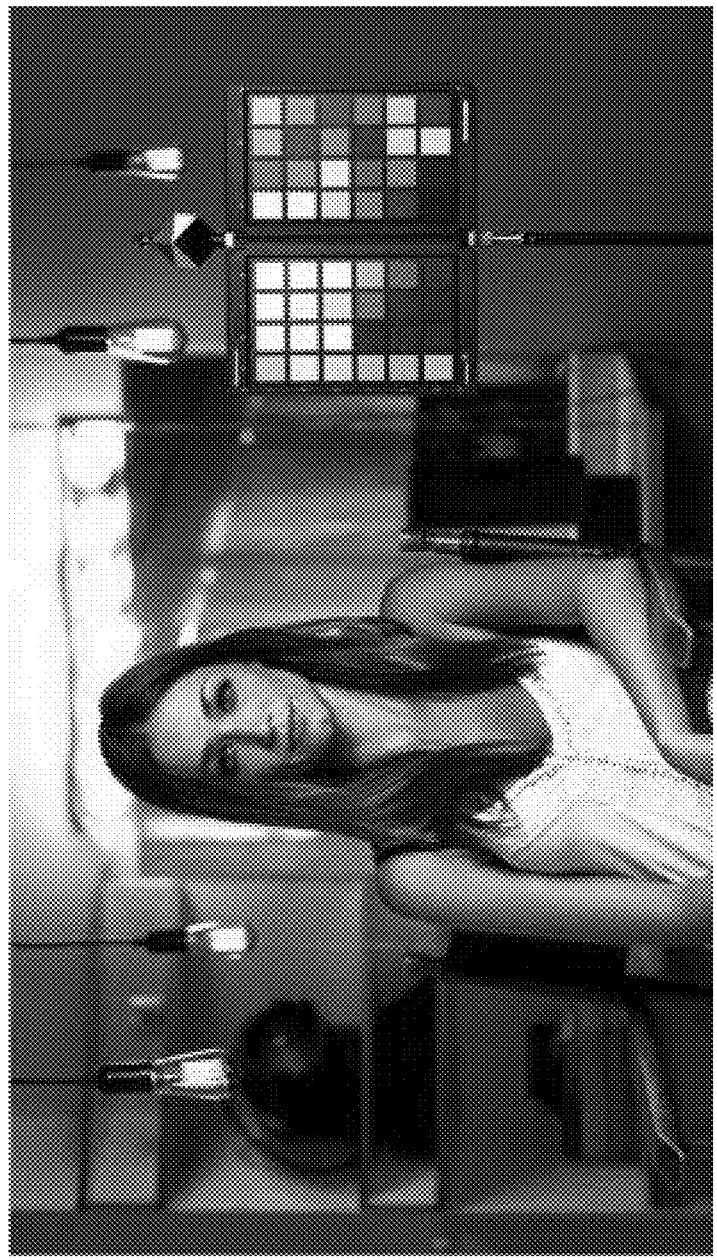
FIG. 35C illustrates another modified image of the woman with the chip chart.

FIG. 35A illustrates an example image of a woman with a chip chart. FIG. 35B illustrates a modified image of the woman with the chip chart. In the image shown in FIG. 35B, the image in FIG. 35A is processed with a gamma of 2.2 and then a luma factor of 80% is applied. FIG. 35C illustrates another modified image of the woman with the chip chart. In the image shown in FIG. 35C, the image in FIG. 35A is processed with a gamma of 2.2 and then a luma factor of 70% is applied. As can be seen in the images in FIGS. 35B and 35C, the flesh color is maintained from FIG. 35A.

In another embodiment, the super saturated system does not modify colors within a hue angle range and a chroma range. In one example, if a color is in the hue angle range of flesh tones and the color has a specific chroma range, then the super saturated system keeps the higher reduced Y to leave the flesh unchanged. In one embodiment, the hue angle range and the specific chroma range are part of the tone curve.

The color metric used to determine the "chroma" is operable to be one of the current (or future) color specification metrics. Color metric types include, but are not limited to, XYZ, Yxy, ACES, ITP (ICtCp), L*a*b*, CIE-CAM02, and/or RGB primary specific color spaces (e.g., Rec-2020, Rec-709, P3, etc.). In these cases, the chroma and luminance is operable to be readily assessed. In one embodiment, chroma and luminance is determined by transformation into an HVC (Hue, Value, and Chroma) space. Advantageously, transformation into an HVC space facilitates chroma and luminance calculations.

In one embodiment, the calculation (i.e., the scaling of the reduction) is performed in-line with hardware, software, and/or at least one 3D lookup table (LUT). Advantageously, a 3D LUT dramatically reduces the processing required to perform the calculation.

In one example, a 1000 cd/m$^2$ RGB system has a white point limited to about 300 cd/m$^2$. To achieve the white point, the luminance is driven down, limited, and/or reduced such that when R, G, and B are added together the result is 300 cd/m$^2$. In one embodiment, the white point is defined by using a look-up table (LUT). If the color space is envisioned as a 1000 cd/m$^2$ cube, every color in the cube is mapped such that chroma extends out from the white point depending on its chroma level. In one embodiment, the luminance of a color is decreased depending on how close it is to the white point. For example, the luminance is decreased for colors close to the white point. However, as colors extend away from the white point, the luminance is allowed to persist (e.g., to 300 cd/m$^2$). Thus, there is a sliding scale for luminance. The systems and methods described herein are operable to be used with other peak luminance values and other reduction values.

Figure 36A:
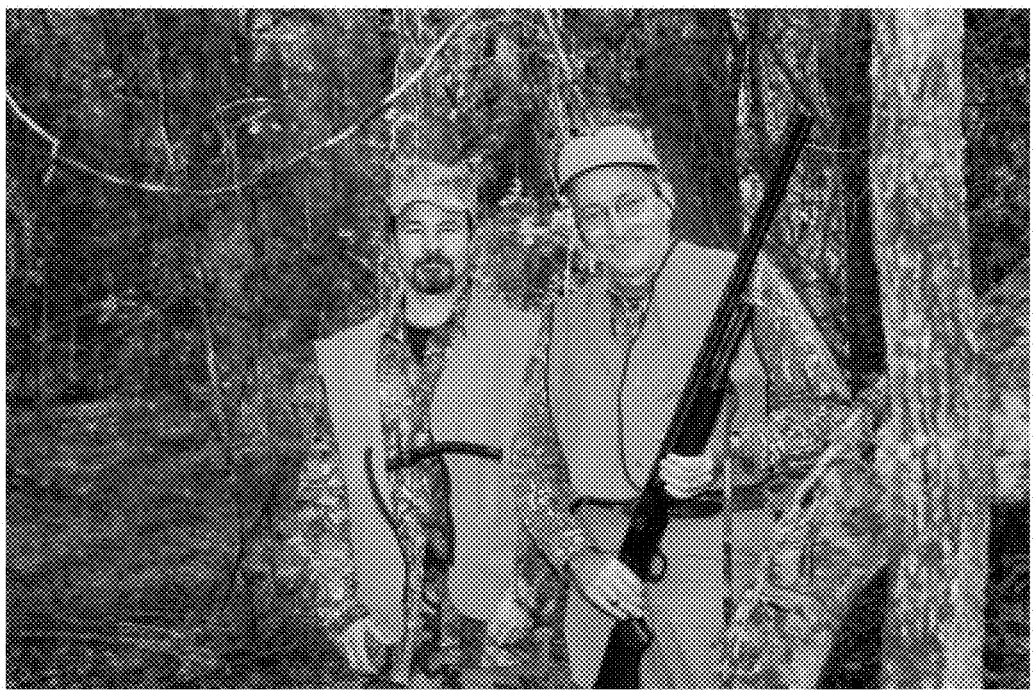
FIG. 36A is an example of an image using traditional processing.
Figure 36B:
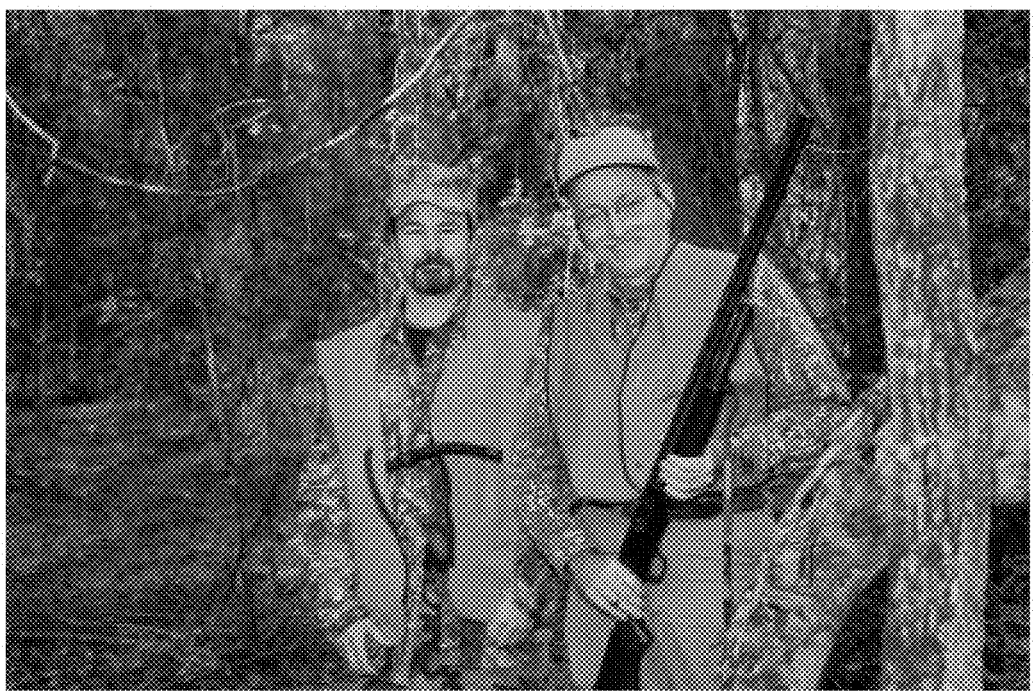
FIG. 36B is an example of an image using the modified color system with super saturated colors.

In one embodiment, if the system is given a neutral image, it results in nothing displayed beyond a luminance of 300 cd/m$^2$. However, if a modified color system with super saturated colors is used, up to 1000 cd/m$^2$ in the example embodiment are operable to be displayed. For example, in an image of hunters in a field wearing orange fluorescent vests, the orange fluorescent vests would appear vibrant when compared to white. FIG. 36A is an example of an image using traditional processing. FIG. 36B is an example of an image using the modified color system with super saturated colors.

Figure 37A:
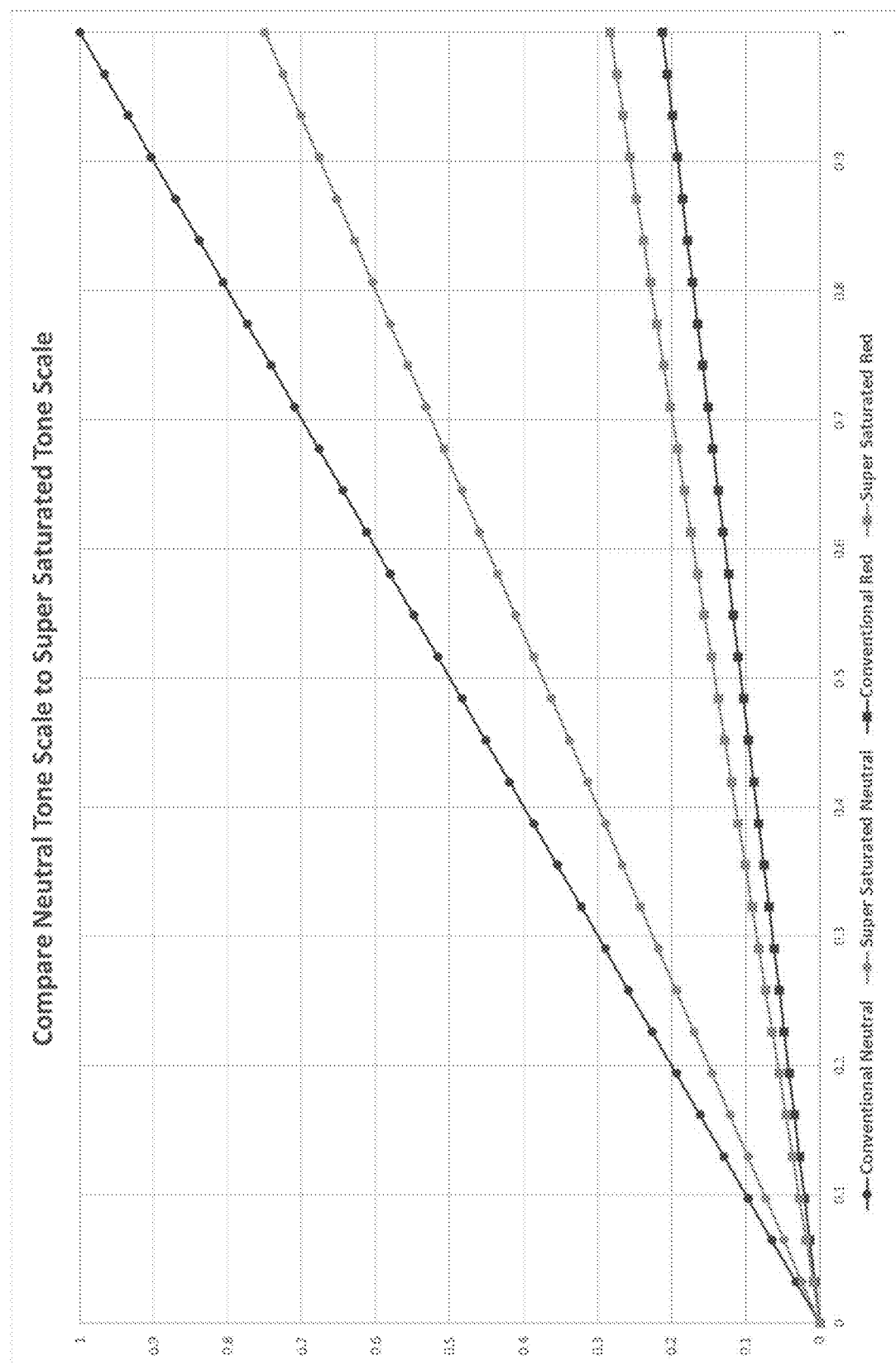
FIG. 37A is a graph comparing a neutral tone scale to a super saturated tone scale.

FIG. 37A is a graph comparing a neutral tone scale to a super saturated tone scale. Conventional neutral is shown with red circles, super saturated neutral is shown with green circles, conventional red is shown with red squares, and super saturated red is shown with green squares. The luminance of the conventional neutral (red circles) is higher than the luminance of the super saturated neutral (green circles). However, the luminance of the conventional red (red squares) is lower than the luminance of the super saturated red (green squares).

Figure 37B:
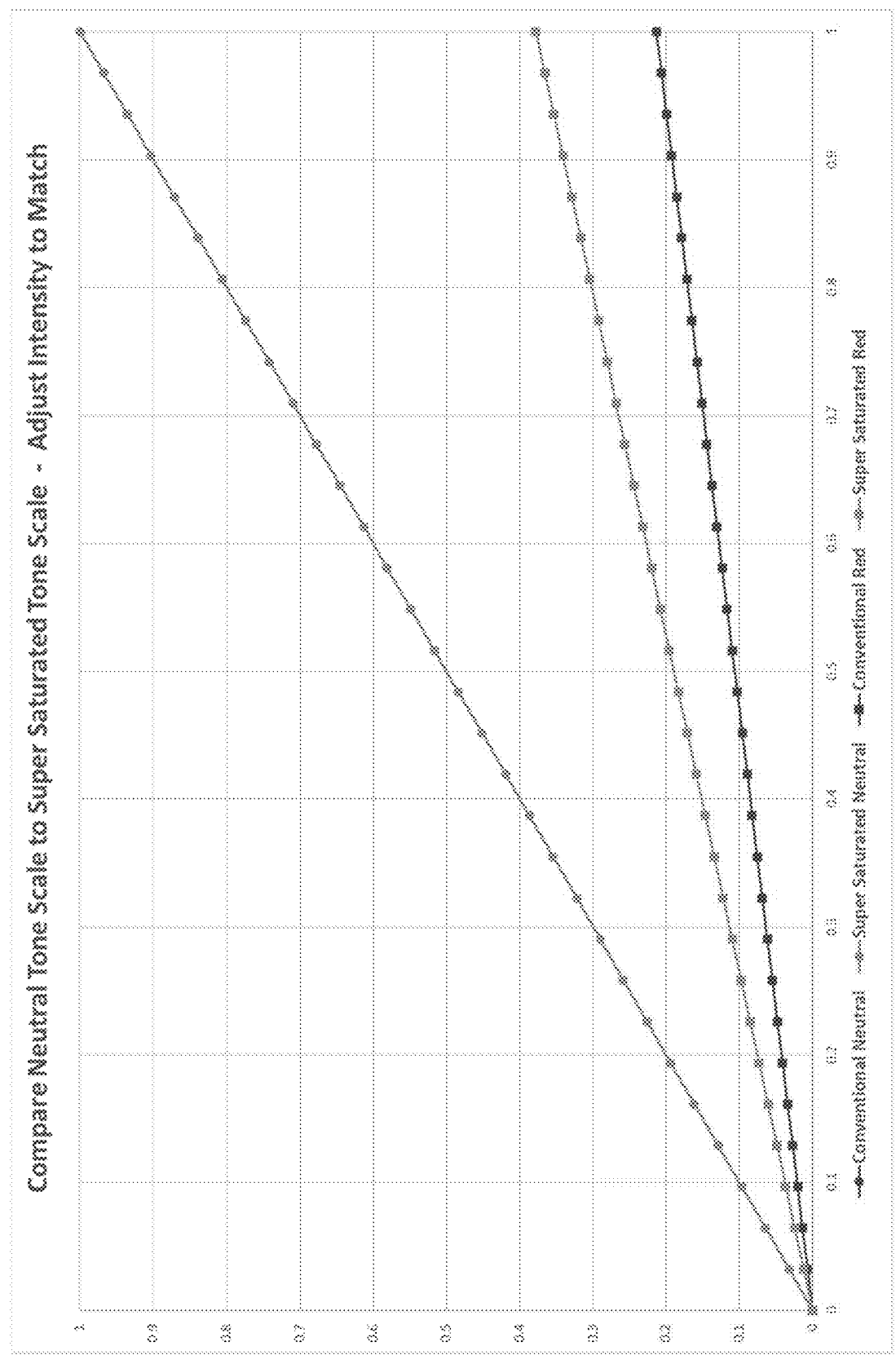
FIG. 37B is a graph comparing a neutral tone scale to a super saturated tone scale with matching intensities.

FIG. 37B is a graph comparing a neutral tone scale to a super saturated tone scale with matching intensities. Conventional neutral is shown with red circles and super saturated neutral is shown with green circles, resulting in an overlap of conventional and supersaturated neutral. Conventional red is shown with red squares and super saturated red is shown with green squares. The luminance of the conventional neutral (red circles) is adjusted to equal the luminance of the super saturated neutral (green circles). The luminance of the conventional red (red squares) is lower than the luminance of the super saturated red (green squares), and it is easier to visualize the increase in luminance of the super saturated red (green squares) relative to conventional red (red squares) in FIG. 37B.

In traditional color images, a person's perception of the color images is self-calibrated to a tone scale intensity range of a display or viewing device, and colors outside of this range are perceived as "super color" or "extra saturated colors". A person's perception of the overall tone scale sets up an anticipated color tone scale. Therefore, any enhancement from this will be perceived as expanded color.

Figure 38A:
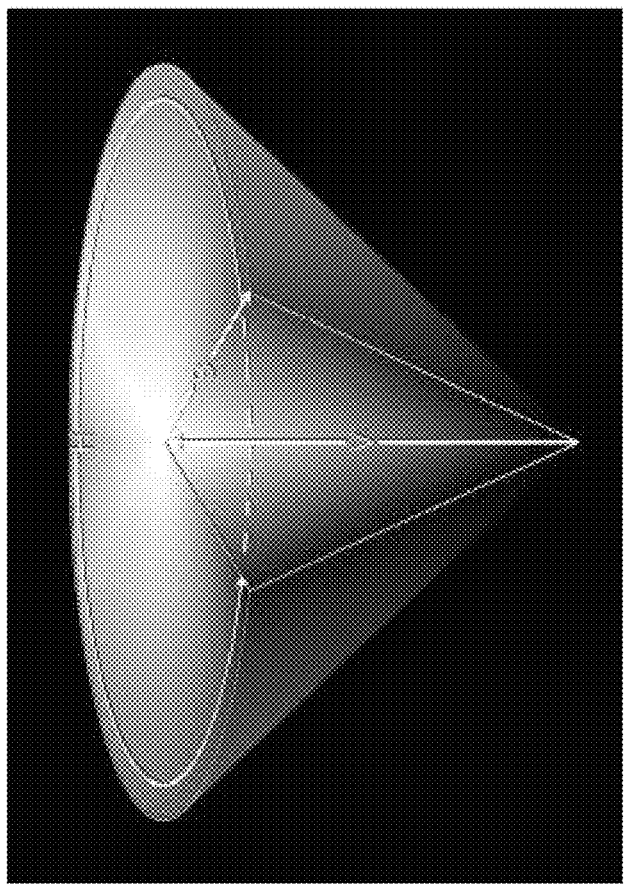
FIG. 38A is an example of a Hue, Saturation, Value (HSV) cone.
Figure 38B:
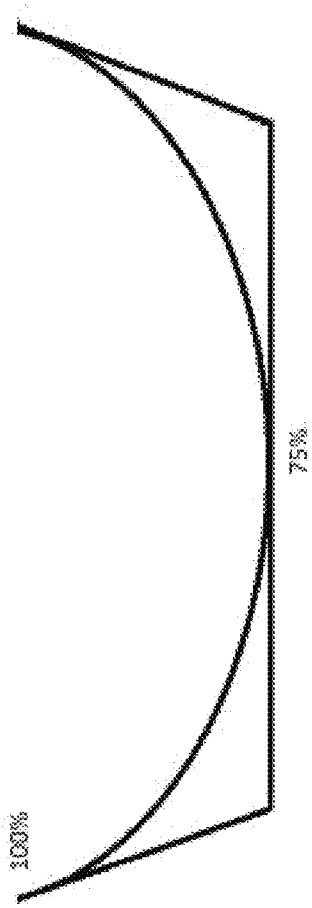
FIG. 38B is an example of a cross section of the cone in FIG. 38A after modification to have super saturated colors.

FIG. 38A is an example of a Hue, Saturation, Value (HSV) cone. By reducing the luminance in the center, a cross section of the cone results in a shape similar to FIG. 38B. The slope of the valley depends on the function (e.g., linear, non-linear) used to reduce the luminance.

With systems with more than three primaries (e.g., RGB), white is defined using all color primaries (e.g., RGBCMY). For example, a white in a four primary system would normally be defined as [1 1 1 1], which would not result in an actual white color being displayed. For white, each primary is summed and then adjusted to provide the correct white (e.g., D65). This sum is naturally lower than all the primaries combined, leaving the output of the individual primaries to be more than the combination, resulting in super saturated color.

There are two main scenarios for systems with at least four primaries. In one embodiment, the relative amounts of the at least four primaries have no relation to the desired white point. For example, in a four primary system, a maximum intensity is achieved by a [1 1 1 1] where all of the primaries are at maximum value. However, this may not be neutral white, or close to the desired white chromaticity. In this case, the maximum desired white point is generated by a combination of the primaries, and higher luminance results in deviation from the desired white point chromaticity. The relative intensities of the primaries are then be rescaled such that a [1 1 1 1] signal achieves the desired white point chromaticity. In another embodiment, the previously mentioned rescaling is done in the display device as a calibration such that the desired white point is achieved with a [1 1 1 1] signal. In either case, the Y reduction algorithm is then applied either in-line (e.g., using hardware) or with another calculation mechanism, such as a 3D LUT.

However, one of the differences between a three primary system and one with more than three primaries is that the achievable white point is unique in the three primary system. There is only one combination of red, green, and blue that results in the white point in any desired luminance. In a system with more than three primaries, there are multiple primary combinations that can result in a white point. One method of obtaining a unique solution to achieve the desired white point is with a restriction that the solution yields the highest attainable Y value. After that, lower Y values can be achieved by a simple linear scaling of all the primaries. However, there are an infinite number of sets of primary combinations that are able to achieve a lower than maximum Y value for a white. This is typical of an over-determined system where the three colorimetric targets (e.g., Yxy, XYZ, etc.) are transformed into the primary intensity coefficients. The infinite number of sets are reduced in number by adding other constraints to the system (e.g., requiring the solution to yield the highest Y value for the desired white point). This applies to any system with a number of primaries greater than three.

The white level is reduced, so the display contrast range is reduced if measured in the traditional way. However, the saturation of any particular primary can exceed its saturation at the white point and, thus, its contribution to luminance is increased. Advantageously, this results in less reduction of contrast range according to a subjective perception as the reduction in white point cd/m$^2$ might suggest. HDR displays can be extremely bright. The embodiment described herein using super saturated colors is a much better use of the upper 25% of the range than limiting values in that range to super bright light sources like the sun, bright reflections, or specular light.

Figure 39:
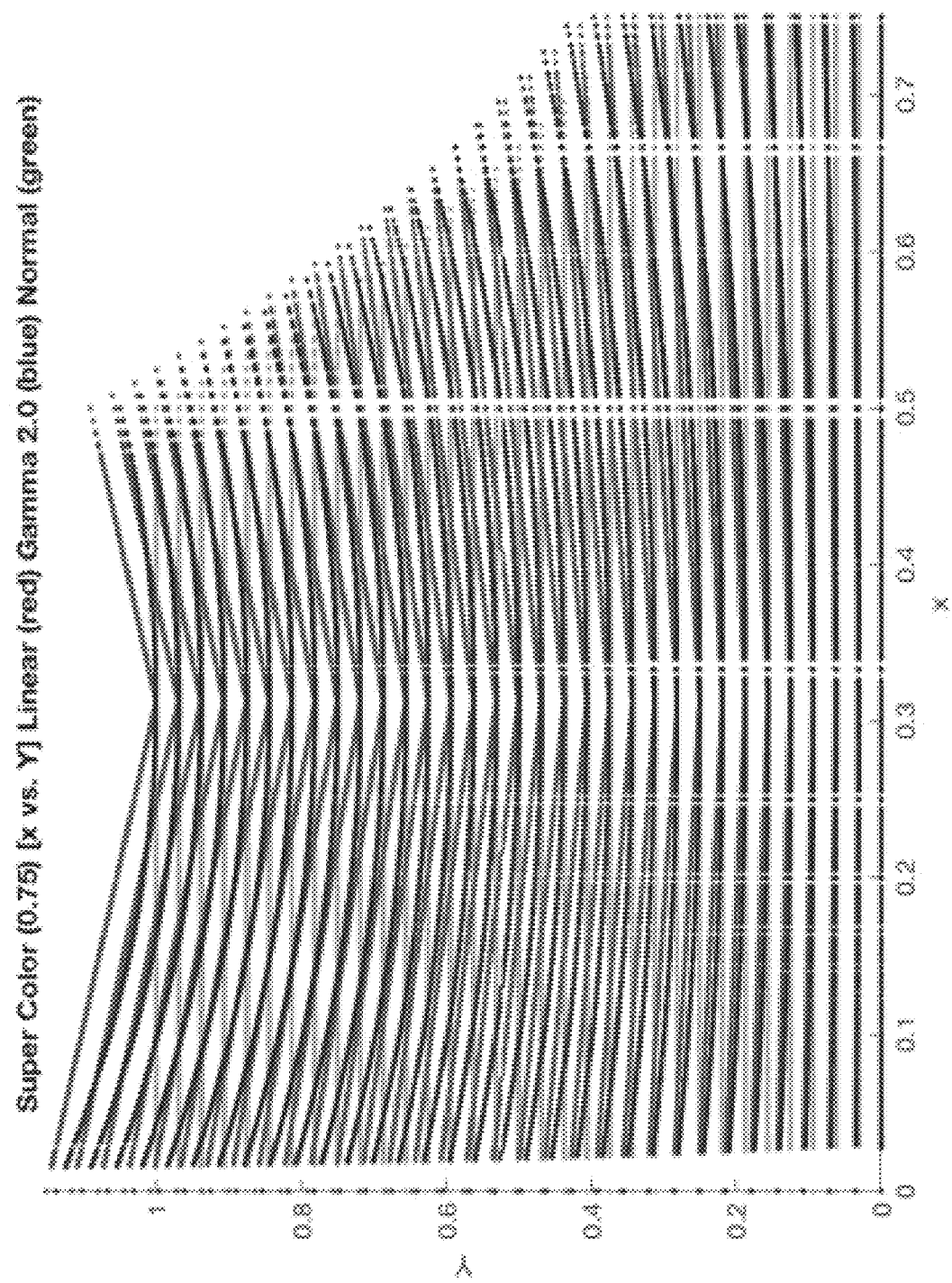
FIG. 39 is a plot of a three dimensional (3D) look up table (LUT) in xyY space with a normal unchanged set, a linear transform with super saturated colors, and a non-linear transform with super saturated colors.

FIG. 39 is a plot of a 33 cubed three dimensional (3D) look up table (LUT) in Yxy space with a normal unchanged set in green. Near the center of the x axis at about 0.32 is where the x value of D65 resides. At this point the increase in luminance of a color should be minimal. The red points illustrate a linear transform reducing maximum luminance from 100% to 75%. The blue points illustrate a gamma 2.0 transform from 100% to 75%. The white Y reduction is rescaled to compare with the unchanged set (green). This is reasonable if after this algorithm, the display or viewing device is increased in overall luminance to achieve a specific white luminance. Moving to the left or right away from the neutral center increase the red and blue curves relative to the reference green points. The blue points indicate that the gamma 2.0 transform maintains the Y of the reference more near the neutral before increasing as the chroma increases.

Figure 40A:
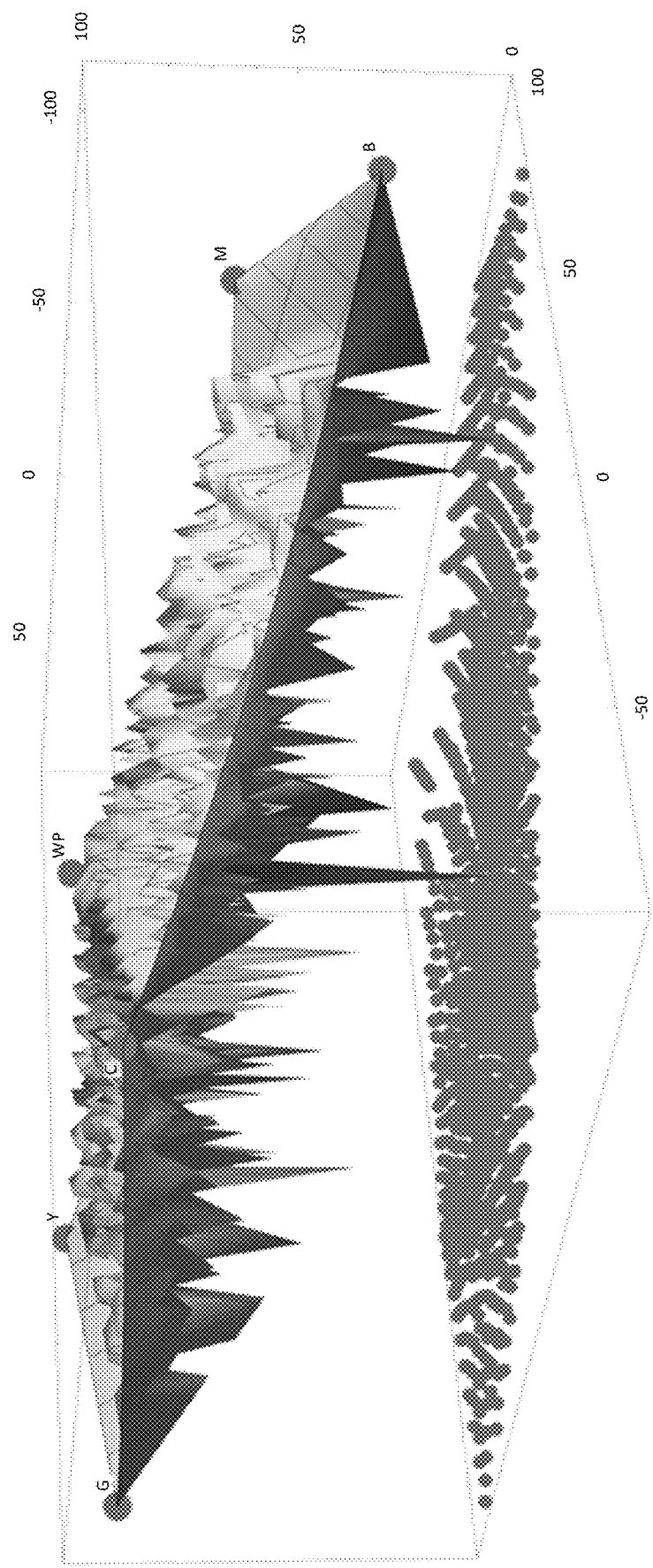
FIG. 40A is a plot of 6P-C in three-dimensional space.
Figure 40B:
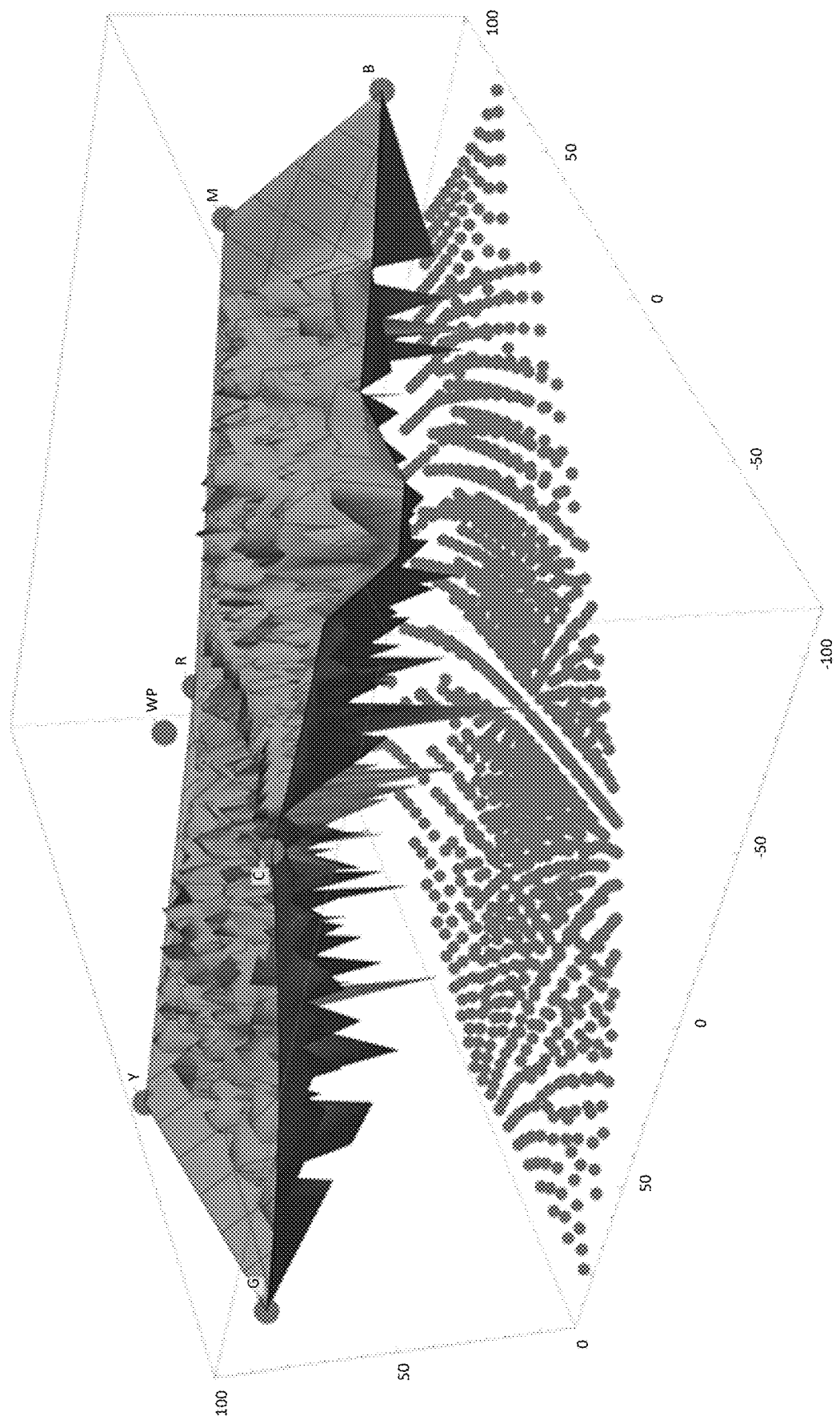
FIG. 40B is a plot of 6P-C with super saturated colors in three-dimensional space.
Figure 41:
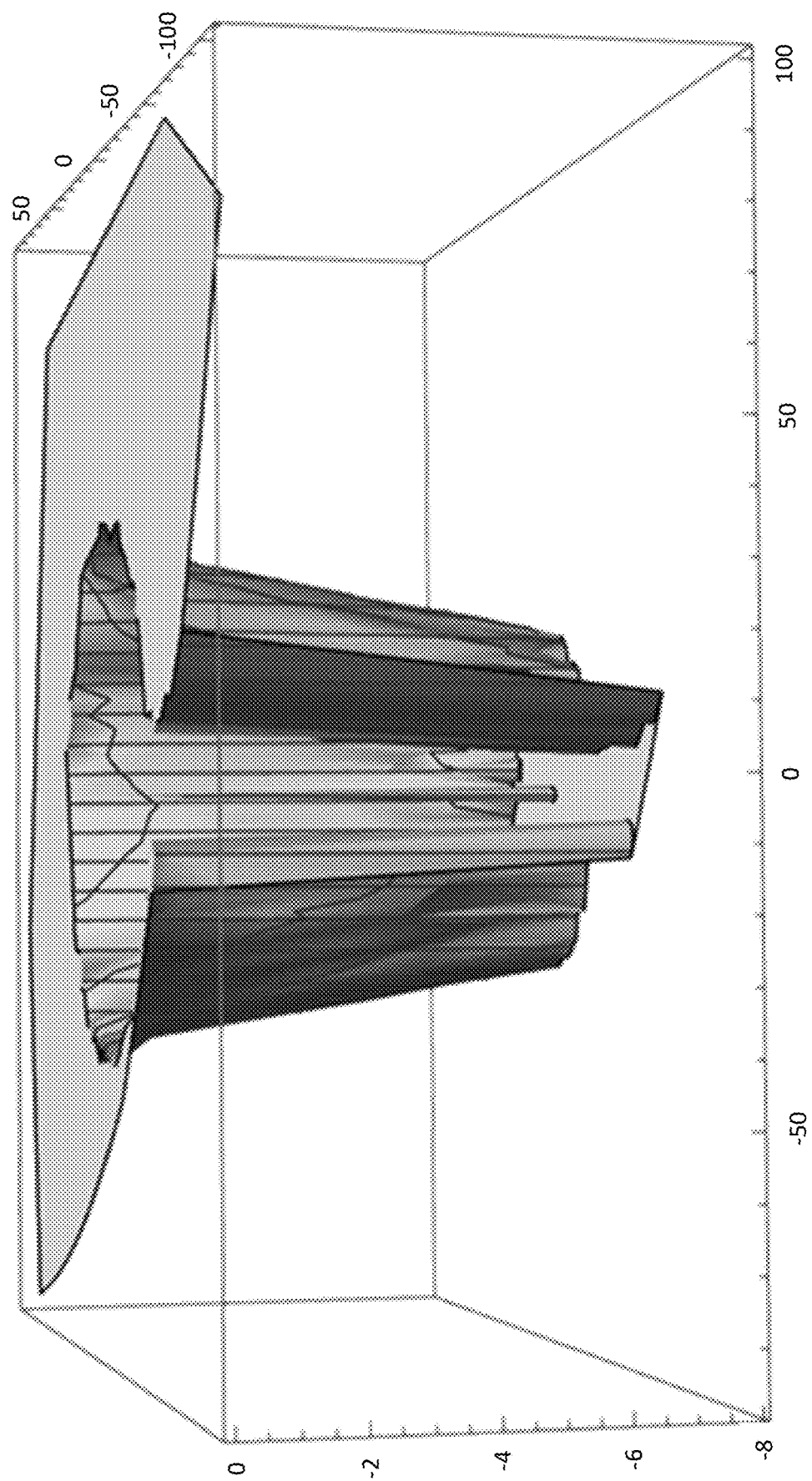
FIG. 41 illustrates a plot of 6P-C showing the transition from the white point at the bottom of the graph to the super saturated colors at the periphery.

FIG. 40A is a plot of 6P-C in three-dimensional space. The blue dots at the bottom of the plot show the chromaticity. Notably, the chromaticity does not change throughout the luminance scaling processes described in the present invention. FIG. 40B is a plot of 6P-C with super saturated colors in three-dimensional space. The blue dots at the bottom of the plot show the chromaticity, which is the same as the chromaticity in FIG. 40A. However, as can be seen in FIG. 40B, the original white point ("WP") is significantly higher in space than the area covered by a super saturated 6P-C system. FIG. 41 illustrates a plot of 6P-C showing the transition from the white point at the bottom of the graph to the super saturated colors at the periphery.

In one embodiment, the super saturated system is used to boost at least one color that is deficient (e.g., due to color blindness). A map of perception for the entire color space is generated (e.g., not just RGB). A transfer function is generated and an inverse transform is used to generate a LUT to normalize perceptions to an intent of the content.

Perception Optimization

In one embodiment, the present invention includes systems and methods to optimize perception on a viewing device. In a preferred embodiment, the systems and the methods are used to optimize perception of color and/or luminance on the viewing device. As previously described, perception of color is unique to a viewer. In one embodiment, the systems and methods of the present invention are used to optimize perception of a viewing device for a user with colorblindness or another visual defect.

Color vision impairment can have genetic causes and can also be a result of trauma to and/or degeneration of the human visual system. Photoreceptor cells called cone cells in the eye are responsible for color vision. Typically, there are three different types of cone cells: S-cones, M-cones, and L-cones. Each type of cone cell responds differently to different wavelengths of light. S-cones are sensitive to short wavelengths, M-cones are sensitive to medium wavelengths, and L-cones are sensitive to long wavelengths. The most common form of color vision impairment (colorblindness) is red-green blindness, which is a difficulty in distinguishing red from green and which affects about 8% of males and 0.4% of females. Red-green blindness corresponds to a dysfunction in at least one type of cone cell in the eye. For example, protanopia is a lack of L-cones, while protanomaly is an impairment of L-cones. Deuteranopia is a lack of M-cones while deuteranomaly is an impairment of M-cones; deuteranomaly is the most common cause of red-green colorblindness. Conversely, tetrachromacy refers to having four types of cone cells, resulting in increased color perception (up to 100 million distinct colors compared to 10 million distinct colors for trichromats). It is estimated that 2% of women have tetrachromacy.

In one embodiment, the present invention includes at least one test of a user's vision. The at least one test includes, but is not limited to, the Ishihara test, the City University Color Vision Test (CUT), the Holmgren wool test, the Farnsworth D-15 arrangement test, the Farnsworth Lantern test, the Holmes-Wright lantern test, the Beyne lantern test, the Giles-Archer lantern test, the Edridge-Green lantern test, the Farnsworth-Munsell 100 hue test, the Lanthony desaturated D-15 test, and/or the Hardy-Rand-Rittler (HRR) test. Descriptions of tests used to test color vision are included in Foster, D. H. Inherited and Acquired Colour Vision Deficiencies, CRC Press, Boca Raton, Fla., 1991 and Nathans, J., The Genes for Color Vision, Sci. Am. 1989, February; 260(2):42-9, each of which is incorporated herein by reference in its entirety. See also, e.g., Perception, Rock, Irwin, 1984, Scientific America Library, ISBN 0-7167-5001-5; Eye, Brain, Vision, Hubel, David H., 1987, Scientific America Library, ISBN 0-7167-5020-1; Sensation & Perception, Goldstein, Bruce E. and Brockmole, James R., 2017, Cengage Learning, ISBN 978-1-305-67404-2; and Vision & Art: The Biology of Seeing, Livingstone, Margaret, 2002, Abrams Books, ISBN 978-0-8109-0406-3, each of which is incorporated herein by reference in its entirety. In one embodiment, the at least one test includes, but is not limited to, at least one test for color, luminance, and/or saturation perception. Anomaloscope tests are also compatible with the present invention. See, e.g., Color Blind Essentials, Daniel from Colblindor, available at https://www.color-blindness.com/wp-content/documents/Color-Blind-Essentials.pdf (last accessed Sep. 14, 2021), which is incorporated herein by reference in its entirety. In a preferred embodiment, the present invention includes the at least one test on a viewing device. Alternatively, the present invention includes the at least one test on a cable box, a set-top box, and/or a streaming device.

In one embodiment, the present invention includes a colorblindness visualizer. The colorblindness visualizer enables display of image data as it would be perceived by a person with varying types of color vision impairment and/or other visual defects. The colorblindness visualizer allows a person without color vision impairment to input adjustments to image data to optimize the image data for a person with color vision impairment by simulating the impairments. Examples of colorblindness visualizers are described in Jenny, B., & Kelso, N. V. (2007). Color Design for the Color Vision Impaired. Cartographic Perspectives, (58), 61-67, which is incorporated herein by reference in its entirety. Another embodiment of a colorblindness visualizer is found in Jenny, B. & Kelso, N. V. (2007). Designing maps for the colour-vision impaired. The bulletin of the Society of Cartographers. 41. 9-12, which is incorporated herein by reference in its entirety. In another embodiment, the colorblindness visualizer is operable to simulate color vision impairment using color warping, which changes color distribution to match color vision impairment as described in Lin H Y, Chen L Q, Wang M L. Improving Discrimination in Color Vision Deficiency by Image Re-Coloring. Sensors (Basel). 2019; 19(10):2250. Published 2019 May 15, which is incorporated herein by reference in its entirety. In yet another embodiment, the colorblindness visualizer simulates color vision impairment by simulating cone sensitivity as described in Shrestha R. Simulating Colour Vision Deficiency from a Spectral Image. Stud Health Technol Inform. 2016; 229: 392-401. PMID: 27534332, which is incorporated herein by reference in its entirety.

In one embodiment, the at least one test includes a test of preferences between at least two images. For example, the at least one test includes an image with a first color mapping (e.g., red and cyan) and the image with a second color mapping (e.g., red and green). Thus, the underlying image is the same, but the color mappings are different. In this embodiment, the at least one test presents the at least two images and preferences between the at least two images are determined via user input. In one example, the image with the first color mapping (e.g., red and cyan) is preferred over the image with the second color mapping (e.g., red and green) for a viewer with deuteranopia (red-green colorblindness). In a preferred embodiment, the at least one test includes a plurality of color mappings.

Figure 43:
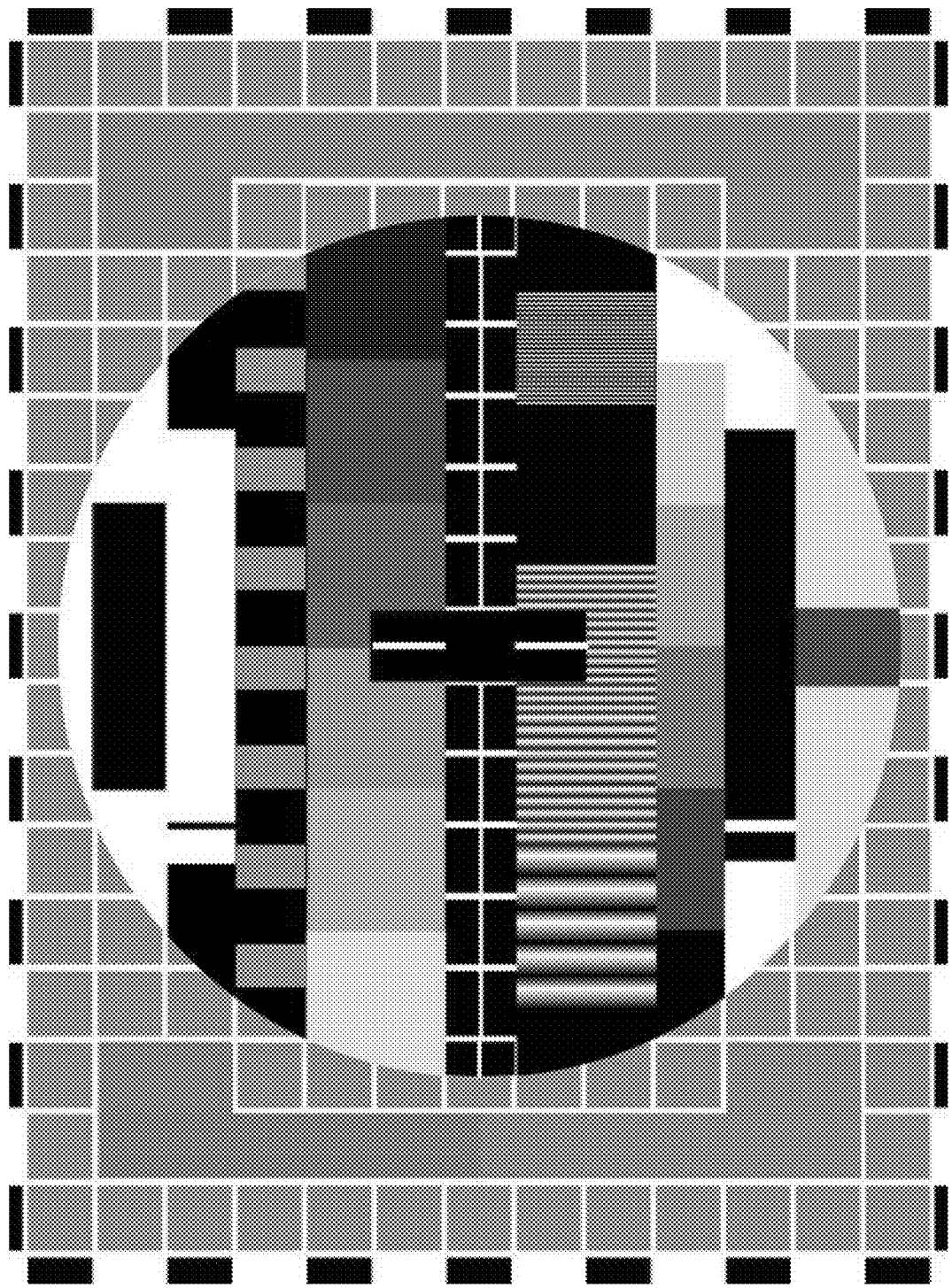
FIG. 43 illustrates one embodiment of an image with at least one test pattern.
Figure 44:
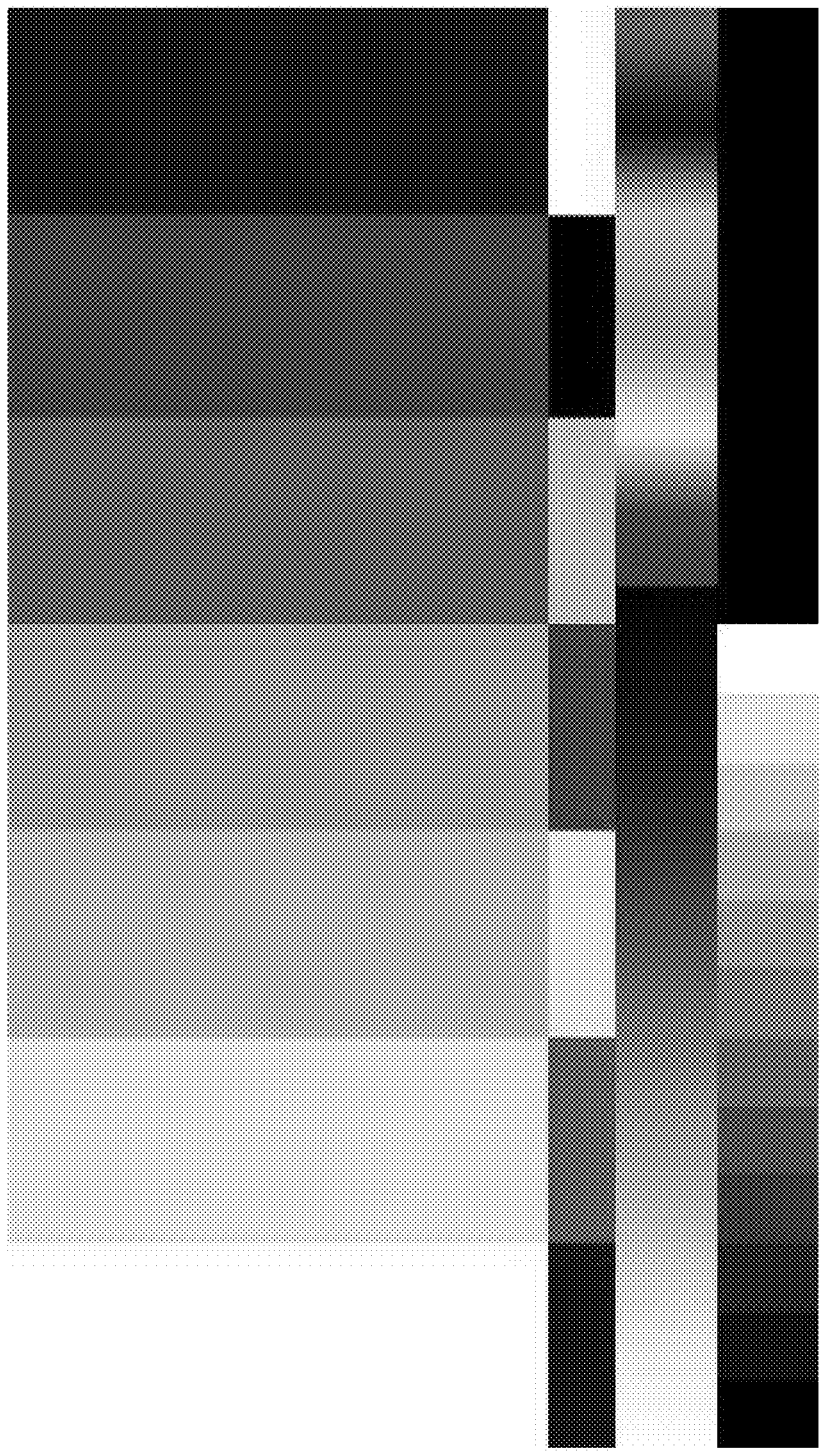
FIG. 44 illustrates an alternative embodiment of an image with a test pattern.

In one embodiment, the at least one test includes at least one test pattern. FIG. 43 illustrates one embodiment of an image with at least one test pattern. FIG. 44 illustrates an alternative embodiment of an image with a test pattern. The at least one test is preferably operable to determine differentiation of brightness and color levels in the at least one test pattern. For example, using information from the at least one test related to the at least one test pattern (e.g., how many distinct color bars, how many shades of gray, etc.), colors are operable to be differentiated until optimized perception is achieved.

Additionally or alternatively, the present invention provides for manual input regarding the user's vision. For example, the system allows input regarding a color deficiency (e.g., protanopia) via manual input.

In a preferred embodiment, the at least one test includes at least one sensitivity profile for at least one primary of the at least one viewing device. In one embodiment, the at least one sensitivity profile for the at least one primary of the at least one viewing device is utilized to build a landscape of sensitivity for a user. In a preferred embodiment, the at least one sensitivity profile includes each primary of the at least one viewing device. As previously described, the viewing device preferably includes at least four primaries. For example, the viewing device includes, but is not limited to, RGBC, RGBY, RGBCY, RGBCMY, $RG_1G_2B$, and/or $RG_1G_2BC$. Other viewing devices with different combinations of primaries are compatible with the present invention. In one embodiment, the viewing device includes at least one white display element (e.g., at least one white LED). Advantageously, using more than three primaries (i.e., at least four primaries) allows for additional combinations of primaries to help a user distinguish between colors. For example, a colorimetric point (x,y) is operable to be produced by a first combination of primaries and a second combination of primaries. The system is operable to choose the second combination of primaries when it is more distinguishable by the user (e.g., as determined by the at least one sensitivity profile and/or the at least one test). Thus, the system is operable to modify at least one metamer of an output position. Using more than three primaries (i.e., at least four primaries) also increases the volume of the available color gamut, thus providing more granularity in displayed colors.

In a preferred embodiment, results of the at least one test and/or the manual input are used to create at least one vision profile for a user. The at least one vision profile includes, but is not limited to, information related to color deficiencies, color preferences, luminance preferences, at least one user account (e.g., user name, user account number, etc.), at least one viewing device (e.g., device identifier, device primaries, media access control (MAC) address, internet protocol (IP) address), at least one viewing content, calibration (e.g., calibration profile, calibration history), and/or at least one sensitivity profile for at least one primary of the at least one viewing device. In one embodiment, the information related to the color deficiencies includes information about color vision along at least one vector (e.g., a red-green vector). In one embodiment, the vision profile further includes data about a viewing environment in which the at least one viewing device is located (e.g., location, lighting conditions, time of use, viewing distance, viewing angle, display brightness, average picture level (APL) of desired content adapted to sensitivity capabilities of a viewer). For example, lower APLs will require a greater adjustment to provide perception optimization. The at least one viewing content advantageously allows for different vision profiles depending on a type of content. For example, a first video game requires a first vision profile and a second video game requires a second vision profile, even when the first video game and the second video game are viewed on the same device. Additionally or alternatively, the vision profiles depend on the viewing environment.

In one embodiment, the at least one vision profile is associated with a plurality of viewing devices. For example, the at least one vision profile includes a first vision profile for a first viewing device (e.g., smartphone), a second vision profile for a second viewing device (e.g., computer monitor), a third vision profile for a third viewing device (e.g., television), and a fourth vision profile for a fourth viewing device (e.g., contact lenses). Alternative viewing devices include, but are not limited to, tablets and mobile devices.

In one embodiment, the at least one test includes a first test for a first eye (e.g., left eye) to create a first vision profile and a second test for a second eye (e.g., right eye) to create a second vision profile. In one embodiment, the viewing device includes a first lens (e.g., for the left eye) and a second lens (e.g., for the second eye). For example, a wearable device (e.g., headset, glasses, contact lenses) includes separate fields of view for the first eye and the second eye. The first eye and the second eye may have different vision profiles and/or sensitivity profiles. In one embodiment, the at least one test includes a test to determine a dominant eye (i.e., left eye or right eye). The dominant eye provides information to the visual cortex of the brain more accurately than the non-dominant eye. In one embodiment, the viewing device displays a shape (e.g., a target) and a viewer is asked to form a triangle with their thumbs and index fingers to determine the dominant eye. If the shape stays in the triangle while the right eye is open, the right eye is the dominant eye. If the shape stays in the triangle while the left eye is open, the left eye is the dominant eye. Advantageously, this embodiment optimizes color for each eye. This is a significant advantage, especially when color vision deficiency is due to injury or trauma affecting a part of the brain, one eye, or both eyes, which can result in different amounts of colorblindness in each eye.

In one embodiment, the system determines at least one conversion based on the at least one vision profile. In one embodiment, the at least one conversion incudes at least one algorithm, at least one formula, and/or at least one look up table (LUT) (e.g., 3D LUT). In one embodiment, the at least one conversion modifies a first color (e.g., $(x_1, y_1)$) that is difficult to perceive by a user to a second color (e.g., $(x_2, y_2)$) that is easier to perceive by the user. In another embodiment, the at least one conversion modifies a color (x,y) from a first representation using a first set of primaries (e.g., RGB) to a second representation of the color (x,y) using a second set of primaries (e.g., RGBC).

In one embodiment, the at least one conversion creates perceptual color differences between colors that would otherwise appear the same. The color differences between colors, or lack thereof, are included in the at least one vision profile. The system is operable to convert at least one color (x,y) to increase a perceptual difference for a viewer who is unable to otherwise perceive any difference between the at least one color (x,y) and surrounding colors. In one embodiment, the at least one conversion is based upon a response curve to a color. For example, one type of colorblindness involves an inability to distinguish between two colors because a first response curve to a first color overlaps with a second response curve to a second color. This information is captured in the at least one vision profile. The system is then operable to convert the first color and/or the second color to an updated representation such that response curves to the updated representation do not overlap to the same extent as the first response curve and the second response curve. In a preferred embodiment, the at least one conversion reduces metameric errors in color perception.

Advantageously, the at least one conversion of the present invention in one embodiment occurs in real time or near-real time. The system is operable to convert color data as it is being transmitted and/or displayed, rather than applying a conversion to all of the color data before it is displayed. The system in one embodiment does not apply a color template, preset, or substitution to the color data to optimize perception; rather, the conversion is based on the at least one vision profile and is dynamic. The system of the present invention advantageously is a colorimetric optimization and does not alter the viewing content itself. In one embodiment, the present invention is operable to map color data to an alternative color scheme wherein color data in the alternative color scheme is more distinguishable to someone with impaired color vision. Systems and methods for selecting the alternative color scheme are described in Harrower, M. & Brewer, C. A. (2003) ColorBrewer.org: An Online Tool for Selecting Colour Schemes for Maps, The Cartographic Journal, 40:1, 27-37, which is incorporated herein by reference in its entirety. In one embodiment, mapping color data involves projecting the original color data onto a plane approximating the perceptible color gamut of a person with color vision impairment as described in A Model for Simulation of Color Vision Deficiency and A Color Contrast Enhancement Technique for Dichromats, a thesis by Machado, which was published in September 2010 and which is incorporated herein by reference in its entirety. The projection preferably minimizes contrast loss in order to preserve differential color information. In one embodiment, contrast is enhanced as described in Machado, G. M. and Oliveira, M. M. (2010), Real-Time Temporal-Coherent Color Contrast Enhancement for Dichromats. Computer Graphics Forum, 29: 933-942, which is incorporated herein by reference in its entirety.

Alternatively, mapping the color data involves modeling changes in cone response as described in Machado G M, Oliveira M M, Fernandes L A. A physiologically-based model for simulation of color vision deficiency. IEEE Trans Vis Comput Graph. 2009 November-December; 15(6):1291-8. doi: 10.1109/TVCG.2009.113. PMID: 19834201, which is incorporated herein by reference in its entirety. Daltonization is the process of adapting color data to improve perception by a viewer with color vision impairment. In one embodiment, Daltonization involves converting the color data to LMS color space and mapping the color data to perceptible wavelengths as described in Deshmukh, C. & Badlani, J. (2016). IJARCCE A Survey on Image Modification for Deuteranopic Viewers. International Journal of Advanced Research in Computer and Communication Engineering. 5. 10.17148/IJARCCE.2016.52122, which is incorporated herein by reference in its entirety. In an alternative embodiment, Daltonization includes adjusting contrast and brightness of the color data in order to improve distinction between colors of similar luminosities as described in U.S. Pat. No. 10,118,097, which was filed Sep. 30, 2016 and issued Nov. 6, 2011 and which is incorporated herein by reference in its entirety. In yet another embodiment, Daltonization includes detecting contrast ratios in the color data and adjusting the contrast ratios to meet a threshold as described in U.S. Pat. No. 10,878,540, which was filed Aug. 15, 2017 and issued Dec. 29, 2020 and which is incorporated herein by reference in its entirety. Alternatively, saturation is increased to target cones in the eye.

In an alternative embodiment, the at least one conversion includes modifying a brightness and/or a white point of the color data. Lighting affects visible discrimination between colors, and color vision impairment can also affect visual perception of white. In one embodiment, modification of brightness depends on the at least one vision profile. Alternatively, the modification of brightness depends on ambient lighting surrounding the display or viewing device. In one embodiment, the white point is determined based on an LMS response wherein the LMS response is calculated using the at least one vision profile.

For example, distortions in color perception are an early indicator of macular degeneration. The photoreceptor cone (chrominance) cells are most dense in the macula (the center of the retina), whereas the rod cells (corresponding to luminance) are found in the peripheral retina. As these cone cells are damaged, wavelengths of color are perceived differently and send mixed signals to the brain. Lower wavelengths are generally affected first, and may be followed by a complete loss of color perception. Advantageously, the present invention is operable to compensate for this change over time. Further, the present invention is operable to be used as a tool to help diagnose earliest onset macular degeneration.

The system is operable to display results of the at least one conversion on the at least one viewing device. In one embodiment, the system prompts for confirmation of the at least one conversion. For example, the viewing device displays at least one image and prompts for conformation that the at least one conversion improves perception via manual input. In one embodiment, the at least one conversion is saved (e.g., to the at least one vision profile) after the confirmation. Alternatively, the at least one conversion is saved without confirmation.

In one embodiment, one of the at least one vision profile is loaded on an associated viewing device of the at least one viewing device. For example, the first vision profile is loaded on the first viewing device. In one embodiment, an image is adjusted according to the at least one vision profile.

In one embodiment, the system includes a plurality of default vision profiles. The plurality of default vision profiles includes, but is not limited to, rod monochromacy, cone monochromacy, protanopia, deuteranopia, tritanopia, protanomaly, deuteranomaly, tritanomaly, cataracts, diabetic retinopathy, and/or macular degeneration.

In one embodiment, an image is transmitted to a viewing device. Alternatively, the viewing device is also an image capturing device (e.g., smartphone with a camera). In one embodiment, the image is transmitted as image data to the viewing device. In one embodiment, the image data includes Yxy data. In a preferred embodiment, the image data (e.g., Yxy data) is processed (e.g., by the viewing device) prior to display on the viewing device. The viewing device adjusts a plurality of pixels in the image for display using the at least one conversion. The image is displayed with an adjusted plurality of pixels on the viewing device. Advantageously, the present invention does not require pre-modification of viewing content (e.g., the image) or templates before reaching the device. Additionally, this increases an audience size for content and provides a better viewing experience. For example, most content does not currently support the visually impaired. Further, advertisements would appeal to the visually impaired with more impact.

Figure 42:
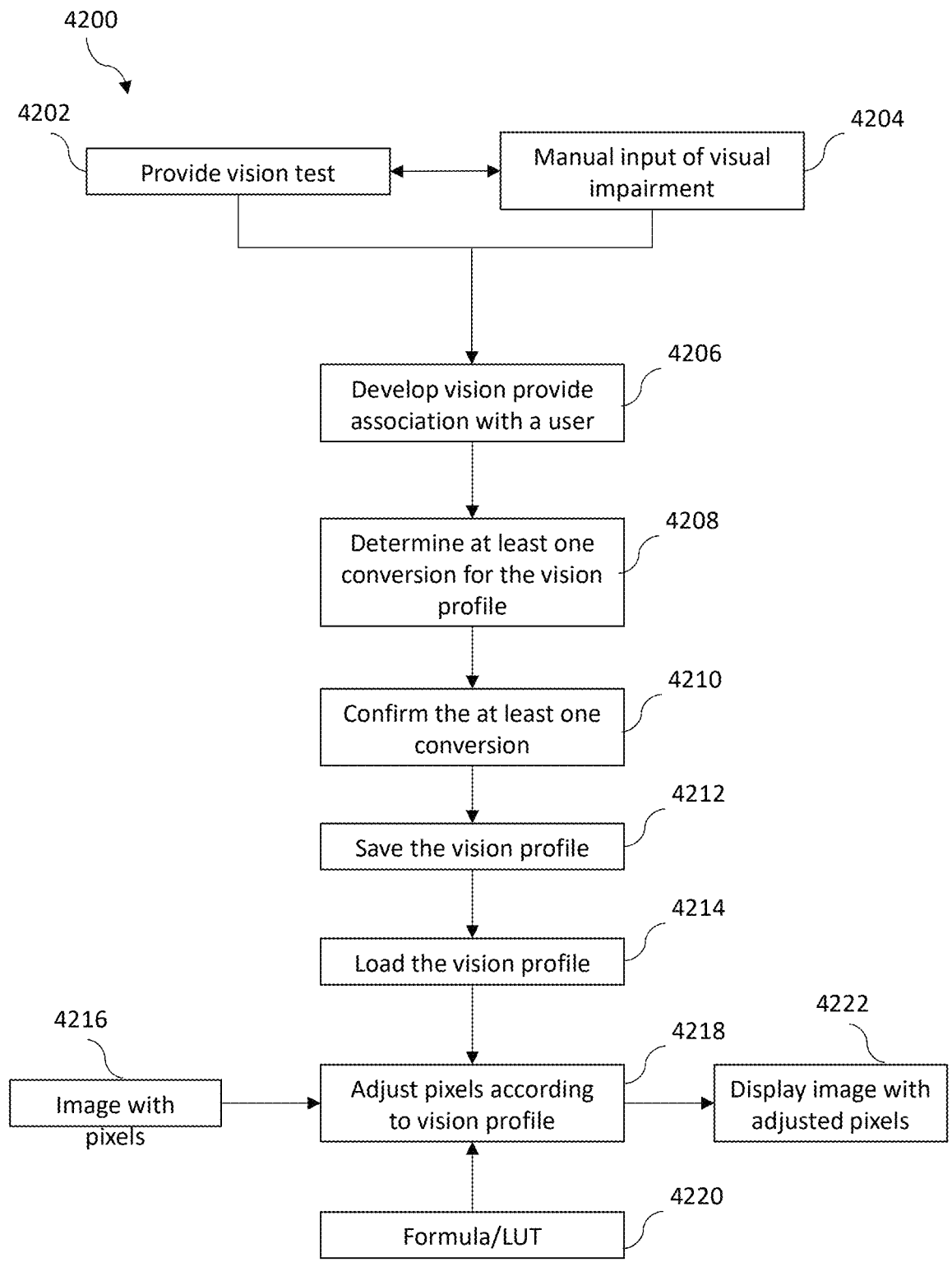
FIG. 42 illustrates a method for perception optimization according to one embodiment of the present invention.

FIG. 42 illustrates a method 4200 for perception optimization according to one embodiment of the present invention. A vision test is provided by the system 4202 to the user and/or manual input of at least one visual impairment 4204 is provided to the system. In one embodiment, the manual input of the at least one visual impairment 4204 is included as an input for the vision test provided by the system 4202. A vision profile is developed by the system 4206 that is associated with the user. The system determines at least one conversion for the vision profile 4208. The system optionally confirms the at least one conversion for the vision profile 4210 and saves the vision profile 4212. The system loads the vision profile 4214. An image with pixels is presented to the system 4216 and a formula and/or a look up table (LUT) 4218 is applied to the image to adjust the pixels according to the vision profile 4220. The image is displayed on a viewing device with adjusted pixels 4222.

The present invention is also operable to adjust luminance of the viewing content (e.g., the image) for display on the at least one viewing device. In one embodiment, the vision profile includes preferences regarding the luminance of the viewing content for the at least one viewing device. In one embodiment, the at least one test probes for the preferences regarding the luminance of the viewing content. For example, the at least one test includes an image with a first luminance and the image with a second luminance. Thus, the underlying image is the same, but the luminance values are different. In this embodiment, the at least one test presents the at least two images and preferences between the at least two images are determined via user input. Advantageously, processing image data with colorimetric coordinates and luminance (e.g., Yxy data) allows for easy and separate manipulation of the colorimetric coordinates (e.g., x,y) and the luminance (e.g., Y).

In one embodiment, the at least one test is operable to address viewing of content by more than one person. For example, the at least one test is performed on a first subject and a second subject. The system is operable to optimize perception for both subjects without creating unacceptable artifacts.

In one embodiment, the present invention further includes biometric data (e.g., galvanic skin response, eye tracking, pulse rate, respiration rate) to optimize perception. In one embodiment, the biometric data is collected for a plurality of viewers (e.g., a first viewer, a second viewer, etc.).

In one embodiment, the present invention is operable to display image data on a wearable eyewear device, e.g., smart glasses, smart goggles, contact lenses. In one embodiment, the image data is wirelessly transmitted to the eyewear device and displayed on the eyewear device. Compatible descriptions of eyewear devices include, but are not limited to, U.S. Pat. No. 11,054,648, filed Nov. 18, 2019 and issued Jul. 6, 2021, U.S. Pat. No. 10,868,976, filed Apr. 29, 2016 and issued Dec. 15, 2020, U.S. Pat. No. 10,268,276, filed Mar. 15, 2014 and issued Apr. 23, 2019, U.S. Pat. No. 10,025,098, filed Dec. 24, 2014 and issued Jul. 17, 2018, U.S. Pat. No. 10,176,783, filed Jan. 4, 2014 and issued Jan. 8, 2019, and U.S. Patent Publication No. 2018/0218642, filed Sep. 2, 2015 and published Aug. 2, 2018, each of which is incorporated herein by reference in its entirety.

Machine Learning

The system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

The system is preferably operable to tune the at least one vision profile based on user feedback. In a preferred embodiment, the system has a continuous learning mode based on user feedback. Advantageously, this allows for the system to learn as a user's preferences and/or vision changes over time. Further, this allows for the system to learn as additional content types are added.

Additionally, the system is operable to determine a priority of the at least one test. For example, the system learns over time that a first test is more important than a second test. The system prioritizes the first test over the second test. In one example, the system does not include the second test. Advantageously, this embodiment streamlines the testing process.

In one embodiment, the plurality of learning techniques is incorporated into one or more of the at least one test and/or the at least one vision profile. For example, results of the at least one test on a first viewing device are used to create a first vision profile and suggest a second vision profile for a second viewing device. In another embodiment, the plurality of learning techniques incorporates results of the at least one test for a plurality of users. For examples, results of the at least one test for the plurality of users are used to optimize results for a user with a similar condition. In yet another embodiment, the plurality of learning techniques is operable to select one of the at least one vision profile based on the at least one viewing content. For example, if a vision profile is used for a first video game of a genre (e.g., first person shooter), then the vision profile is automatically selected when second video of the genre is played.

Figure 45:
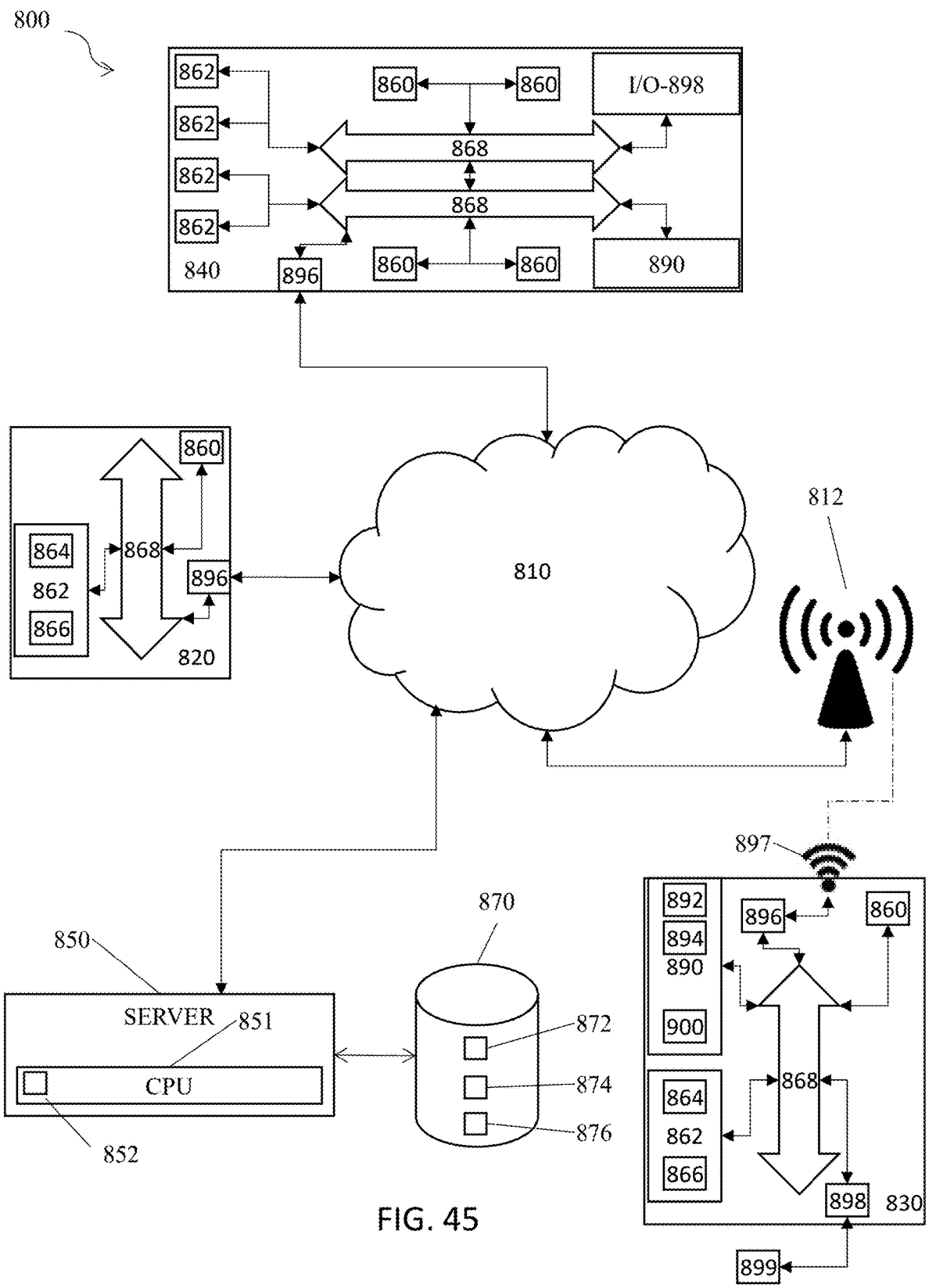
FIG. 45 is a schematic diagram of an embodiment of the invention illustrating a computer system.

FIG. 45 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, notebook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 45 multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any deliver media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology, discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for computing devices 820, 830, and 840. The distributed computing devices 820, 830, and 840 are connected to an edge server in the edge computing network based on proximity, availability, latency, bandwidth, and/or other factors.

It is also contemplated that the computer system 800 may not include all of the components shown in FIG. 45 may include other components that are not explicitly shown in FIG. 45 or may utilize an architecture completely different than that shown in FIG. 45. The various illustrative logical blocks, modules, elements, circuits, and algorithms described in connection with the embodiments discussed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or positioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for displaying a primary color system, comprising:
a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x and y);
an image data converter, wherein the image data converter includes a digital interface, and wherein the digital interface is operable to encode and decode the set of values in the CIE Yxy color space;
at least one viewing device; and
at least one vision profile for at least one viewer;
wherein the at least one viewing device and the image data converter are in communication;
wherein processed Yxy data is transported between the encode and the decode;
wherein the image data converter is operable to convert the set of image data for display on the at least one viewing device;
wherein the converted set of image data is mapped to a set of optimized image data for display on the at least one viewing device based on at least one test for the at least one viewer; and
wherein the at least one vision profile includes information related to color deficiencies, information about color vision along at least one vector, color preferences, luminance preferences, at least one user account, the at least one viewing device, at least one viewing content, calibration, at least one sensitivity profile for at least one primary of the at least one viewing device, and/or data about a viewing environment in which the at least one viewing device is located.

2. The system of claim 1, wherein the at least one viewing device includes at least four primaries.

3. The system of claim 1, wherein the at least one test includes at least one test for color perception, luminance perception, and/or saturation perception.

4. The system of claim 1, wherein the converted set of image data is mapped to the set of optimized image data in the at least one viewing device.

5. The system of claim 1, wherein the converted set of image data is mapped to the set of optimized image data using at least one look up table.

6. The system of claim 1, wherein the set of optimized image data corresponds to a contribution of each of the at least three primaries in the at least one viewing device.

7. The system of claim 1, wherein the converted set of image data is mapped from a first color to a second color in the set of optimized image data.

8. The system of claim 1, wherein the converted set of image data is mapped to the set of optimized image data in a cable box, a set-top box, and/or a streaming device.

9. The system of claim 1, wherein the at least one test includes the at least one sensitivity profile for the at least one viewer.

10. The system of claim 1, wherein the image data converter is operable to convert the set of values in the CIE Yxy color space to a plurality of color gamuts.

11. The system of claim 1, wherein the image data converter is operable to fully sample the processed Yxy data related to the luminance and subsample the processed Yxy data related to the two colorimetric coordinates.

12. The system of claim 1, wherein the processed Yxy data is fully sampled.

13. The system of claim 1, wherein the at least one test includes a first test for a first eye and a second test for a second eye.

14. A system for displaying a primary color system, comprising:
  a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x and y);
  an image data converter, wherein the image data converter includes a digital interface, and wherein the digital interface is operable to encode and decode the set of values in the CIE Yxy color space;
  at least one viewing device, wherein the at least one viewing device includes at least three primaries;
  at least one vision profile for at least one viewer;
  wherein the at least one viewing device and the image data converter are in communication;
  wherein processed Yxy data is transported between the encode and the decode;
  wherein the image data converter is operable to convert the set of image data for display on the at least one viewing device;
  wherein the converted set of image data is mapped to a set of optimized image data for display on the at least one viewing device based on at least one test;
  wherein the at least one test includes at least one sensitivity profile for the at least three primaries;
  wherein the at least one test includes at least one test for color perception, luminance perception, and/or saturation perception; and
  wherein the at least one vision profile includes information related to color deficiencies, information about color vision along at least one vector, color preferences, luminance preferences, at least one user account, the at least one viewing device, at least one viewing content, calibration, the at least one sensitivity profile for the at least three primaries of the at least one viewing device, and/or data about a viewing environment in which the at least one viewing device is located.

15. The system of claim 14, wherein the at least three primaries include at least four primaries.

16. The system of claim 14, wherein the converted set of image data is mapped to the set of optimized image data in the at least one viewing device.

17. A method for displaying a primary color system, comprising:
  providing a set of image data including a set of primary color signals, wherein the set of primary color signals corresponds to a set of values in an International Commission on Illumination (CIE) Yxy color space, wherein the set of values in the CIE Yxy color space includes a luminance (Y) and two colorimetric coordinates (x and y);
  encoding the set of image data in the CIE Yxy color space using a digital interface of an image data converter, wherein the image data converter is in communication with at least one viewing device;
  processing the set of image data in the CIE Yxy color space;
  decoding the set of image data in the CIE Yxy color space using the digital interface of the image data converter; and
  the image data converter converting the set of image data for display on the at least one viewing device;
  mapping the converted set of image data to a set of optimized image data for display on the at least one viewing device based on at least one test; and
  creating at least one vision profile for at least one viewer based on the at least one test;
  wherein the encoding and the decoding include transportation of processed Yxy data; and
  wherein at least one vision profile includes information related to color deficiencies, information about color vision along at least one vector, color preferences, luminance preferences, at least one user account, the at least one viewing device, at least one viewing content, calibration, at least one sensitivity profile for at least one primary of the at least one viewing device, and/or data about a viewing environment in which the at least one viewing device is located.

18. The method of claim 17, wherein the mapping is completed in the at least one viewing device.

19. The method of claim 17, further including selecting contributions for each of at least three primaries based on the at least one test.

* * * * *